(12) United States Patent
Toksvig et al.

(10) Patent No.: US 10,540,576 B1
(45) Date of Patent: Jan. 21, 2020

(54) PANORAMIC CAMERA SYSTEMS

(71) Applicant: Facebook, Inc., Menlo Park, CA (US)

(72) Inventors: Michael John Toksvig, Palo Alto, CA (US); Forrest Samuel Briggs, Palo Alto, CA (US); Brian Keith Cabral, San Jose, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 16/240,588

(22) Filed: Jan. 4, 2019

Related U.S. Application Data

(63) Continuation of application No. 15/490,887, filed on Apr. 18, 2017, now Pat. No. 10,230,947.

(Continued)

(51) Int. Cl.
*G06K 9/66* (2006.01)
*G06T 7/55* (2017.01)
(Continued)

(52) U.S. Cl.
CPC ....... *G06K 9/6269* (2013.01); *G06K 9/00201* (2013.01); *G06K 9/209* (2013.01); *G06K 9/4628* (2013.01); *G06K 9/527* (2013.01); *G06K 9/6201* (2013.01); *G06K 9/6202* (2013.01); *G06K 9/627* (2013.01); *G06K 9/6255* (2013.01); *G06K 9/6256* (2013.01); *G06K 9/66* (2013.01);
(Continued)

(58) Field of Classification Search
CPC ............ G06T 2207/10016; G06T 7/70; H04N 17/002; H04N 5/23238; H04N 5/247; G06K 9/6201
See application file for complete search history.

(56) References Cited

U.S. PATENT DOCUMENTS 6,487,304 B1 11/2002 Szeliski
9,866,820 B1 1/2018 Agrawal et al.
(Continued)

OTHER PUBLICATIONS

Jampani, V. et al., "Learning Sparse High Dimensional Filters: Image filtering, Dense CRFS and Bilateral Neural Networks," *IEEE Conference on Computer Vision and Pattern Recognition*, 2016, pp. 4452-4461.

(Continued)

*Primary Examiner* — Thai Q Tran
*Assistant Examiner* — Jose M Mesa
(74) *Attorney, Agent, or Firm* — Fenwick & West LLP

(57) ABSTRACT

A camera system captures images from a set of cameras to generate binocular panoramic views of an environment. The cameras are oriented in the camera system to maximize the minimum number of cameras viewing a set of randomized test points. To calibrate the system, matching features between images are identified and used to estimate three-dimensional points external to the camera system. Calibration parameters are modified to improve the three-dimensional point estimates. When images are captured, a pipeline generates a depth map for each camera using reprojected views from adjacent cameras and an image pyramid that includes individual pixel depth refinement and filtering between levels of the pyramid. The images may be used generate views of the environment from different perspectives (relative to the image capture location) by generating depth surfaces corresponding to the depth maps and blending the depth surfaces.

20 Claims, 38 Drawing Sheets

Related U.S. Application Data

(60) Provisional application No. 62/485,381, filed on Apr. 13, 2017.

(51) Int. Cl.

| | | |
|---|---|---|
| *G06T 5/20* | (2006.01) | |
| *G06T 7/70* | (2017.01) | |
| *G06T 19/20* | (2011.01) | |
| *G06T 15/06* | (2011.01) | |
| *G06T 7/77* | (2017.01) | |
| *G06K 9/62* | (2006.01) | |
| *G06T 5/00* | (2006.01) | |
| *G06K 9/00* | (2006.01) | |
| *G06K 9/20* | (2006.01) | |
| *G06K 9/46* | (2006.01) | |
| *G06K 9/52* | (2006.01) | |
| *H04N 5/247* | (2006.01) | |
| *H04N 5/232* | (2006.01) | |
| *H04N 5/222* | (2006.01) | |
| *H04N 17/00* | (2006.01) | |
| *H04N 7/18* | (2006.01) | |
| *G08B 13/196* | (2006.01) | |
| *H04N 5/225* | (2006.01) | |

(52) U.S. Cl.
CPC ............... *G06T 5/002* (2013.01); *G06T 5/20* (2013.01); *G06T 7/55* (2017.01); *G06T 7/70* (2017.01); *G06T 15/06* (2013.01); *G06T 19/20* (2013.01); *H04N 5/2226* (2013.01); *H04N 5/23216* (2013.01); *H04N 5/23229* (2013.01); *H04N 5/23238* (2013.01); *H04N 5/247* (2013.01); *H04N 7/181* (2013.01); *H04N 17/002* (2013.01); *G06T 7/77* (2017.01); *G06T 2207/10016* (2013.01); *G06T 2207/10028* (2013.01); *G06T 2207/20081* (2013.01); *G06T 2207/30244* (2013.01); *G08B 13/19641* (2013.01); *H04N 5/2252* (2013.01)

(56) References Cited

U.S. PATENT DOCUMENTS

| | | |
|---|---|---|
| 2008/0129825 A1 | 6/2008 | DeAngelis et al. |
| 2010/0033567 A1* | 2/2010 | Gupta ............... H04N 17/002 348/143 |
| 2011/0096169 A1* | 4/2011 | Yu ............... H04N 7/181 348/159 |
| 2012/0163672 A1 | 6/2012 | McKinnon |
| 2012/0194642 A1 | 8/2012 | Lie et al. |
| 2015/0138322 A1 | 5/2015 | Kawamura |
| 2016/0239725 A1 | 8/2016 | Liu et al. |
| 2016/0277650 A1 | 9/2016 | Nagaraja et al. |
| 2016/0321523 A1 | 11/2016 | Sen et al. |
| 2018/0139431 A1 | 5/2018 | Simek et al. |

OTHER PUBLICATIONS

Kalantari, N.K. et al., "A Machine Learning Approach for Filtering Monte Carlo Noise," *ACM Transactions on Graphics*, Aug. 2015, vol. 34, Issue 4, Article No. 122, twelve pages.

Li, Y. et al. "Deep Joint Image Filtering," *European Conference on Computer Vision*, 2016, pp. 154-169.

Xu, L. et al. "Deep Edge-Aware Filters," *International Conference on Machine Learning*, 2015, ten pages.

Zhang, X. et al., "Fast Depth Image Denoising and Enhancement Using a Deep Convolutional Network," *Acoustics, Speech and Signal Processing (ICASSP)*, 2016, pp. 2499-2503.

\* cited by examiner

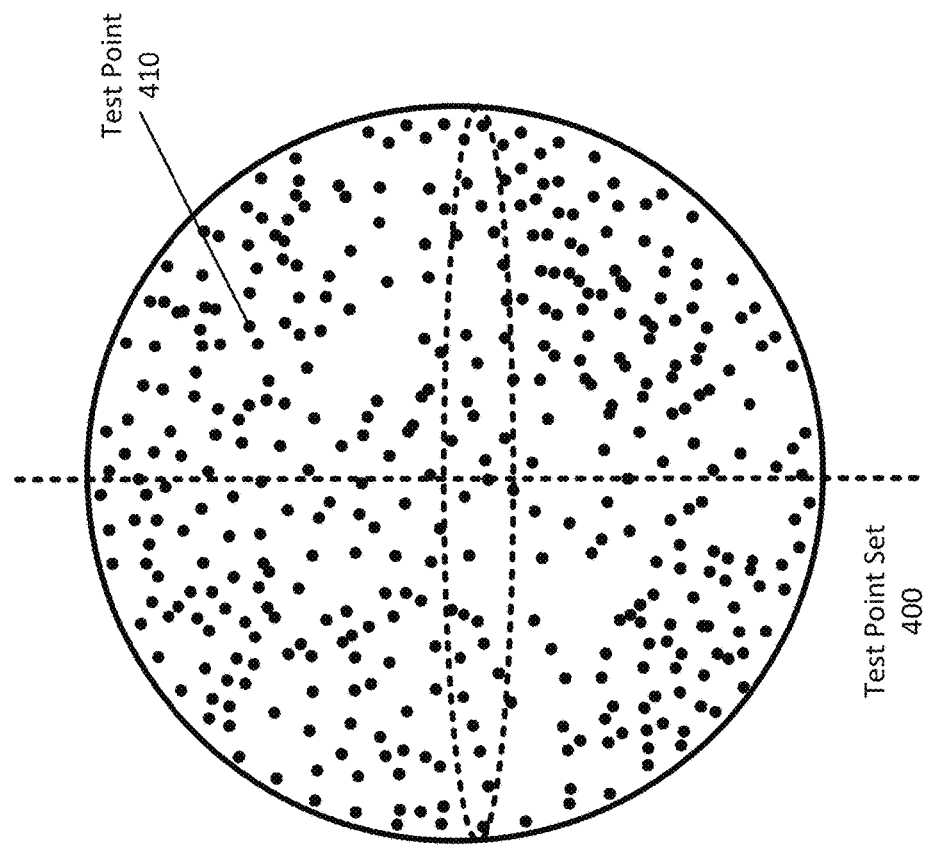

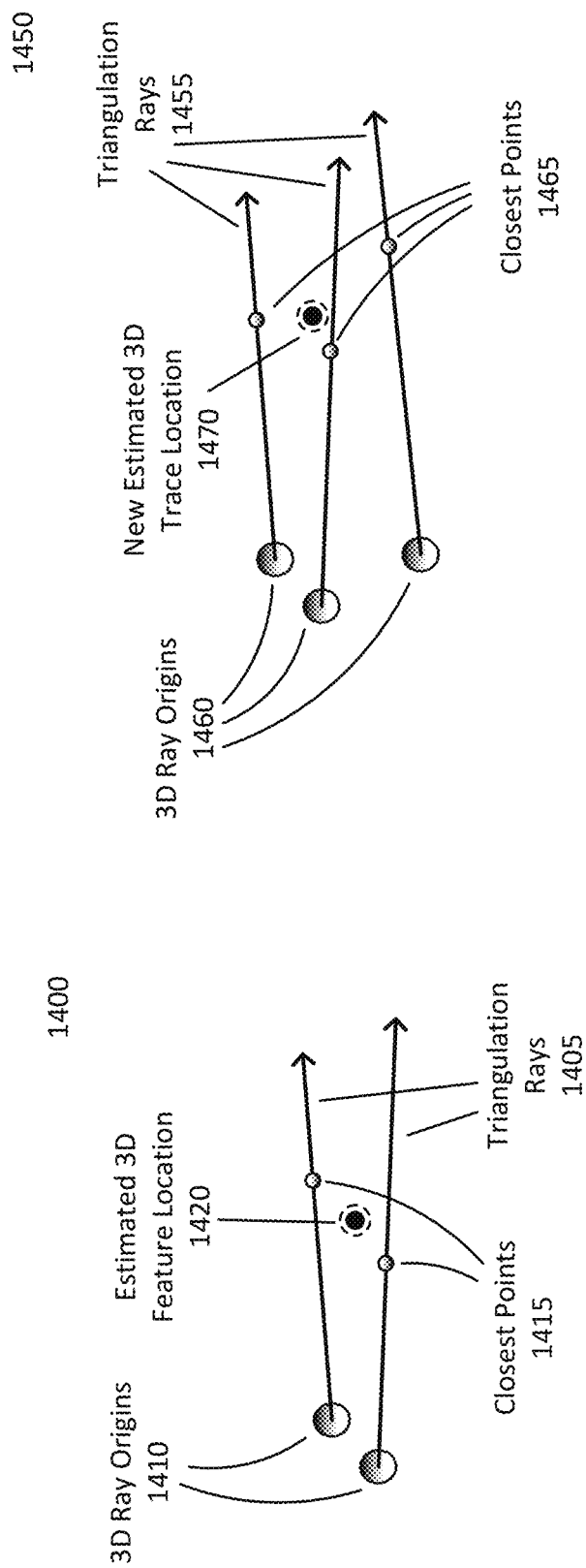

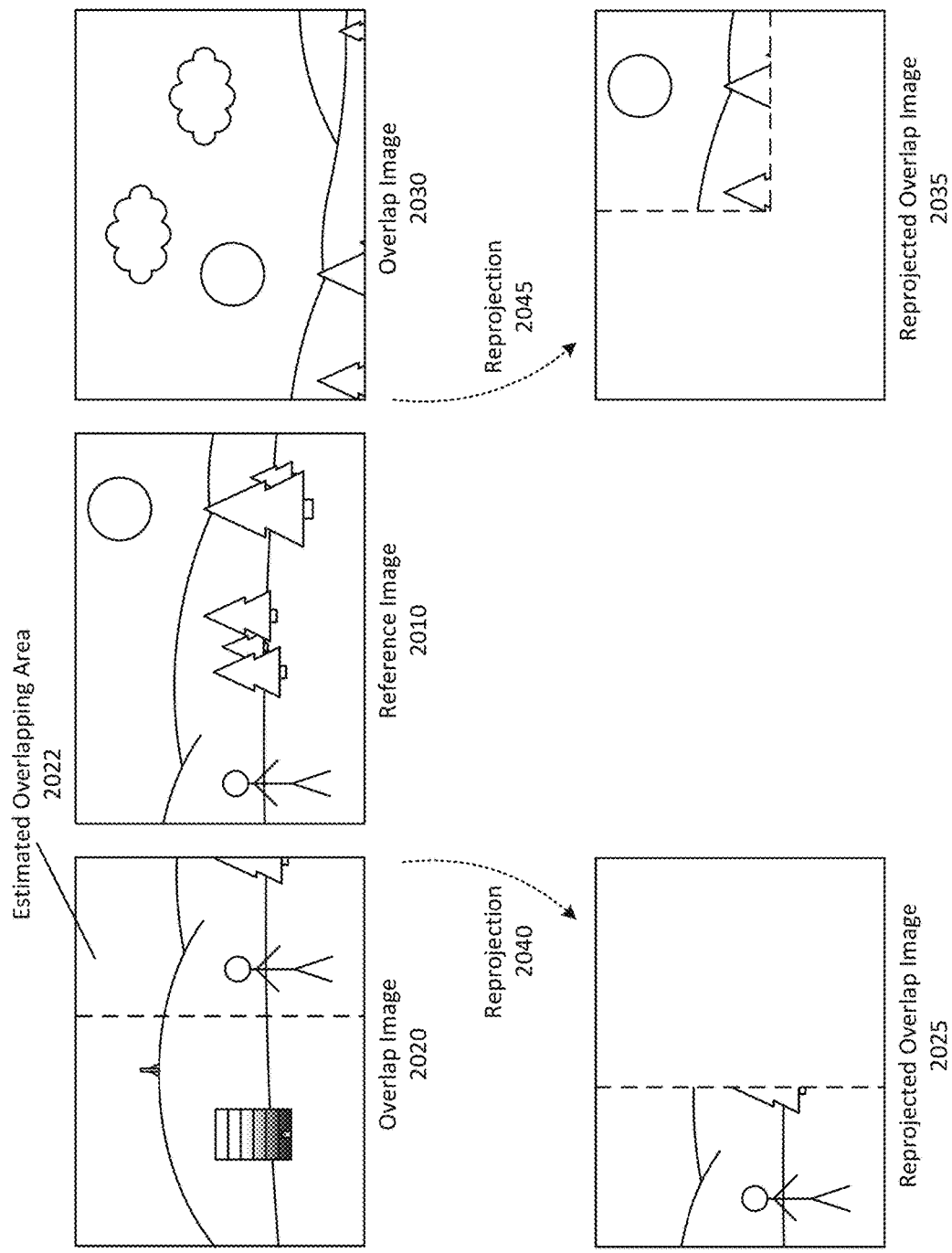

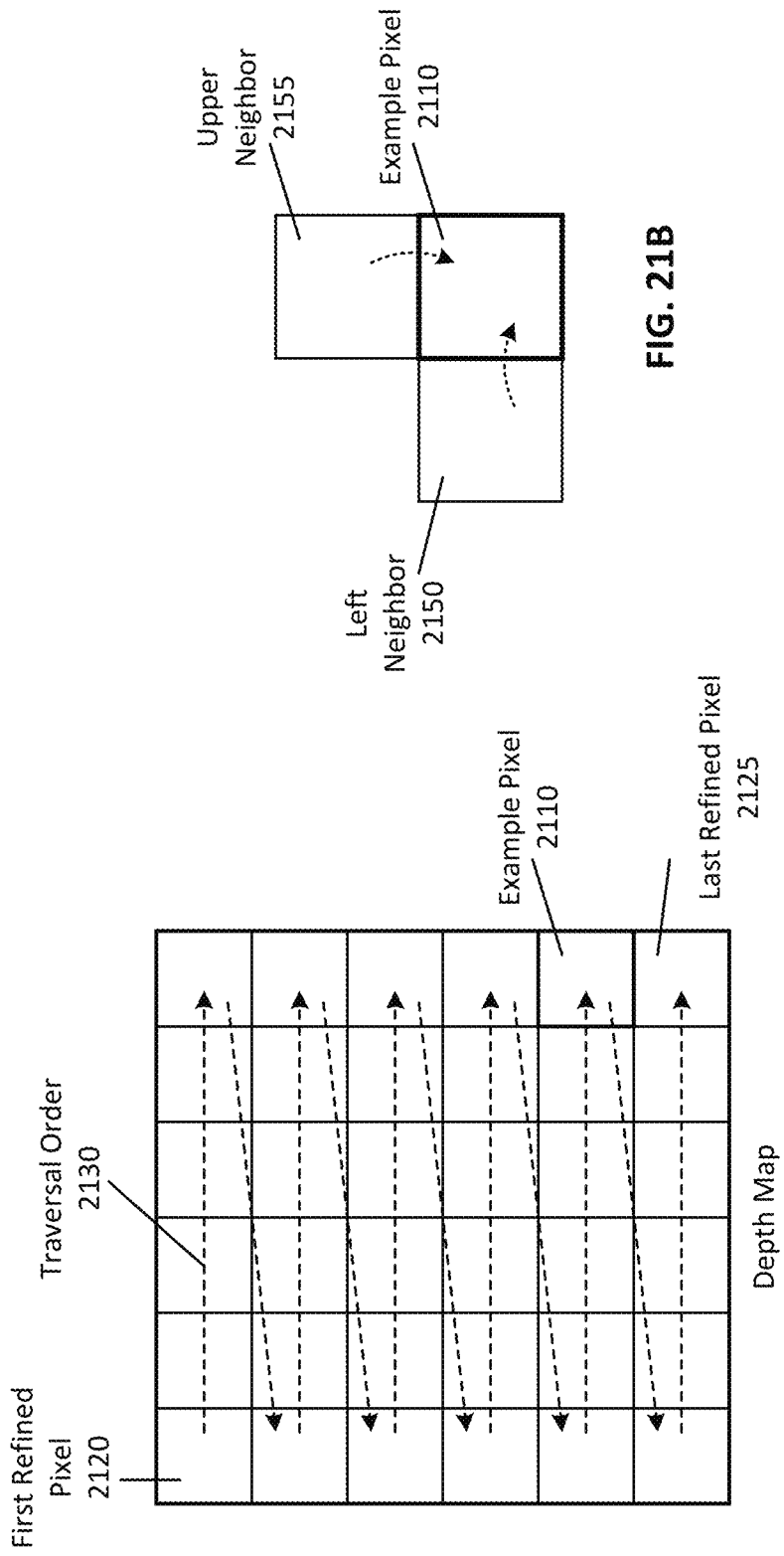

PANORAMIC CAMERA SYSTEMS

CROSS REFERENCE TO RELATED APPLICATIONS

This application is a continuation of co-pending U.S. application Ser. No. 15/490,887, filed Apr. 18, 2017, which claims the benefit of U.S. Provisional Application No. 62/485,381, filed Apr. 13, 2017, which is incorporated by reference in its entirety.

BACKGROUND

Effectively capturing an environment or scene by a set of cameras and rendering that environment to simulate views that differ from the actually-captured locations of the cameras is a challenging exercise. These cameras may be grouped together in a rig to provide various views of the environment to permit capture and creation of panoramic images and video that may be referred to as "omnidirectional," "360-degree" or "spherical" content. The capture and recreation of views is particularly challenging when generating a system to provide simulated stereoscopic views of the environment. For example, for each eye, a view of the environment may be generated as an equirectangular projection mapping views to horizontal and vertical panoramic space. In the equirectangular projection, horizontal space represents horizontal rotation (e.g., from 0 to $2\pi$) and vertical space represents vertical rotation (e.g., from 0 to $\pi$, representing a view directly downward to a view directly upward) space for display to a user. To view these images, a user may wear a head-mounted display on which a portion of the equirectangular projection for each eye is displayed.

Correctly synthesizing these views from physical cameras to simulate what would be viewed by an eye is a difficult problem because of the physical limitations of the cameras, difference in inter pupillary distance in users, fixed perspective of the cameras in the rig, and many other challenges.

The positioning and orientation of cameras is difficult to effectively design, particularly because of various physical differences in camera lenses and to ensure effective coverage of the various directions of view from the center of the set of cameras. After manufacture of a rig intended to position and orient cameras according to a design, these cameras may nonetheless be affected by variations in manufacturing and installation that cause the actual positioning and orientation of cameras to differ. The calibration of these cameras with respect to the designed positioning and orientation is challenging to solve because of the difficulties in determining effective calibration given various imperfections and variations in the environment in which the calibration is performed.

When generating render views, each captured camera image may also proceed through a pipeline to generate a depth map for the image to effectively permit generation of synthetic views. These depth maps should generate depth in a way that is consistent across overlapping views of the various cameras and that effectively provides a depth estimate for pixels in the image accurately and efficiently and account for changing depth across frames and between objects and backgrounds that may share similar colors or color schemes. In generating the depth maps, a large amount of inter-frame and inter-camera data may be processed, requiring extensive computational resources.

Finally, in render views, the various overlapping camera views can create artifacts when combined, and in some systems create unusual interactions when two or more cameras depict different colors or objects in an overlapping area. Resolving this problem in many systems may create popping, warping, or other problems in a render view. In addition, systems which use a single camera or stitch images together may not realistically simulate views for different eyes or at different locations.

SUMMARY

An arrangement of a set of cameras considers camera positioning and orientation to optimize or improve field of view coverage for a space, such as a panoramic 360 degree space. The positioning of the cameras is determined by evaluating the distance of one or more of the cameras from one another and adjusting positioning to optimize a scoring function. For a set of camera positions, the orientation of the cameras is optimized given the fields of view of the cameras to maximize the minimum number of cameras at viewing any given point. Multiple possible orientations are initialized, and each initialization is solved to find the configuration of cameras with optimal coverage of a set of test points. During application of the solver, the orientations of the cameras are solved with a set of points generated semi-randomly. To evaluate the solutions of the different initial configuration, the solutions are evaluated with a set of evenly distributed points.

An image capture system has a set of cameras, each camera having an expected orientation and position, for example an optimal orientation and position. Since the actual manufacture of the cameras may differ from a designed or planned orientation, to determine a set of calibrations for the cameras, an image is captured from each camera. The images are compared to find pairwise feature point matches between the images. The feature point matches are filtered and analyzed to exclude matches that are not consistent with the current camera orientations and positions or that create high reprojection error compared to other matches for the image pair. Sets of feature matches are assembled into traces, which are also filtered and used to calibrate the cameras of the image capture system with a computational solver, such as a nonlinear solver. The calibration process may iterate by re-considering initial feature matches and recalculating feature match consistency, reprojection error, and traces based on the new camera calibrations.

A set of cameras captures images of a scene to be rendered based on depth information. A pipeline generates a depth map of the images that can be parallelized across several processors which may be operating on separate machines to process different frames. Rendering of each frame may recursively request underlying steps in the pipeline which may require data from other cameras or from other frames forward or backwards in time from the current frame. For a given frame, as data is generated, it is marked as used in the current frame. To reduce memory requirements, when beginning a new frame, data cached from the prior frame that was not marked is removed from the cache (and existing marks cleared).

Depth maps are generated for pixels of a reference image based on overlapping images at least partially sharing the field of view of the reference image. An image pyramid of images at various sizes are generated for the reference image and the overlapping images. The overlapping images are reprojected to the reference camera. At a given level of the image pyramid, the depth map solution for a prior level is upscaled and the pixels in the reference image are sequentially evaluated by adopting neighbor pixel depth estimates, if better, and performing a single step of a gradient descent algorithm. Improvements in the depth from the single gradient step can propagate throughout the reference image and up the levels of the image pyramid. The refined depth map may be filtered before upscaling to the next image pyramid level. The filters may use a guide to determine a combination of neighboring pixels for a pixel in an image. In the depth estimates, the filters may use various edge-aware guides to smooth the depth maps for the image and may use prior frames, color, and other characteristics for the guide.

A set of filters blurs a depth map for an image based on a machine-learned set of image transforms on the image. The image transforms are applied to the image to generate a guide for filtering the depth map. The parameters for the image transforms are learned from a set of images each having a known depth map. To train the parameters, the known depth map for an image is randomly perturbed to generate a depth map to be improved by the filter. The parameters for the transforms are then trained to improve the correspondence of an output depth map to the original depth map when the transformed image guides the filtering.

A view of a scene can be rendered from a set of images with corresponding depth maps. Each image with a depth map can be rendered as a "depth surface" with respect to the desired view. The depth surfaces from each image can be added and blended based on alpha channels associated with each image. To render an image with an equirectangular projection, each depth surface triangle can be selectively shifted to correct for the equirectangular projection.

BRIEF DESCRIPTION OF THE DRAWINGS

FIG. 4A illustrates an example randomized set of test points, according to one embodiment.

FIG. 4B illustrates an example evenly distributed set of test points, according to one embodiment.

FIG. 14A illustrates an example triangulation based on two triangulation rays, according to one embodiment.

FIG. 14B illustrates an example triangulation based on multiple triangulation rays, according to one embodiment.

FIG. 20 illustrates an example reprojection of overlap images to a reference image, according to one embodiment.

FIG. 21A illustrates an example order to refine the depth estimation of pixels of an image, according to one embodiment.

FIG. 21B illustrates an example pixel with proposals from neighboring pixels, according to one embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Architecture and Design

To effectively capture images of an environment for rendering views, an image capture system obtains images from a number of cameras that are positioned and oriented to increase the number of cameras having a view of any particular location in the environment. That is, an image capture system may be designed to increase the minimum number of cameras that may capture information about any given environment around the image capture system.

Figure 1:
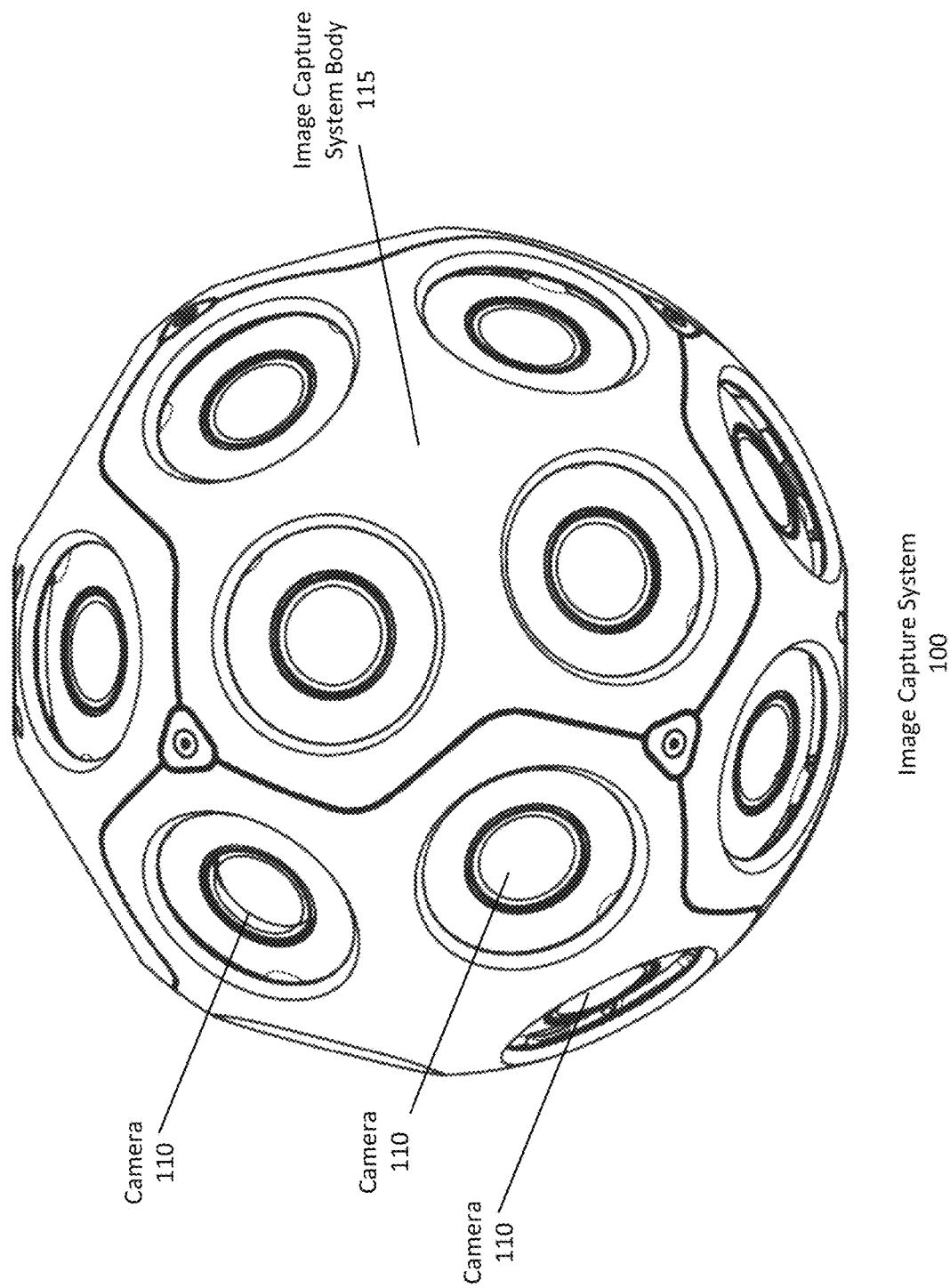
FIG. 1 illustrates an example image capture system, according to one embodiment.

FIG. 1 illustrates an example image capture system, according to one embodiment. An image capture system can be used to, for example, capture multiple images of a scene (for example, a physical environment in which an image capture system is located) from different viewpoints (from each camera's position) that can be processed to be later presented to a user via a head mounted display or other stereoscopic viewing display, and in some cases for presentation on a monoscopic display or other suitable system. For example, the captured images from an image capture system 100 can be used to generate a virtual reality version of a scene, to render a 360 degree images of a scene from one or more points of view, or to generate any other suitable view of a scene. Image content captured by an image capture system 100 can be associated into image sets comprising a simultaneously (or substantially simultaneously) captured image or video frame from each camera of the image capture system 100. In some embodiments, the images captured by the image capture system 100 captures images of the environment in a full panoramic, 360-degree view of the scene in which it is located. The image capture system 100 of FIG. 1 includes a plurality of cameras 110 mounted to the image capture system body 115 of the image capture system. Each camera captures a field of view ("FOV") representing the portion of the environment captured by the sensor of the camera. By analyzing the images from each camera, panoramic views of the environment may be generated for the environment.

Each camera 110 can be a still or video camera capable of capturing image data about the scene through an image sensor of the camera. Each camera 110 can have a defined or variable angle of view ("AOV"), for example based on a lens of the camera 110. An angle of view represents the angle through which the lens of a camera 110 can direct light into the image sensor of the camera 110 capture image data, therefore determining how wide or narrow the field of view of the camera 110 is. For example a camera 110 can have a wide angle lens with a high AOV (for example a fisheye lens), alternatively a camera can have a telephoto lens with a comparatively low AOV. In some embodiments, each camera 110 is similar or identical, for example having an identical focal length to each other camera 110. In other embodiments, different cameras 110 can vary, comprising different lenses, sensors, or focal lengths from other cameras 110 of the image capture system 100, for example a camera pointed vertically can be distinct from the other cameras 110 of the image capture system 100. In some embodiments, the cameras of the image capture system 100 are globally synchronized to capture images and/or video at the same time, for example using a global shutter to improve performance for capturing fast moving objects. The cameras 110, according to the embodiment of FIG. 1, are supported and positioned by the image capture system body 115.

When designing an image capture system 100 the position and orientation of the cameras 110 can be determined to maximize the field of view coverage of the environment by the cameras 110. The positioning of the cameras in the image capture system body 115 describes the location of a cameras with respect to the image capture system body 115, while an orientation of a camera describes the rotation of the camera and affects the portion of the environment viewed by the camera. Similarly, the lens characteristics of a camera can describe the AOV of the camera, centering of the lens on the image sensor, and the distance of the lens plane from the image sensor of the camera 110. A "camera configuration" can collectively describe the position, orientation, and lens characteristics of a camera 110, enabling the determination of the FOV of the camera. Similarly, the configuration of the image capture system includes configurations for each camera 110.

According to some embodiments, optimal camera positions for the image capture system 100 are determined to "evenly" distribute the cameras in the image camera system body 115. This positioning may be determined by modeling the positions of the cameras as having a cost or "energy" reflecting the closeness of the cameras to one another. For a camera close to other cameras, this camera may have a relatively high cost or energy, suggesting the camera should be moved to reduce the energy. In some implementations, camera positions for the image capture system 100 are determined by modeling each camera in a Thomson problem for the system. The Thomson problem can be solved to determine the optimal positioning of a given number of cameras 110 around a spherical body. The Thomson problem can be solved by assigning each camera 110 an energy inversely proportional to the pairwise distances between that camera 110 and each other camera 110 in the image capture system 100. Then the energy of the entire system can be minimized (for example, iteratively using a non-linear solver), resulting in the optimal camera positions for the image capture system 100. Then, the camera orientations can be determined to maximize the image coverage of the surrounding environment.

Figure 2:
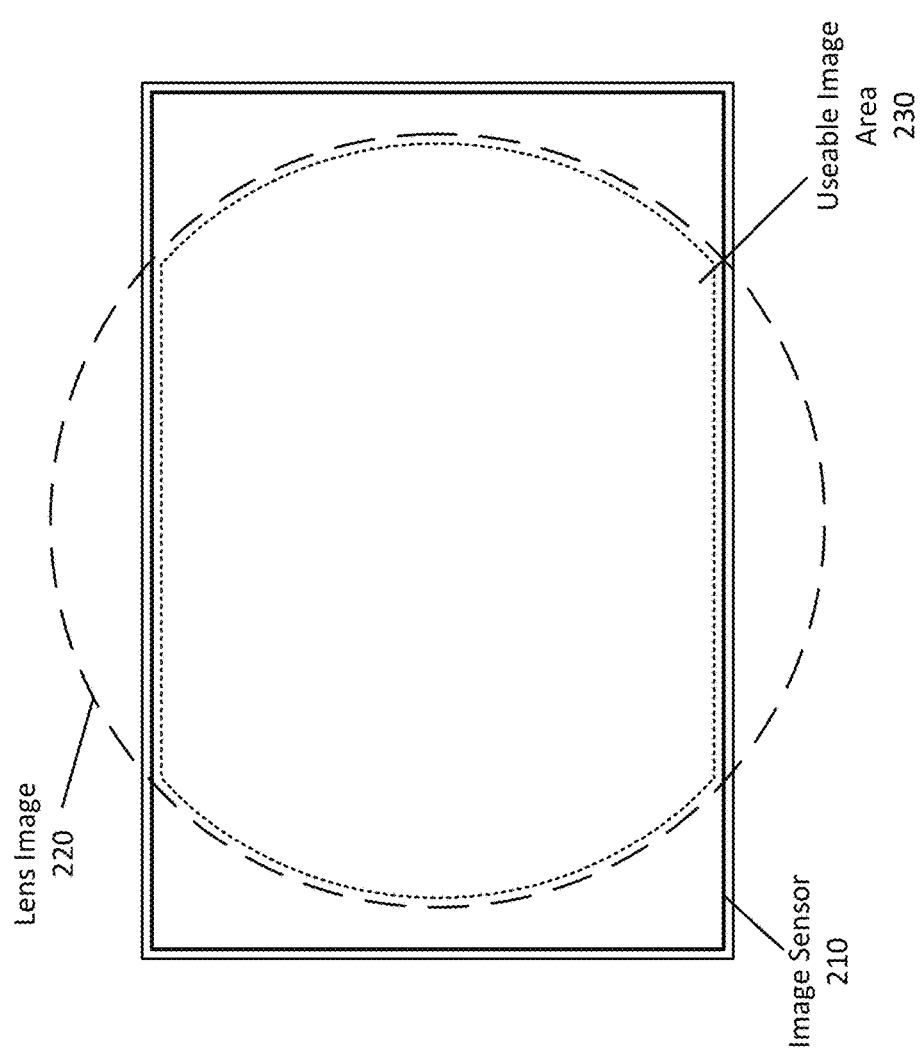
FIG. 2 illustrates the useable image area of a camera sensor, according to one embodiment.

FIG. 2 illustrates the useable image area of a camera sensor, according to one embodiment. The environment of FIG. 2 comprises an image sensor 210 of a camera 110, a lens image 220 projected on the image sensor 210 by light passing through the lens, and a corresponding useable image area 230 of the image sensor 210 where the lens image 220 intersects with the image sensor 210. In some embodiments, a lens of a camera 110 casts a lens image onto the image sensor 210, allowing the image sensor 210 to capture images for use in the image capture system 100.

An image sensor 210 captures light on a series of pixels of the image sensor 210 in a raw image format from which an image can be generated. For example, the image sensor 210 of FIG. 2 comprises a rectangular grid of pixels able to capture light from a lens image 220 projected onto the image sensor 210. In some implementations the lens image 220 projected by a lens of a camera 110 does not precisely align with the image sensor 210. The area of the image sensor 210 on which the lens image 220 is projected can be referred to as the useable image area 230. However, in some embodiments, such as the embodiment of FIG. 2, the useable image area 230 does not extend to the entire image sensor 210. Therefore, some pixels of the image sensor 210 outside of the useable image area 230 do not carry useful image data. In some embodiments, the raw image is cropped to remove unusable sections of image, but in other embodiments, the full raw image can be used. Similarly, a lens image 220 can exhibit progressive distortion near its edges (for example caused by limitations in the design or manufacture of the lens itself), and therefore the quality and usability of the raw image data captured by the image sensor 210 can degrade towards the edges of the image sensor 210 and lens image 220.

When determining the field of view (and therefore coverage area) of a given camera 110 (for example based on the camera configuration of the camera 110), the degradation of image quality and therefore coverage towards the edges of the raw images captured from the image sensor can be accounted for by applying an image coverage gradient to an expected captured image. Even where the image quality does not degrade, or does not degrade significantly, an image coverage gradient may be applied to permit orientation of the camera to partially effect calculated coverage of a pixel. As discussed below, this may improve differentiation of the coverage function for a camera and improve a solver (e.g., a non-linear solver) calculating how changes in orientation affect the view of points in the environment.

Figure 3A:
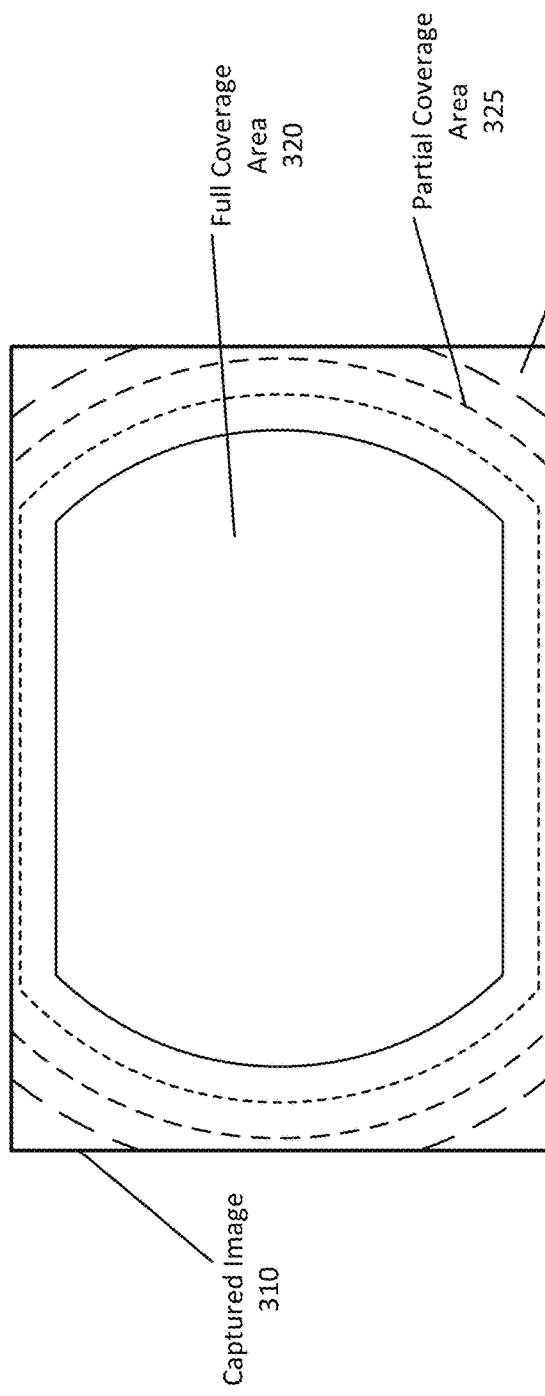
FIG. 3A illustrates the estimated coverage area of an image, according to one embodiment.
Figure 3B:
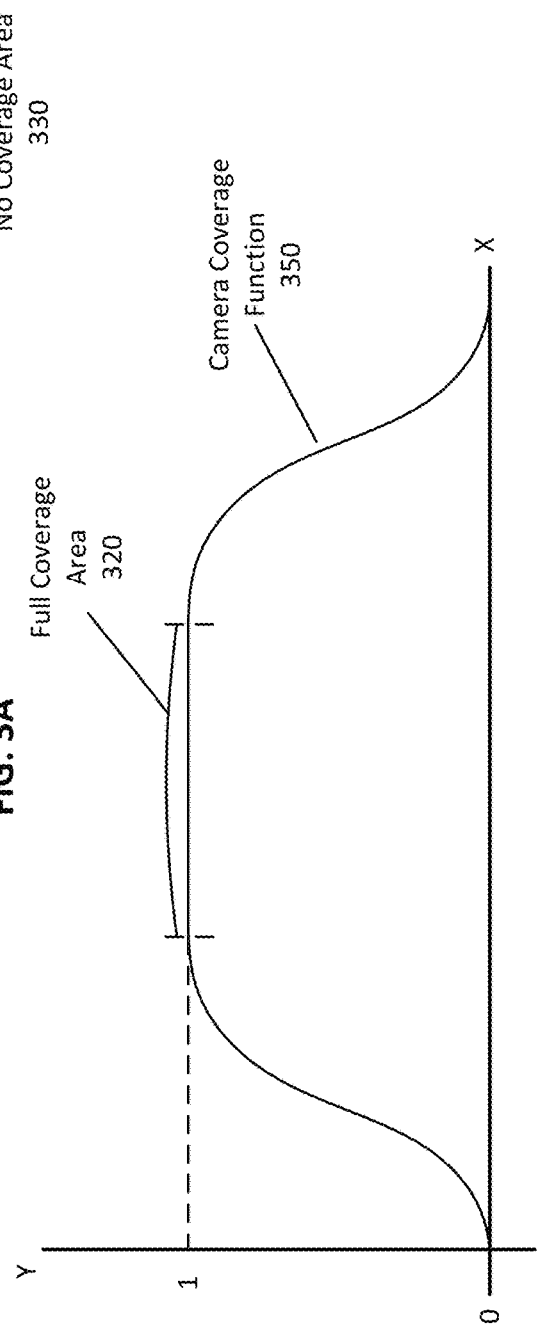
FIG. 3B is a graph illustrating an example camera coverage function for a camera, according to one embodiment.

FIG. 3A illustrates the estimated coverage area of an image, according to one embodiment. The example captured image 310 of FIG. 3A comprises full coverage area 320 which slowly degrades through a partial coverage area 325 to a no coverage area 330. According to some embodiments, the estimated coverage of a captured image 310 can be set to reflect the (typically) degrading quality of the image towards the edges of the captured image 310. Similarly, FIG. 3B is a graph illustrating an example camera coverage function for a camera, according to one embodiment. The graph of camera coverage function 350 of FIG. 3B comprises a full coverage area 320 which slowly tapers off towards the edges of the frame. In some implementations, a sigmoid curve is used to model the camera coverage function for a camera 110 of the image capture system 100.

To compare different possible camera orientations, a coverage scoring function can be generated to score camera orientation configurations, where a camera orientation configuration comprises the orientation of each camera 110 of the image capture system 100. A coverage scoring function is a measure of the camera coverage of the environment by an image capture system with a given configuration. According to some embodiments, the field of view (that is, the portion of a scene that would be visible in an image captured from a camera 110) for each camera 110 of the image capture system 100 can be estimated from the camera orientation configuration. This field of view may be determined with respect to a set of test points in the environment, which may be evenly distributed or generated to have some random perturbations. The test points having random perturbations may be generated randomly or semi-randomly as discussed below.

To calculate the coverage scoring function for a given camera orientation configuration, the configuration can be evaluated with respect to the set of test points and scored based on the amount and quality of coverage of the test points of the set. Based on the results of the coverage scoring function, the camera orientation configuration can be iteratively adjusted until an optimal camera orientation configuration is determined from the prior camera orientation configuration.

FIG. 4A illustrates an example randomized set of test points, according to one embodiment. In some implementations, a random or semi-random set of test points is employed to avoid iterative improvements overfitting the camera configuration to the specific set of test points. The set of randomized test points can be re-generated between iterations to avoid overfitting, according to some embodiments. The test point set 400 of FIG. 4A comprises a plurality of test points 410 distributed around a spherical shell. In some embodiments, each test point set 400 comprises approximately 3000 test points 410. To generate a set of semi-random test points, first a set of random points are generated. Each test point 410 is assigned an energy based on its proximity to other test points. For example, the energy of each test point in one embodiment is inversely proportional to the distance from that test point to nearby test points. The highest energy test points, that is, the test points most closely clustered with its neighbors can then be eliminated and replaced with new random test points until the maximum energy of any test point 410 is reduced below a threshold level, or based on any other suitable criteria being met. In one example, several test points are eliminated at once, for example test points that exceed the threshold level.

FIG. 4B illustrates an example evenly distributed set of test points, according to one embodiment. A spherical Fibonacci lattice distribution (or Fibonacci spiral distribution) is an example of an evenly-distributed set of test points. The Fibonacci lattice set 450 of FIG. 4B comprises a plurality of Fibonacci lattice points evenly distributed in a Fibonacci lattice. In some embodiments, the evenly-distributed test points, such as a Fibonacci lattice set, is used in an evaluation of a camera orientation configuration. In other embodiments, various other mathematically-generated or evenly-distributed points are used.

Figure 5:
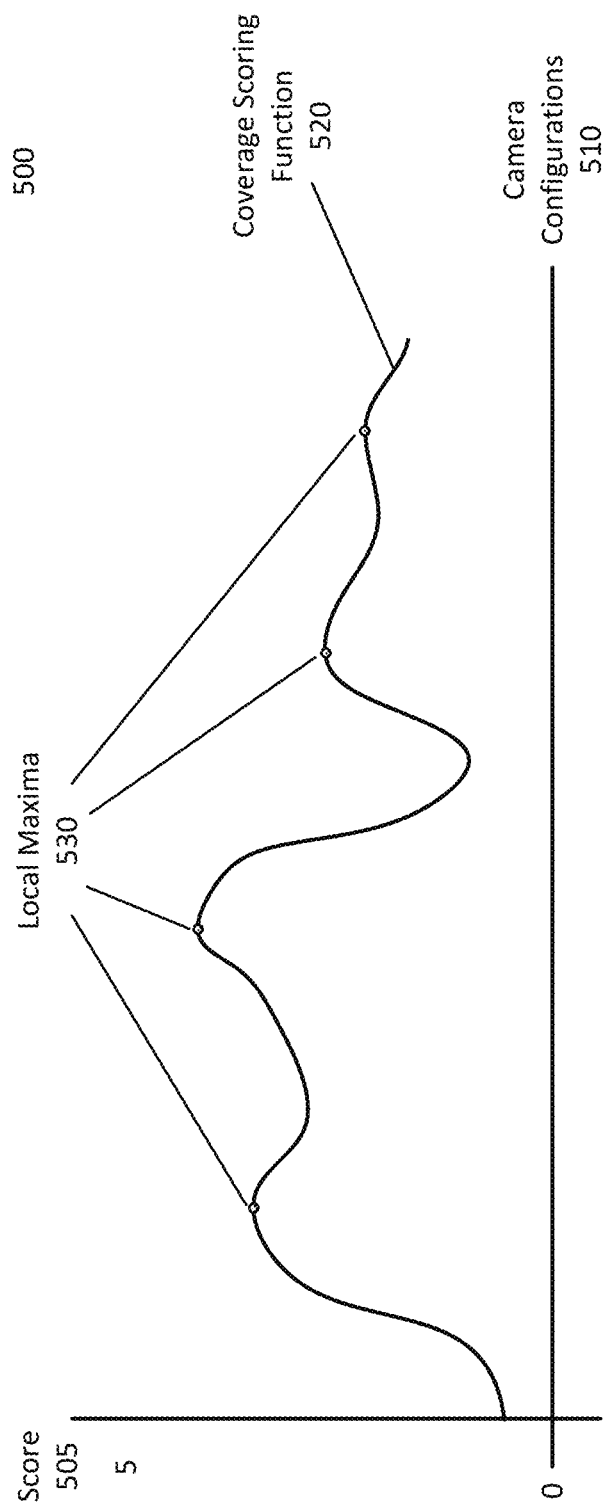
FIG. 5 is a graph illustrating an example coverage scoring function, according to one embodiment.

FIG. 5 is a graph illustrating an example coverage scoring function for a given set of test points, according to one embodiment. The graph 500 of FIG. 5 plots an example coverage scoring function 520 score 505 over different possible camera configuration 510. The coverage scoring function has a plurality of local maxima 530 and is a complicated, possibly nonlinear function. The graph 500 is an abstraction of a general coverage scoring function representing orientation configurations of the cameras 110 in a large number of various possible orientations. Thus, in some embodiments, a similar graph to accurately represent the degrees of freedom of the configurations would include many more dimensions, or be otherwise difficult to generate.

In some embodiments, the coverage scoring function 520 is determined to measure and maximize the minimum coverage of cameras for any given test point. That is, for the test points, the coverage scoring function 520 may measure the minimum number of cameras viewing any given test point. For a given camera orientation configuration and test point set, each test point of the test point set can be evaluated for coverage by determining if that test point would be visible in an estimated image from each camera 110 and where in the estimated captured image 310 that test point would fall (i.e. the estimated coverage 350 of that point in the image ranging from 1-0), according to some implementations. The camera coverage functions 350 as shown in FIG. 3 and discussed above may thus be used to score the value of the view of a test point from a given camera, and may prefer a view of a test point that is more central to a camera. In addition, the camera coverage function 350 may improve the ability of a nonlinear solver (or other suitable solving method) to evaluate and improve the camera orientations by providing differentiable coverage functions for the test points with respect to changes in camera orientation.

In some embodiments, the estimated coverage for each camera for a test point can be summed, resulting in a coverage number for each test point representing the number of cameras 110 in which the test point is in the camera's FOV. In some implementations, the coverage number is then rounded down to the nearest integer and the minimum coverage number in the test point set is selected as the result of the coverage scoring function for the test point set, though the coverage numbers can also be averaged or otherwise weighted according to other embodiments. In some embodiments, a decimal is appended to the rounded coverage numbers to provide a secondary score representing the percentage of test points having greater than the minimum coverage number. For example, a coverage scoring function of 3.75 can represent a minimum coverage of 3, i.e. at least 3 cameras 110 can see any given test point, with 75% of test points having a coverage greater than 3. The second score may also improve performance of the nonlinear solver (or other suitable iterative optimization method) by providing a means to evaluate an orientation's partial coverage towards the next highest number of minimum cameras viewing all test points.

According to some implementations, multiple camera orientation configurations are simultaneously generated and iteratively improved, as the coverage scoring function 520 for a given system can generally be assumed to have multiple local maxima 530. Starting with several disparate (for example, randomly generated) camera orientation configurations can allow the optimization process to be optimize camera orientation configurations to different local maxima 530 of the coverage scoring function 520, out of which the most efficient camera orientation configuration can be chosen (that is, the configuration at the "best" local maxima). To optimize the coverage scoring function for a given initialization, any suitable method, for example a nonlinear solver, can be used. Thus, in this example the nonlinear solver may optimize the orientation configuration of the cameras jointly using the camera coverage function 350 reflecting the quality (or centrality) of the coverage of a test point for a camera 110 and to optimize the scoring function that maximizes the minimum number of cameras viewing the test points (e.g., the coverage scoring function 520).

Figure 6:
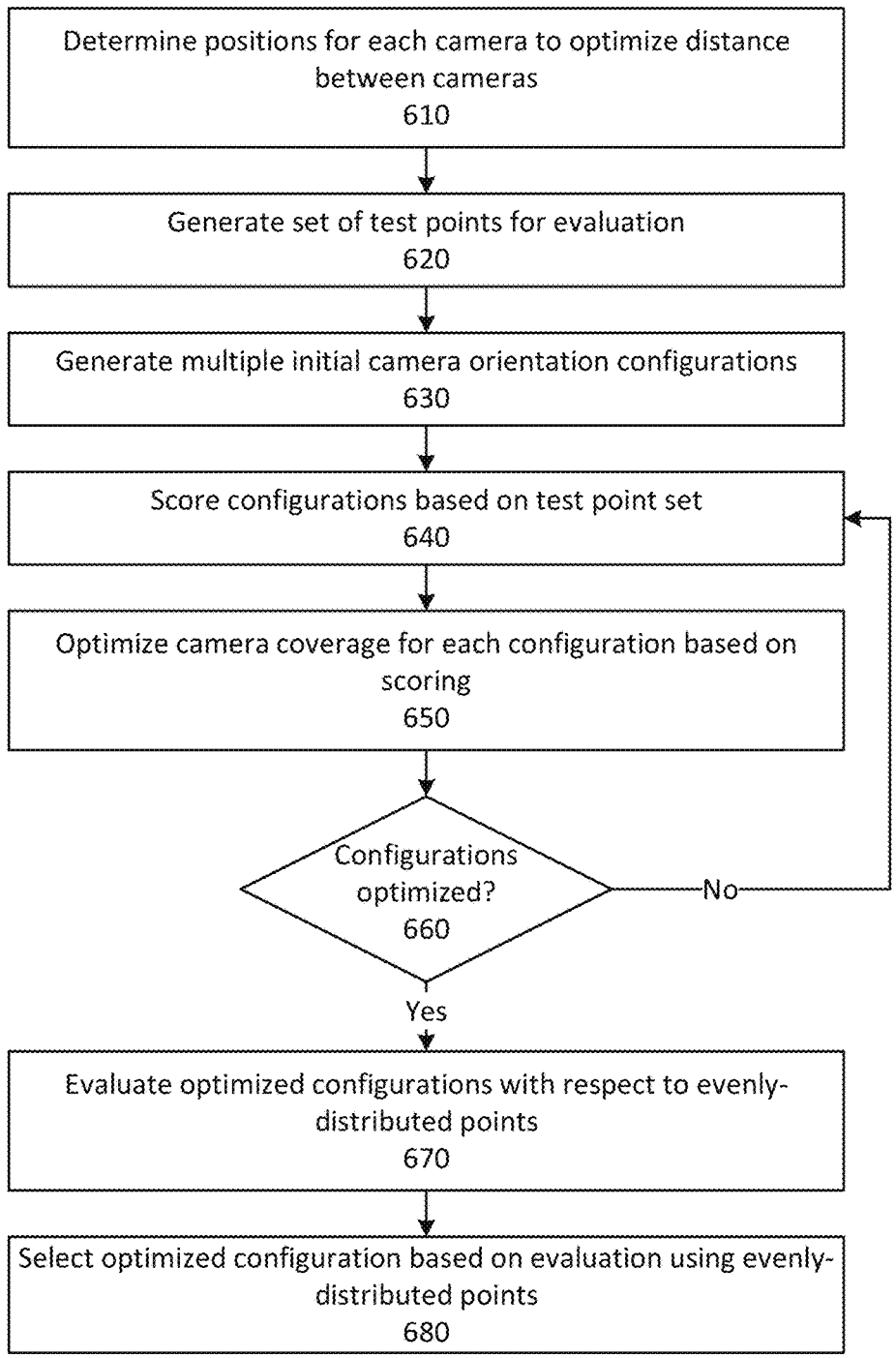
FIG. 6 is a flowchart illustrating an example process for selecting camera position and orientation according to one embodiment.

FIG. 6 is a flowchart illustrating an example process for selecting camera position and orientation according to one embodiment. The process 600 begins by determining 610 camera positions to optimize the distance between cameras, for example by solving the Thomson problem for the desired number of cameras in the image capture system. Then, a set of test points are generated 620 against which to evaluate the coverage of the camera orientation configuration. For example, the test points can be generated semi-randomly, randomly, or optimally (for example, using a Fibonacci lattice set). Next, a set of camera orientation configuration are initialized (generated 630) and scored 640 with respect to the generated test point set. For example, each camera orientation configuration can be evaluated based on a coverage scoring function accounting for the minimum number of cameras in which any given test point will be visible in. The configurations are optimized 650 to improve the scoring for each camera orientation configuration, for example, based on the coverage scoring function. This optimization may use a nonlinear solver as discussed above. Once each configuration is optimized 660, the final camera orientation configurations are evaluated 670 using the coverage scoring function based on an evenly-distributed test point set, such as a Fibonacci lattice set. The highest-scoring camera orientation configuration can then be selected 680 based on the evenly-distributed test point set and used to design and manufacture the image capture system 100. Based on the determined camera positions and orientations, the image capture system 100 can be manufactured.

Image Processing System Overview

When cameras are positioned and oriented, the camera system may capture images for use in rendering views of an environment. To do so, the camera system may calibrate the manufactured cameras, process images captured from the cameras, determine depth maps associated with the captured images, and use the depth maps in rendering views of the environment.

A depth map describes the estimated depth of the pixels in an image. In captured images, there may be many different objects at different locations in the image, such as nearby objects, distant objects, and objects in between. The depth map may specify a depth for each individual pixel of the image, or may provide a depth estimate for groups or blocks of pixels in the image (for example, when the depth map is lower resolution than the associated image). Typically, depth may be stored inversely to the depth distance, such that distances in the far distance (approaching infinity) are stored as values approaching 0. For example, the depth may be stored as 1/d, such that a distance of 50 m is stored as 1/50 or 0.02, and a distance of 1 km is stored as 1/1000. This provides a large range of values for close depths which may be more important to distinguish.

Figure 7:
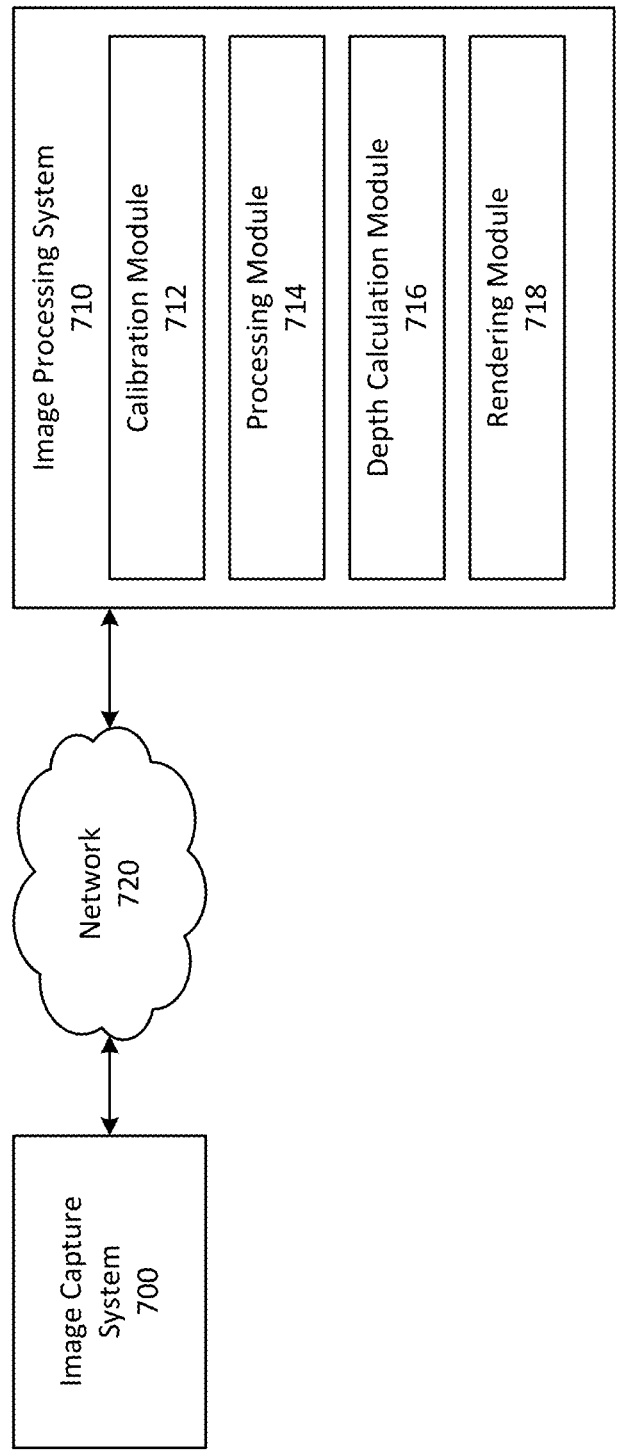
FIG. 7 is a block diagram illustrating an example computing environment in which an image capture system operates.

FIG. 7 is a block diagram illustrating an example computing environment in which an image capture system operates. The environment of FIG. 7 comprises an image capture system 100 and an image processing system 710 connected by a network 720.

The image capture system 100 can be any suitable image capture system capable of capturing images of a scene to be processed and combined. According to some embodiments, the image capture system 100 is connected to an image processing system over the network 720, and can receive instructions (for example, instructions to capture or transmit previously captured images), and transmit information (such as raw or processed image data and/or metadata) to the image processing system 710 over the network 720. For example, as described above, an image capture system 100 can be used to, for example, capture images to render a version of a captured scene, or to render a 360 degree image of a scene. In other embodiments, the image capture system 100 can be any suitable system to capture images of a scene.

The network 720 can be any suitable network or communication method. For example, the network 720 can be any suitable wired or network, and can be a local area network (LAN), wide area network (WAN), the Internet, or any other suitable network.

In the embodiment of FIG. 7, the image processing system 710 can be any suitable computing device capable of receiving and processing image data from the image capture system 100. For example, the image processing system 710 can be a laptop, desktop, mobile device, server, server group, or other suitable computing device. The image processing system 710 receives captured images from the image capture system 100, processes the received images, calculate depth maps for the processed images, and render output images from specific viewpoints to represent the scene based on the received images and the calculated depth maps (herein, a viewpoint represents a specific field of view, position, position and orientation of a camera or rendered image). For example, a final image can be any image depicting a scene so that the scene can be recreated in virtual reality or otherwise displayed to the user, for example a panoramic, spherical panoramic, or suitably wide angle image designed to be viewed through a head mounted display. The output image can be in cubemap, equirectangular, or cylindrical formats in resolutions such as "8 K" (for example 8192 by 8192 pixels). In addition, multiple views may be generated, such that one view is generated for each display corresponding to each eye of the user.

In the embodiment of FIG. 7, the image processing system 710 comprises a calibration module 712, processing module 714, depth calculation module 716, and rendering module 718. In some embodiments, the image processing system 710 or certain functionality of the image processing system 710 is integrated into the image capture system 100.

The calibration module 712 determines the position and orientation of the cameras 110 of the image capture system 100 to calibrate the actual position and orientation of the cameras as-manufactured compared to the intended position and orientation of the cameras as designed. The functionality of the calibration module 712 is discussed further below. Based on the calibration, the processing module 714 processes raw images received from the image capture system 100 to prepare the images for depth map calculation. For example, the processing module 714 can process raw image data received from the image capture system 100 into a processed and filtered RGB image (such as using a joint bilateral filter to reduce noise in the image). The depth calculation module 716 receives an image set of simultaneously captured images or synchronized video and calculate a depth map for each image of the image set or frame of video. The depth calculation module 716 is discussed in further detail below.

Finally, the rendering module 718 renders image sets or synchronized video (in some implementations with associated depth maps) into output images and or video for a user to view. The process for rendering an output image is discussed further below. In some implementations, the functionality of the rendering module 718 can be performed in real time or substantially in real time, and/or at a client device (such as at a head mounted display rendering the view) separate from the image processing system 110.

Figure 8:
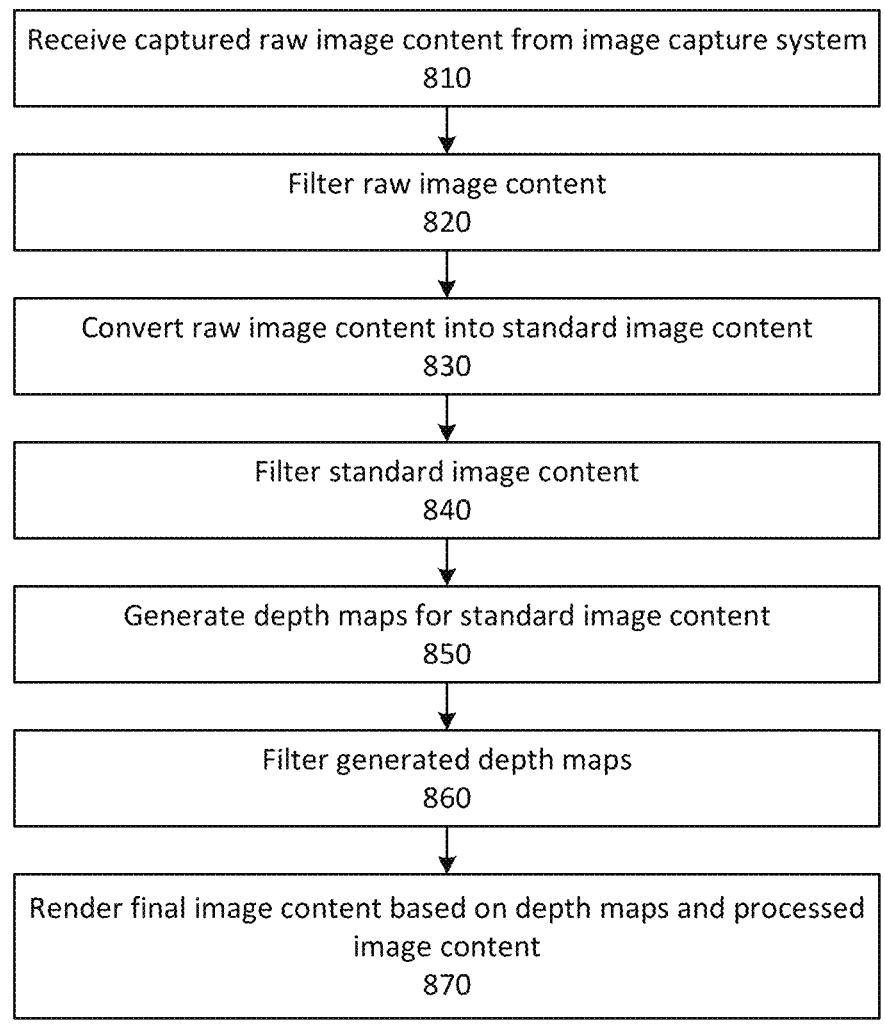
FIG. 8 is a flowchart illustrating an example process for capturing and using content in an image capture system, according to one embodiment.

FIG. 8 is a flowchart illustrating an example process for capturing and using content in an image capture system, according to one embodiment. The process of FIG. 8 begins after calibration of the image capture system, for example, as described below. The image capture system captures raw image content from the surrounding environment and sends the raw image content to the image processing system, where it is received 810 and stored. For example, the raw image content can be in the form of image sets in a raw image format (i.e. unprocessed or minimally processed data from the image sensors of the cameras 110 of the image capture system 100). The raw image content is then filtered 820 at the image processing system, for example for de-noising purposes, by a median filter, weighted median filter, bilateral filter, joint bilateral filter, or any other suitable edge aware filter. For example, image content and/or depth maps can be filtered using a joint bilateral filter with any suitable guide image. Similarly, one or more of the filters may have a time dependency, for example a joint bilateral filter with a 3D kernel requiring image data from adjacent frames of the image content. Then the image processing system converts 830 the filtered raw image content into standard image content. For example, standard image content can be a RGB raster image in a standard compressed or uncompressed image format, such as bmp, png, tiff, or any other suitable format. Next, the standard image content 840 is filtered, for example for de-noising purposes, by any suitable filter, and depth maps are generated 850 for each image of the standard image content. The process for generating a depth map based on image content is discussed in detail below. The generated depth maps can then be filtered 860, for example for de-noising purposes or to maintain the consistency of depth maps across multiple images. Finally, final image content is rendered 870 based on the depth maps and the processed image content. The process for rendering final image content will be discussed in greater detail below.

In some embodiments, the image processing system 710 processes and manages a large amount of data, including uncompressed raw image data, and stores the data in memory to be able to efficiently generate and filter depth maps and/or render final image content. Therefore, in some implementations, the image processing system 710 uses a "mark and sweep" system of memory management when processing and storing image content from the image capture system 100. For example, mark and sweep methods can be used when depth maps for many successive frames (each with an associated image set from the image capture system 100) need to be generated sequentially or when filters with a large time dependency (requiring image data from many successive frames) are used.

Figure 9:
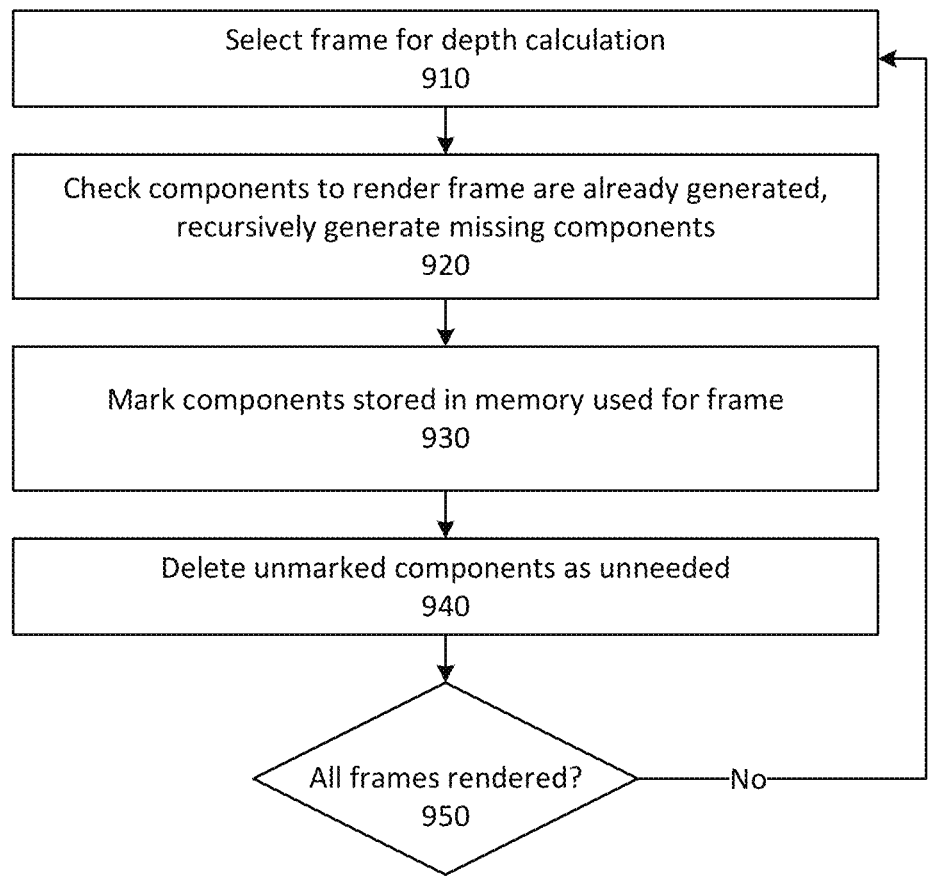
FIG. 9 is a flowchart illustrating an example process for storing and rendering image capture system content, according to one embodiment.

FIG. 9 is a flowchart illustrating an example process for storing and rendering image capture system content, according to one embodiment. The process of FIG. 9 begins when a frame is selected for a depth map calculation 910, for example, the first frame of a video clip captured by the image capture system to be rendered. Then, the image processing system 710 checks for components required for the depth calculation and makes a recursive call 920 to retrieve the end product of the depth calculation (for example, the filtered depth map). If the subject of the recursive call is not found, the process generates the subject, issuing further recursive calls for any component parts of the subject. For example, if the filtered depth map is not found, a recursive call is issued for the depth map, and when the depth map is returned, the filtered depth map is generated. Similarly, if the depth map is not found, recursive calls can be issued for the filtered images from several previous and future frames to generate the depth maps for the current frame (the additional time dependency may be cause by time-dependent filters used to generate the depth maps 1050). In some implementations, each recursive call "marks" or flags 930 any of the calculated components stored in memory. Other implementations mark 930 used components after the depth calculation (for example based on the current frame or any other suitable criteria). Finally, any unmarked (i.e. unused) components still stored in memory are "swept" or deleted 940 from memory and marks are reset. The process continues for the next frame in sequence if all frames are not completed 950. In some implementations, depth map calculations for a sequence of frames can be split between multiple image processing systems 710. To ensure temporal consistency between depth estimates calculated between the different image processing systems 710, information about additional buffer frames based on the total time dependency of the pipeline are required (that is, if an image processing system were to calculate the frames 0-50 of a sequence using a pipeline with a time dependency of 5, the image processing system may receive and use information for the frames 0-55 to calculate the needed section). In some embodiments, depth maps are calculated for the buffer frames (and potentially discarded), but in other embodiments information for the buffer frames is received and used at the image processing system 710 without calculating a depth map for the buffer frames.

Figure 10A:
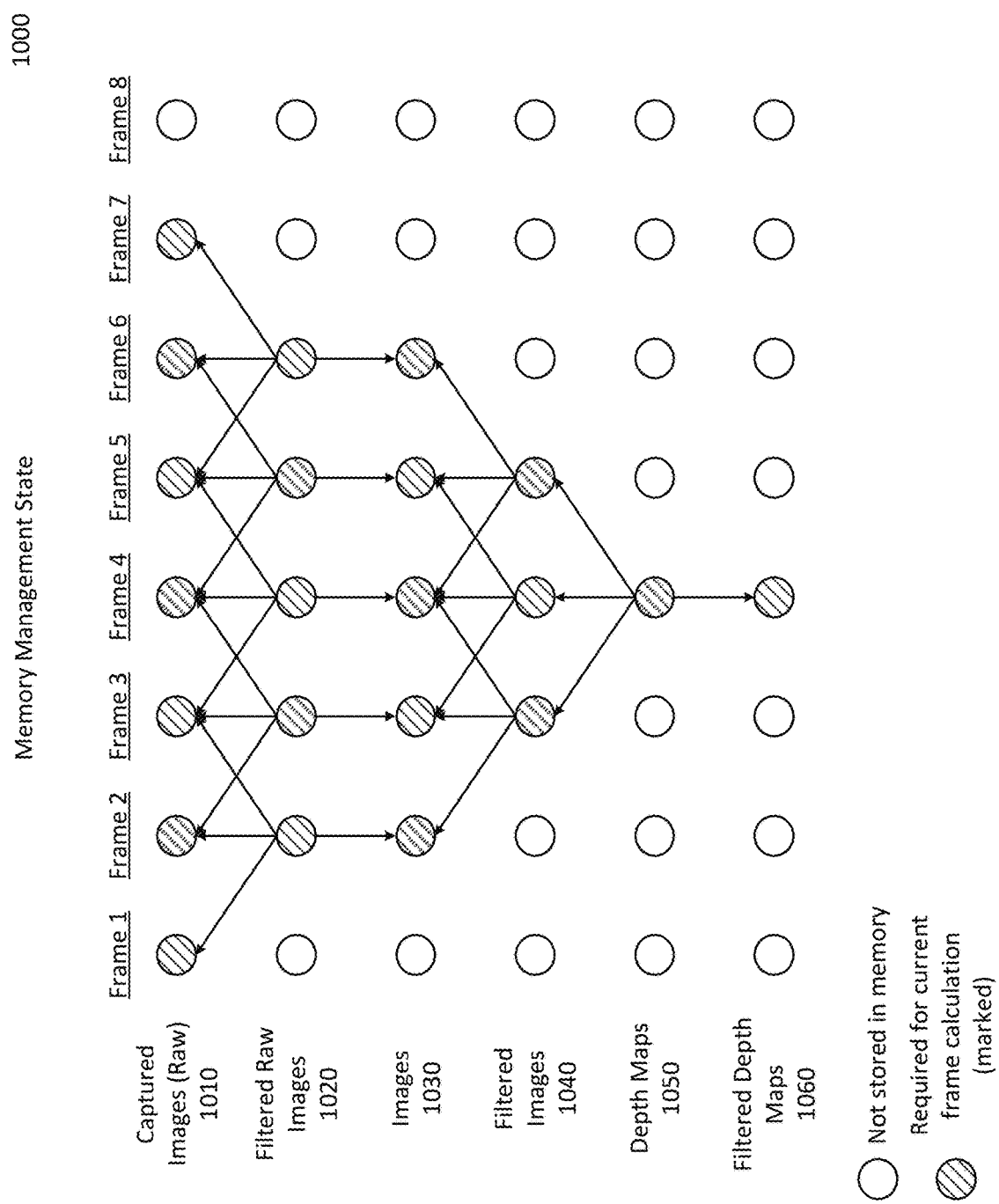
FIG. 10A illustrates example memory management state, according to one embodiment.

FIG. 10A illustrates example memory management state, according to one embodiment. The environment 1000 of FIG. 10A shows the state of memory after the calculation of a filtered depth map 1060 for frame 4. In the state 1000 the filtered depth map 1060 for frame 4, the depth map 1050 for frame 4, the filtered images 1040 for frames 4-6, etc. were required to calculate the filtered depth map 1060 and are therefore marked. During the following sweep step, each component stored in memory is found to be marked, and therefore all components stored in memory are retained, albeit with no marks. For example each recursive call can operate based on a similar process; a recursive call may first determine a set of precursor components needed to generate the subject component and check to if each precursor component is already in memory. Any precursor components already in memory are marked, and additional recursive calls are made to generate or retrieve any missing components. Then the subject of the recursive call can be generated based on the precursor components, and the recursive call returns (for example, to a parent recursive call).

Figure 10B:
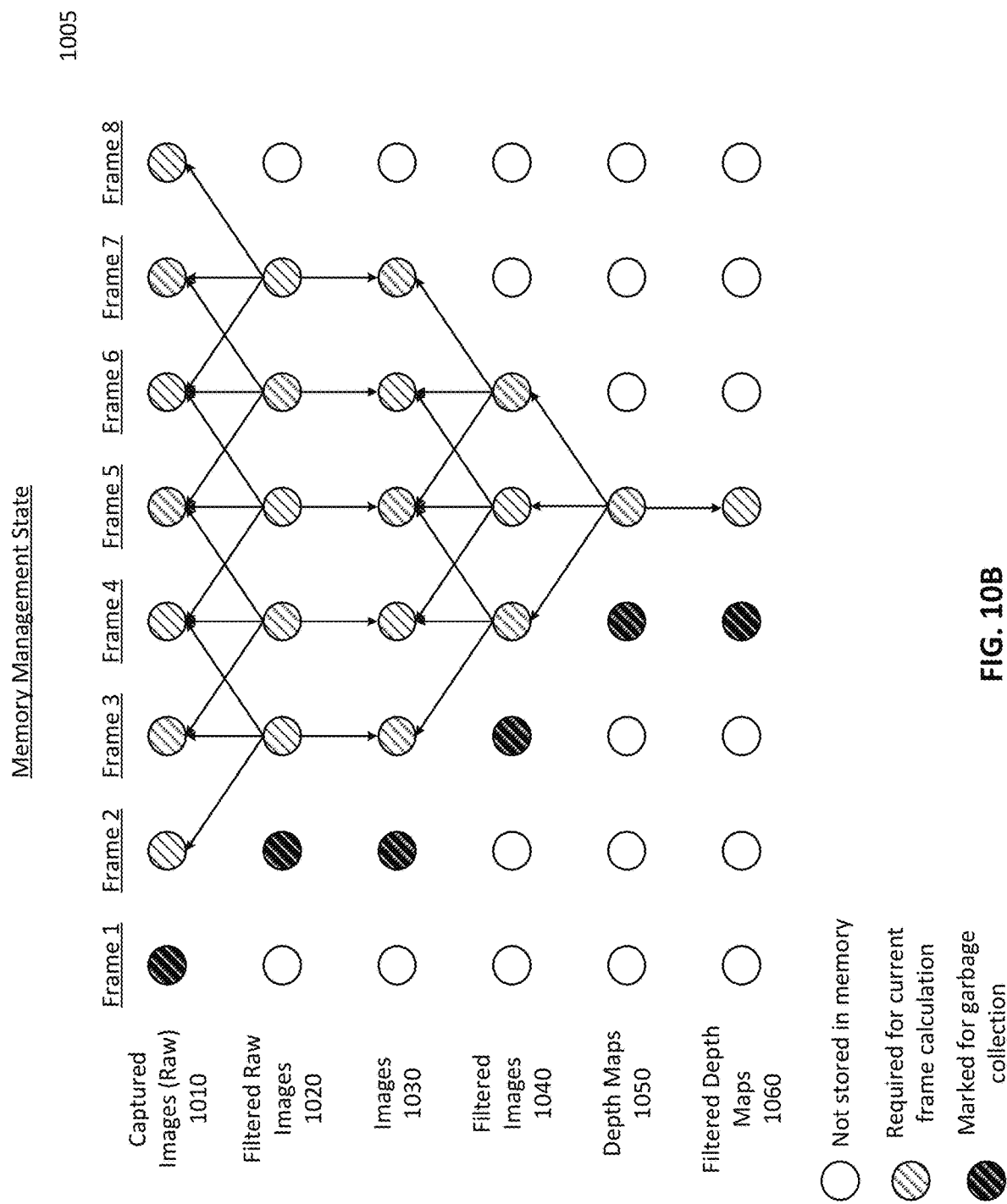
FIG. 10B illustrates a second example memory management state, according to one embodiment.

Moving to the next frame of calculation, FIG. 10B illustrates a second example memory management state, according to one embodiment. The environment 1005 of FIG. 10B shows the state of memory after the calculation of a filtered depth map 1060 for frame 5 (immediately after the calculation of the filtered depth map for frame 4 as depicted in FIG. 10A). In the new state 1005 the filtered depth map 1060 for frame 5, the depth map 1050 for frame 5, the filtered images 1040 for frames 5-7, etc. were required to calculate the filtered depth map 1060 for the new frame 5 and are therefore marked by virtue of that use. However, in this state 1005 several components used in the calculation for frame 4 were unused and remain unmarked, for example the filtered raw images 1020 for frame 2. During the following sweep step, each unmarked component stored in memory is removed from memory (though, in some embodiments, retained in long term storage) and the remaining (marked) components stored are retained in memory, albeit with no marks. In other embodiments, any suitable marking scheme can be used.

Image Capture System Calibration

Calibrating an image capture system 100 refers to determining the actual physical positions, orientations, and lens characteristics of the cameras 110 of a physical image capture system 100. ISE calibration is based on the expected configuration of the ICS as it was designed. However, in some implementations, small differences between image capture systems 100 (for example, due to manufacturing tolerances) mean that calibration is necessary to determine the correct positions and orientations of the cameras 110.

Figure 11:
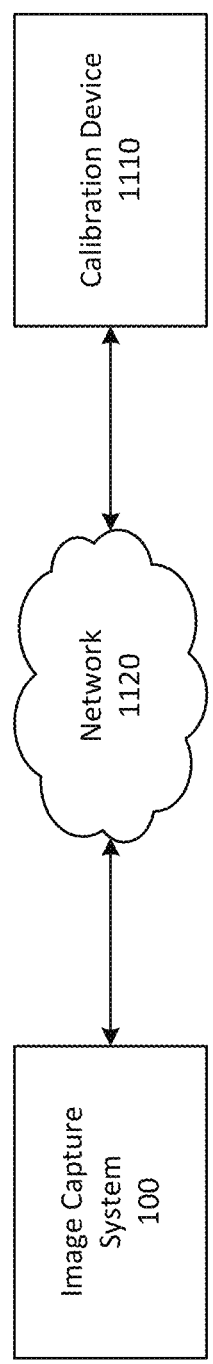
FIG. 11 is a block diagram illustrating an example computing environment in which in which an image capture system is calibrated, according to one embodiment.

FIG. 11 is a block diagram illustrating an example computing environment in which in which an image capture system is calibrated, according to one embodiment. The environment 1100 FIG. 11 comprises an image capture system 100 capable of capturing images, a calibration device 1110 to calibrate the image capture system 100, and a network 1120 connecting the calibration device 1110 to the image capture system 100. The image capture system 100 can be any suitable image capture system comprising multiple cameras with an expected position and/or orientation. For example, the image capture system 100 can be an image capture system such as the image capture system illustrated in FIG. 1 and associated description. The network 1120 can be any suitable network, for example the network 720 described above. According to some embodiments, the calibration system 1110 can be any suitable device, for example an image processing system 710 comprising a calibration module 712, or a separate suitable computing device. Thus, the calibration performed by the calibration device 1110 may also or alternatively be performed by the calibration module 712 of the image processing system 710.

Figure 12:
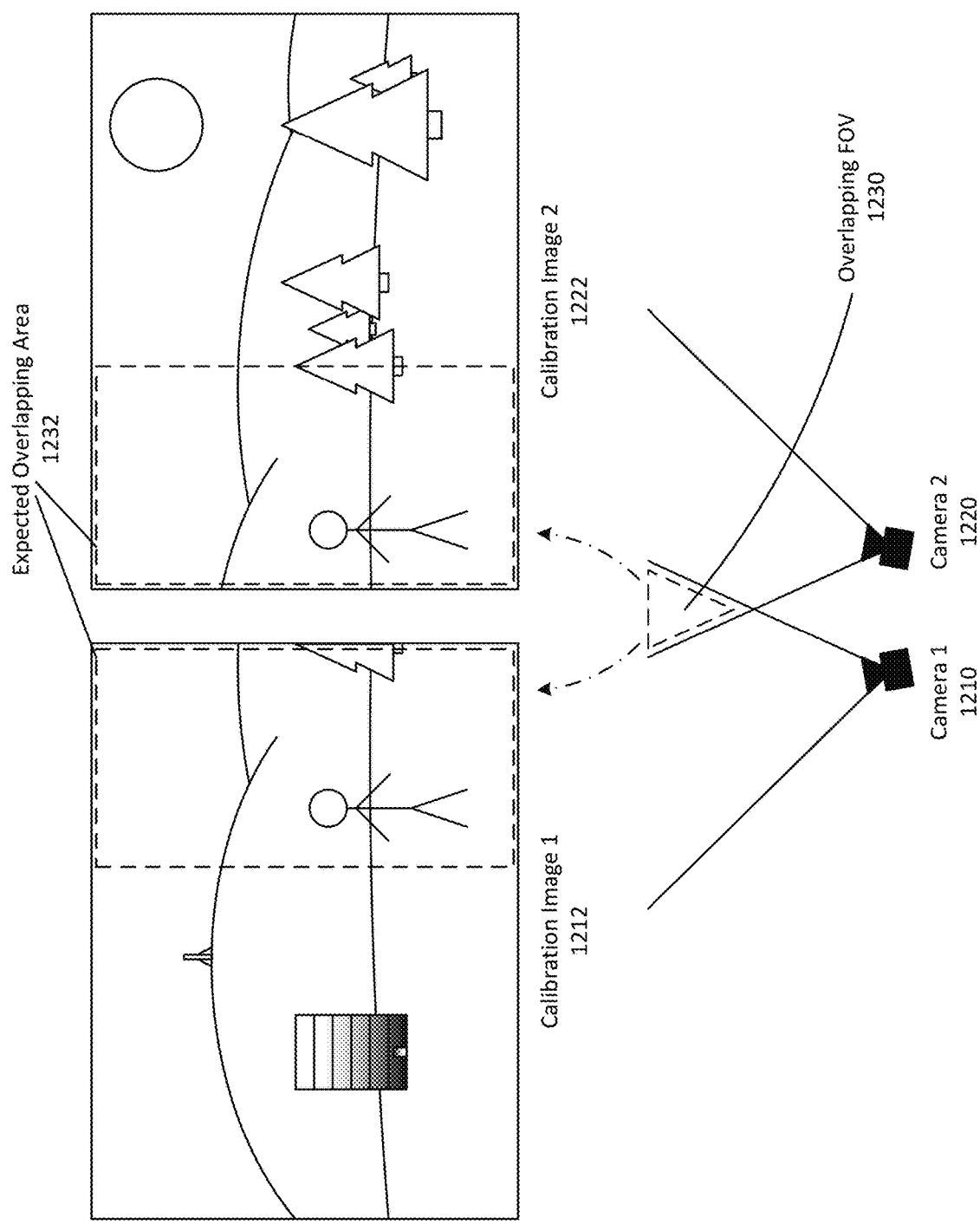
FIG. 12 illustrates an example scene captured from two overlapping cameras of an image capture system, according to one embodiment.

According to some embodiments, calibration of the image capture system 100 can occur based on a calibration set comprising single calibration images captured simultaneously from each camera 110 of the image capture system 100, for example of a scene in which the image capture system 100 is located. Using the calibration set and an initial calibration derived from the expected (but not necessary actual) position and orientation of each camera 110 the calibration device 1110 can determine the actual position and orientation of each camera 110 in the image capture system 100 and describe the position and orientation of the cameras using a set of calibration parameters for the cameras. FIG. 12 illustrates an example scene captured from two overlapping cameras of an image capture system, according to one embodiment. The environment of FIG. 12 comprises two cameras 1210 and 1220 with an overlapping field of view 1230 and calibration images 1212 and 1222 captured from the cameras with a corresponding overlapping area 1232. For example, the expected overlap between two cameras 1210 and 1220 can be determined based on the field of view of the two cameras according to the current calibration. In some embodiments, each of the cameras 1210 and 1220 are cameras of the image capture system 100 and are oriented such that the field of view of camera 1 1210 overlaps 1230 with the field of view of camera 2 1220; i.e. an object can be positioned in a scene such that the object will be captured in simultaneously captured images from both camera 1 1210 and camera 2 1220. Similarly, the calibration images 1212 and 1222 can be simultaneously captured calibration images from camera 1 1210 and camera 2 1220, respectively. In some embodiments, the expected overlapping area 1232 can correspond to the overlapping field of view 1230 of the cameras 1210 and 1220.

Figures 13A, 13B:
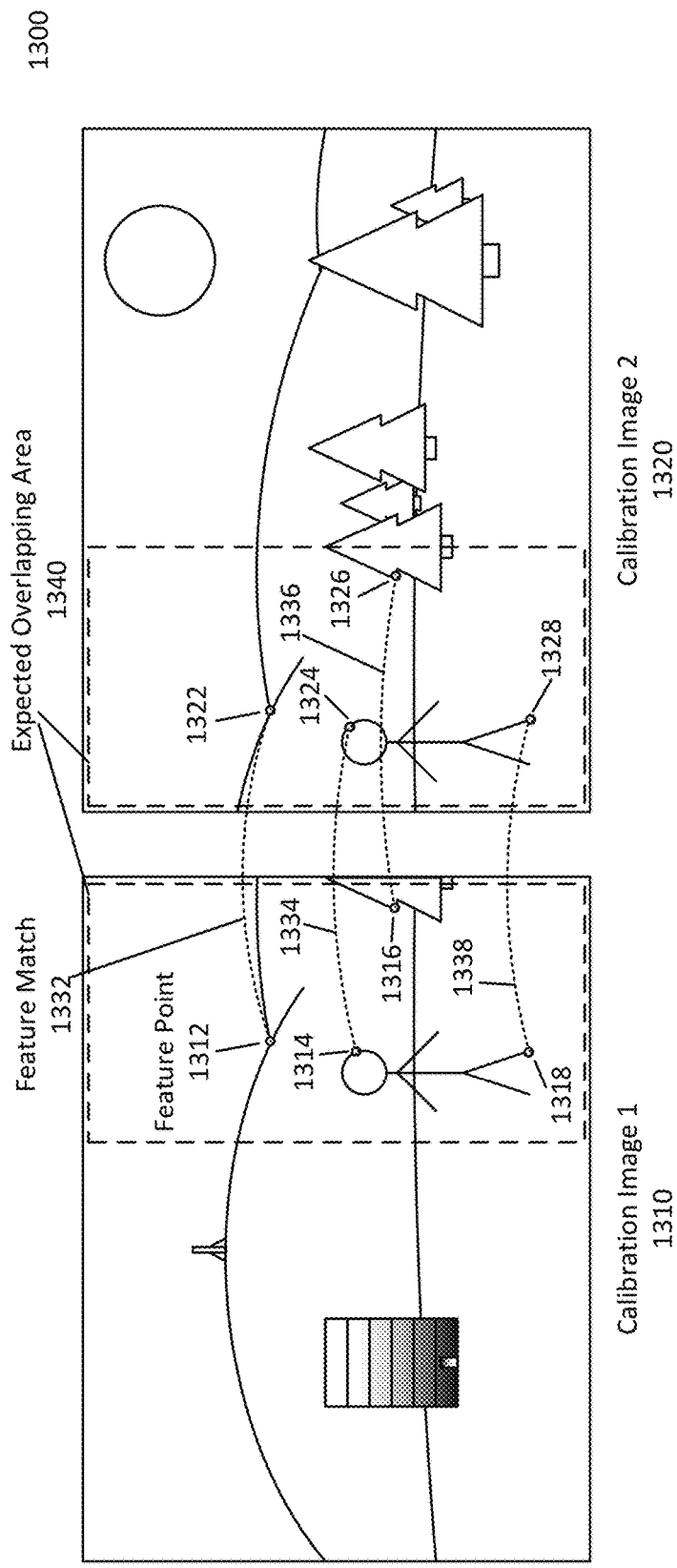
FIG. 13A illustrates example matched feature points between two images of an example scene, according to one embodiment.
FIG. 13B illustrates an example list of matching feature points, according to one embodiment.

To calibrate an image capture system based 100 on a calibration set the calibration device 1110 can first attempt to identify objects visible in multiple images of the calibration set by identifying and matching feature points in common between images. FIG. 13A illustrates example matched feature points between two images of an example scene, according to one embodiment. The environment 1300 of FIG. 13A comprises calibration images 1310 and 1320 expected to overlap at the expected overlapping area 1340, where each calibration image 1310 and 1320 is associated with a set of feature points, 1312-1318 and 1322-1328 respectively, and a set of feature matches 1332-1338.

Initial identification of matching feature points across the images of the calibration set can occur by any suitable method. According to some implementations, a feature matching algorithm, for example COLMAP, ORB, or any another suitable feature matching algorithm, can be used to generate an initial feature set. In some implementations, for example implementations using COLMAP to generate the initial feature set, initial feature identification operates over the entire calibration set, independent of the current calibration of the image capture system 100. For example, the feature matching algorithm can determine and return a set of pairwise features (that is, features matching between two images of the calibration set), even for calibration images associated with cameras not expected to overlap based on the expected calibration of the image capture system 100. Initial feature identification can return a numbered list of features (each associated with a coordinate point in the calibration image) for each calibration image of the calibration set as well as a list of feature matches between images of the calibration set. FIG. 13B illustrates an example list of matching feature points, according to one embodiment. The table 1350 of FIG. 13B comprises feature matches between the feature points 1312 and 1322, 1314 and 1324, 1316 and 1326, and 1318 and 1328.

According to some implementations, the initial feature set can comprise many false positive (or seemingly false positive) features, for example matching features between calibration images not expected to overlap based on the initial calibration or matching features in regions of calibration images not expected to overlap, even if other areas of those calibration images are expected to overlap. Therefore, each initial feature match can be compared to the expected overlapping areas of each calibration image. If the initial feature match falls outside of an appropriate overlapping area, that feature match can be discarded. As discussed above, expected overlap can be calculated based on the current calibration information of the image capture system 100 (for example based on current knowledge of the position, orientation, and lens characteristics of each camera 110). For example, an initial feature match between the calibration image 1310 and the calibration image 1320 of FIG. 13A would be discarded if either feature of the match was outside of the expected overlapping area 1340. Based on current knowledge of the image capture system 100 calibration, this step can reduce false positive matches. Thus, the set of feature matches after removing "impossible" matches can be determined (hereinafter, the "possible match set").

Next, each remaining feature match of the possible match set can be triangulated to associate the feature match with a specific position in 3D space. For example, a feature match can be triangulated by calculating an estimated point in 3D space based on the location of the feature point in the view and the location of calibration of the cameras in which the point appears. For example, the 3D point may be triangulated from rays originating at the camera in a direction based on the camera calibration and the position of the feature in the image. FIG. 14A illustrates an example triangulation based on two triangulation rays, according to one embodiment. The environment 1400 of FIG. 14A comprises two triangulation rays 1405 originating from the 3D ray origins 1410 which are estimated to pass in close proximity at the closest points 1415, resulting in the estimated 3D feature location at 1420. FIG. 14B illustrates an example triangulation based on multiple triangulation rays, according to one embodiment and is discussed further below.

To triangulate a feature match, first a triangulation ray 1405 is calculated for each feature in the feature match. For example, the feature points 1318 in calibration image 1310 and 1328 in calibration image 1320 are matched in the example of FIG. 13. Therefore, a triangulation ray 1405 is calculated for each of the feature points 1318 and 1328. The origin point 1410 of each triangulation ray 1410 is calculated based on the position (i.e. the known position according to the current calibration of the image capture system 100) of the associated camera 110. For example the 3D ray origin of the triangulation ray 1405 associated with the feature point 1318 can be based on the position of camera 1 1210 (camera 1 1210 is assumed to have captured the calibration image 1 1310). In some implementations the 3D ray origin is simply set to an origin point of the appropriate camera, but embodiments can also take into account the position on the image sensor where the pixel associated with the feature point is located.

After the ray origin 1410 is determined, the direction of each triangulation ray can be determined based on the location of the feature point within the calibration image. Each pixel in a calibration image captured by a camera 110 can represent a ray of light passing through the lens of the camera 110 and striking the image sensor of the camera 110 in a location corresponding to that pixel. Based on known information about the camera 110 (i.e. the known position, orientation, and lens characteristics of the camera 110 according to the current calibration of the image capture system 100) this ray can be calculated and reversed to become a triangulation ray pointing from the relevant image sensor location towards the point in 3D space assumed to have generated that ray.

Once the triangulation rays 1405 corresponding to each feature point of the feature map are calculated the points can be triangulated. Ideally, all the triangulation rays 1405 for the feature map would intersect at the precise 3D location of the feature 1420, in practice, however, this is unlikely to occur even if the feature match does represent an accurate match for the same feature visible across multiple calibration images. For example, rounding error, errors in the calibration of the image capture system 100 (for example, an error in the actual orientation of a camera 110 can skew the direction of a triangulation ray 1405 associated with that camera), or other minor errors cause triangulation rays 1405 not to perfectly intersect. In addition the feature match may not be a true match, i.e. the feature match can be between similar-looking areas of separate objects (for example a match between two distinct but similar looking blades of grass) or due to a bug or oversight in the generation of the initial feature set. Therefore, the "closest" location between the triangulation rays 1405 can be calculated to determine the estimated 3D feature location 1420. In some embodiments the estimated 3D feature location 1420 is simply the average of the closest points 1415 on each triangulation ray 1405, but any suitable triangulation method can be used.

For example, a calibration module 712 can triangulate an estimated 3D position by first solving a system comprised of equations of the form $\vec{p}_0/t_0 + \vec{d}_0 \approx \vec{x}/t_0$ for each triangulation ray 1405 where $\vec{p}_n$ is the known vector ray origin position for the nth triangulation vector, $\vec{d}_n$ is the known unit vector of the direction of the nth triangulation ray 1405, $t_n$ is unknown the (scalar) approximate distance of the estimated 3D position along the triangulation ray, and $\vec{x}$ is the unknown estimated 3D position for the triangulation. In some implementations, minimizing the error of $\vec{x}/t_n$ introduces a bias towards further away estimated 3D positions (i.e. solutions with a greater depth are preferred to maintain consistency between the depth estimates for across different images). In some implementations, to solve the system of equations each $t_n$ is assumed equal to each other $t_n$, due to the relatively close proximity of cameras in image capture system 100, setting each $t_n$ equal provides a good initial assumption. After the system of equations is solved to find an estimated $\vec{x}$ a nonlinear solver (or other suitable optimization method) can be used to iteratively optimize the estimated solution. In some implementations, each $t_n$ is now allowed to float (and is no longer assumed equal to each other $t_n$).

After a 3D location for each feature match of the possible match set is calculated, for example by triangulating each feature match, the reprojection error of each feature match can be calculated. In this context, the reprojection of a feature match refers to the expected location within a calibration image that a feature at the 3D location of the feature match would be located. According to some embodiments, reprojection error is based on the difference between the expected and actual location (represented by the feature) of the feature. This reprojection error may be used as an estimate to show the likely errors in the calibration, and as discussed below, when the reprojection error for a matching feature point significantly differs from other matching points, it suggests the point may actually not be a strong match and may not be considered for analyzing further calibration.

Figure 15A:
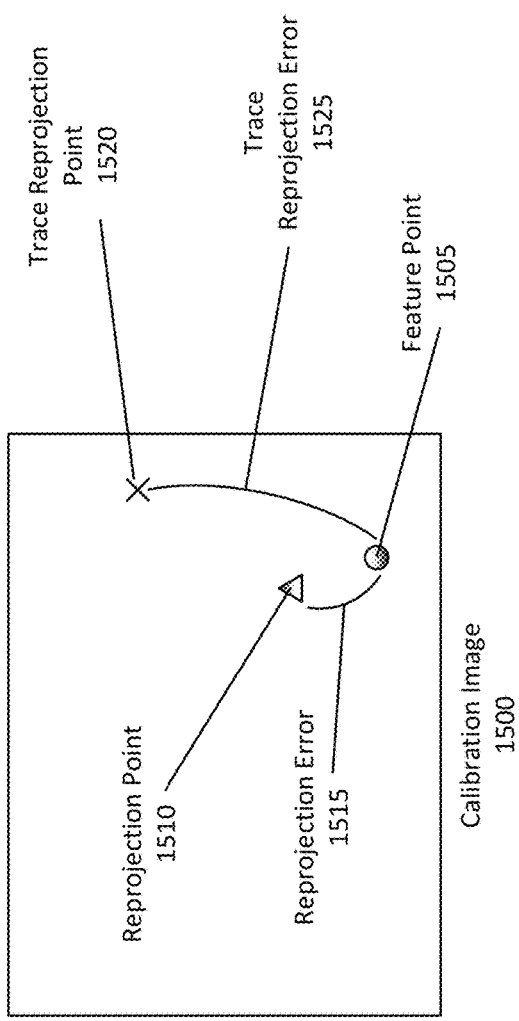
FIGS. 15A and 15B illustrate example reprojections and reprojection errors between feature points and reprojected points, according to one embodiment.
Figure 15B:
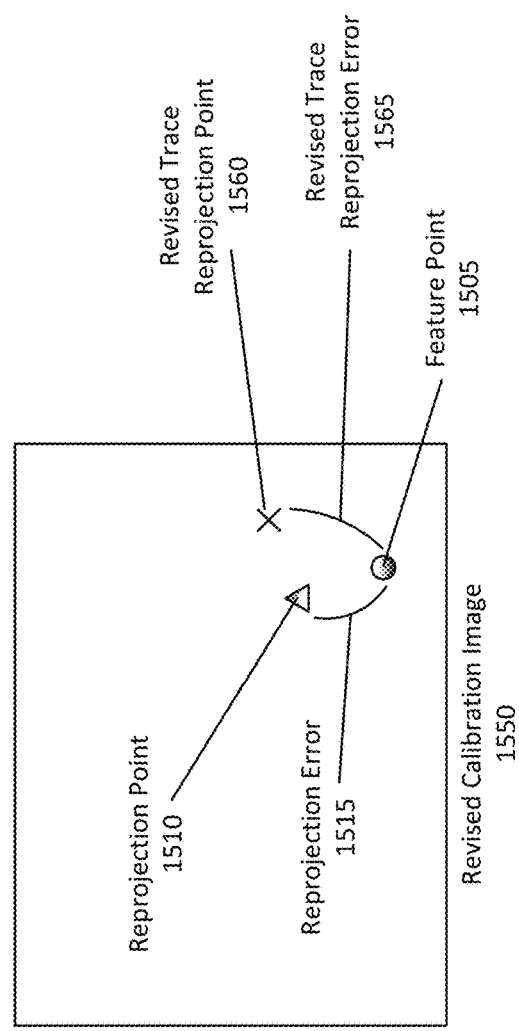

FIGS. 15A and 15B illustrate example reprojections and reprojection errors between feature points and reprojected points, according to one embodiment. The calibration image 1500 of FIG. 15A comprises a feature point 1505, a reprojected point 1510, and a reprojection error 1515, as well as a trace reprojected point 1520 and a trace reprojection error which are discussed below.

In the example of FIG. 15A, the feature point 1505 is associated with a feature match which has been triangulated to a 3D location in space. Based on the current calibration of the image capture system 100 (in this case, current knowledge about the position, orientation, and lens characteristics of the relevant camera 110), the estimated position of the 3D location within the calibration image 1500 can be determined. This estimated position is the reprojection point 1510. In some embodiments, a ray is generated from the triangulated 3D location to the image sensor of the relevant camera 110 to determine the reprojection point, but any suitable technique can be used. For example, a reprojection point can be determined based on knowledge of the lens characteristics and field of view of the cameras 110, such as by associating pixels of the calibration image with defined ranges of angles from the centerline of the camera 110. In some embodiments, it is unlikely that the reprojection point 1510 and the original feature point 1505 will be the same, therefore a reprojection error 1515 between the reprojection point 1510 and the feature point 1505 can be calculated using any suitable error calculation method. For example, the squared error between the feature point 1505 and the reprojection point 1510 can be used. This process can be repeated for to calculate the reprojection error for each other feature of the feature match. In some embodiments, the final reprojection error is the sum of the squared errors of each feature of the feature match. Reprojection error can also be calculated with respect to a trace reprojection point 1520 as described above.

Based on calculated reprojection errors, the possible match set can be further refined. In some embodiments, feature matches with greater than a threshold reprojection error are discarded. The threshold reprojection error can be fixed or predetermined, or generated based on statistics of the possible match set such as thresholds set based on multiples of the average or median reprojection error. In some embodiments, a threshold reprojection error can be determined separately for feature matches between the same images. For example, the median reprojection error for the set of feature matches between two given images is determined and feature matches of the set with a reprojection error of greater than five times the median reprojection error between the two matches are discarded. Based on this process, unreasonable (or outlier) feature matches are discarded from the set of feature matches resulting in a "reasonable match set" of pairwise feature matches.

Figure 16:
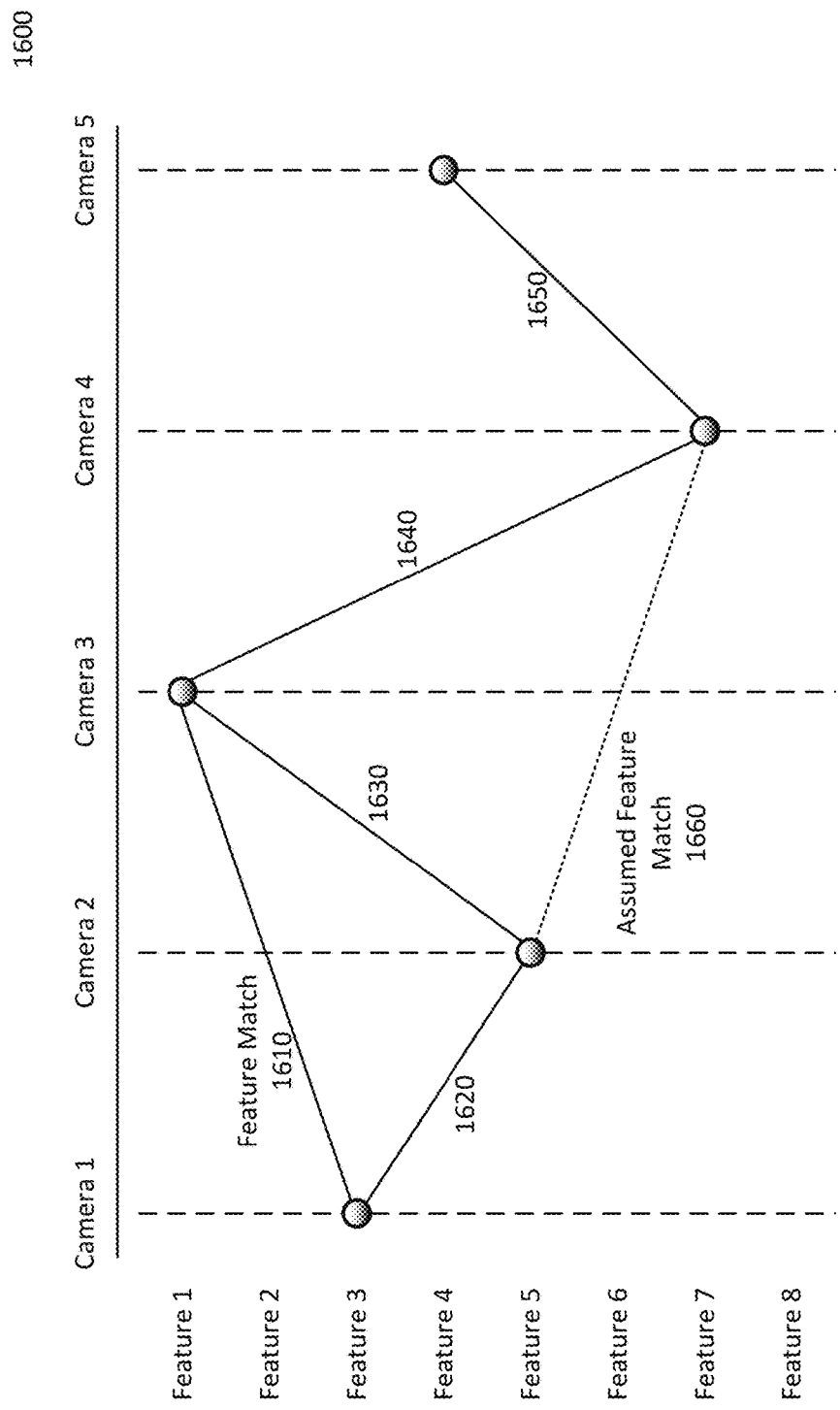
FIG. 16 is a graph illustrating an example trace, according to one embodiment.

The pairwise feature matches of the reasonable match set can now be assigned into "traces" or feature matches comprising 2 or more feature points. FIG. 16 is a graph illustrating an example trace, according to one embodiment. The graph 1600 is a plot of features of five cameras comprising the feature matches 1610-1650 and an assumed feature match 1660. Each feature match 1610-1650 represents an example pairwise feature match of a reasonable match set. For example, the feature match 1610 represents a match between feature 3 of camera 1 and feature 1 of camera 3 and the feature match 1650 represents a match between feature 7 of camera 4 and feature 4 of camera 5. Based a trace generation algorithm, the calibration device 1110 can determine that the feature matches 1610-1650 are interconnected and form a trace. In some embodiments, the calibration device 1110 then generates assumed feature matches, even when those matches were not present in the initial feature set, based on the feature matches of the trace. For example, the assumed feature match 1660 can be generated based on both feature 5 of camera 2 and feature 7 of camera 4 being included in the same trace.

To determine a trace, the calibration device 1110 can use a trace generation algorithm to sequentially evaluate each pairwise feature match to assign the associated features to a trace or use any other suitable method to determine traces. For example, a trace generation algorithm can determine if neither feature of the pairwise feature match is assigned to a trace, both features are assigned to a new trace, if one feature of the pairwise feature match is already assigned to a trace, the remaining feature is assigned to the same trace, and if both features of the pairwise feature match are already assigned to different traces, the traces are combined.

In some embodiments, the reasonable match set can be used to determine a "trace set" using the trace generation algorithm. Each trace of the trace set can then be triangulated using the process described earlier to determine a 3D location for the trace. FIG. 14B illustrates an example triangulation based on multiple triangulation rays, according to one embodiment. The environment 1450 of FIG. 14B comprises several triangulation rays 1455 originating from the 3D ray origins 1460 which are estimated to pass in close proximity at the closest points 1465, resulting in the estimated 3D trace location at 1470. The process for triangulating a trace can be similar to the described process for triangulating two rays, with the addition of several more triangulation rays 1455. Now the 3D trace location 1470 can be reprojected into each of the relevant cameras and new reprojection error for each feature match of the reasonable match set can be calculated using the 3D trace location. In the example of FIG. 15A this is represented by the trace reprojection point 1520 and the trace reprojection error 1525.

Based on calculated trace reprojection errors, the reasonable match set can be further refined as described above. For example, the median trace reprojection error between each pair of two images for the reasonable match set can be determined and feature matches with a trace reprojection error of greater than five times the median trace reprojection error between their two images are discarded. Based on this process, additional feature matches can be discarded from the set of feature matches resulting in a "refined reasonable match set" of pairwise feature matches. In some implementations, if a feature match of a trace is discarded, the entire trace (for example, including all feature matches associated with the trace) is discarded.

According to some implementations, the trace generation algorithm is then applied to the refined reasonable match set to generate a "refined trace set." The refined trace set can comprise more or different traces based on the removal of pairwise matches from the reasonable match set. Therefore, removing matches can have the effect of "splitting" traces i.e. separating a trace into separate traces in the refined trace set. The altered trace assignments of the refined trace set can alter or improve the reprojection error of affected feature matches. For example, the revised trace reprojection error 1565 is much less than the trace reprojection error 1525, which can be the result of assignment of the associated feature to a new or modified trace.

In some embodiments, the resulting "refined trace set" is used to iteratively optimize the calibration of the image capture system 100. For example, a standard nonlinear solver (or other suitable optimization method) can be used to minimize the reprojection error for matches of the refined trace set by adjusting various parameters of the calibration. The revised calibration is then used to initialize a new iteration of the optimization, starting from the initial feature set, according to some embodiments. In some embodiments, the calibration parameters to be optimized include camera orientation, camera position, and various lens corrections such as lens distortion, lens centering, and lens image scale. In some embodiments, each iteration additionally includes the triangulated positions of each trace or match of the refined trace set to aid the nonlinear solver in converging to a satisfactory solution for the iteration. The parameters the nonlinear solver optimizes over can vary based on the iteration of the calibration process, for example, in the first iteration of the calibration process the nonlinear solver of the first iteration can optimize over fewer parameters (such as the parameters assumed to have the largest variance) than the later iterations, which can introduce more granular parameters. For example, the first iteration of the calibration process can optimize camera orientation only, the second can optimize camera orientation and position, and the third (and further iterations) can optimize camera orientation, camera position, and lens corrections. Similarly, iterations can optimize parameters in a fixed pattern, or in any other suitable order. In some implementations, certain parameters can be changed on a per-camera basis (such as camera position and orientation), while others (such as lens distortion) can be globally used for all cameras at once or for a set of cameras at once (such as all cameras of the image capture system 100 using the same lens design).

In some implementations, a predetermined number of iterations of the calibration process occur, for example 10 iterations. In each iteration of the calibration process, the set of initial feature matches is refined based on the updated calibration of the image capture system 100 and a new or different refined trace set can result, according to some embodiments. In other embodiments, iterations of the calibration process occur until the final change in calibration parameters is less than a threshold amount, or until any other suitable condition is met.

Figure 17:
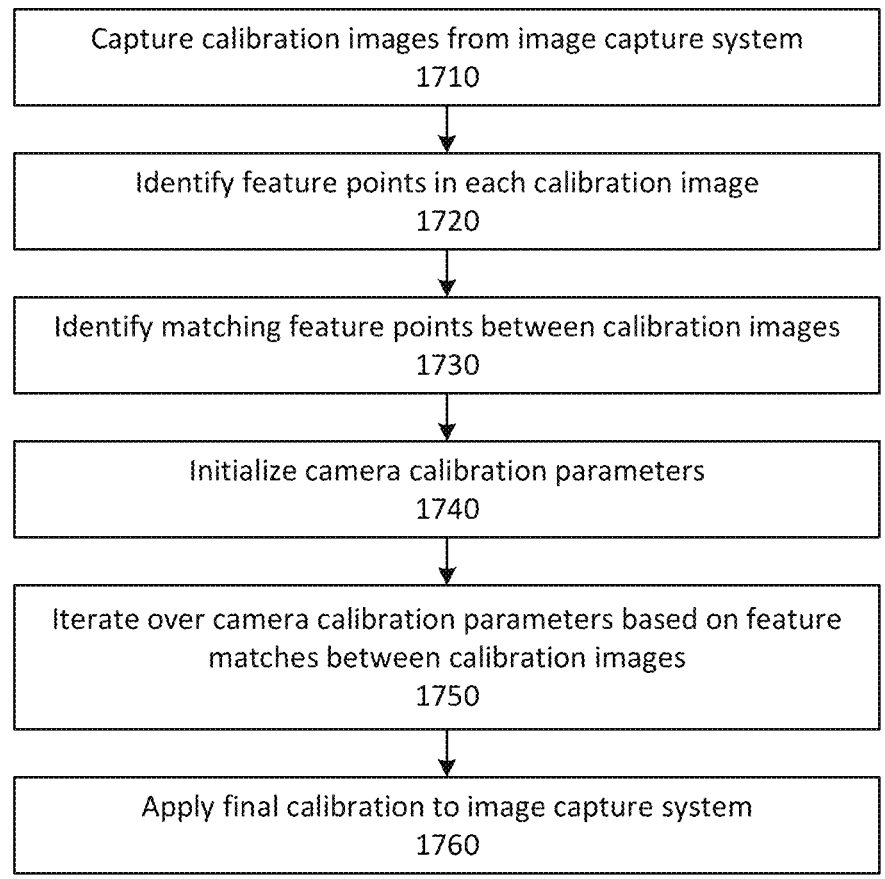
FIG. 17 is a flowchart illustrating an example process for calibrating an image capture system, according to one embodiment.

FIG. 17 is a flowchart illustrating an example process for calibrating an image capture system, according to one embodiment. The process of FIG. 17 begins when a calibration set of calibration images are captured 1710 at the image capture system and received by the calibration device 1110. Then, an initial feature set is generated by identifying 1720 and matching 1730 feature points between the calibration images of the calibration set. The camera calibration parameters are initialized 1730 to provide an initial calibration of the image capture system. Then the calibration is iteratively revised 1750 based on the initial calibration and initial feature set. Finally the optimized calibration is applied 1760 to the image capture system and stored.

Figure 18:
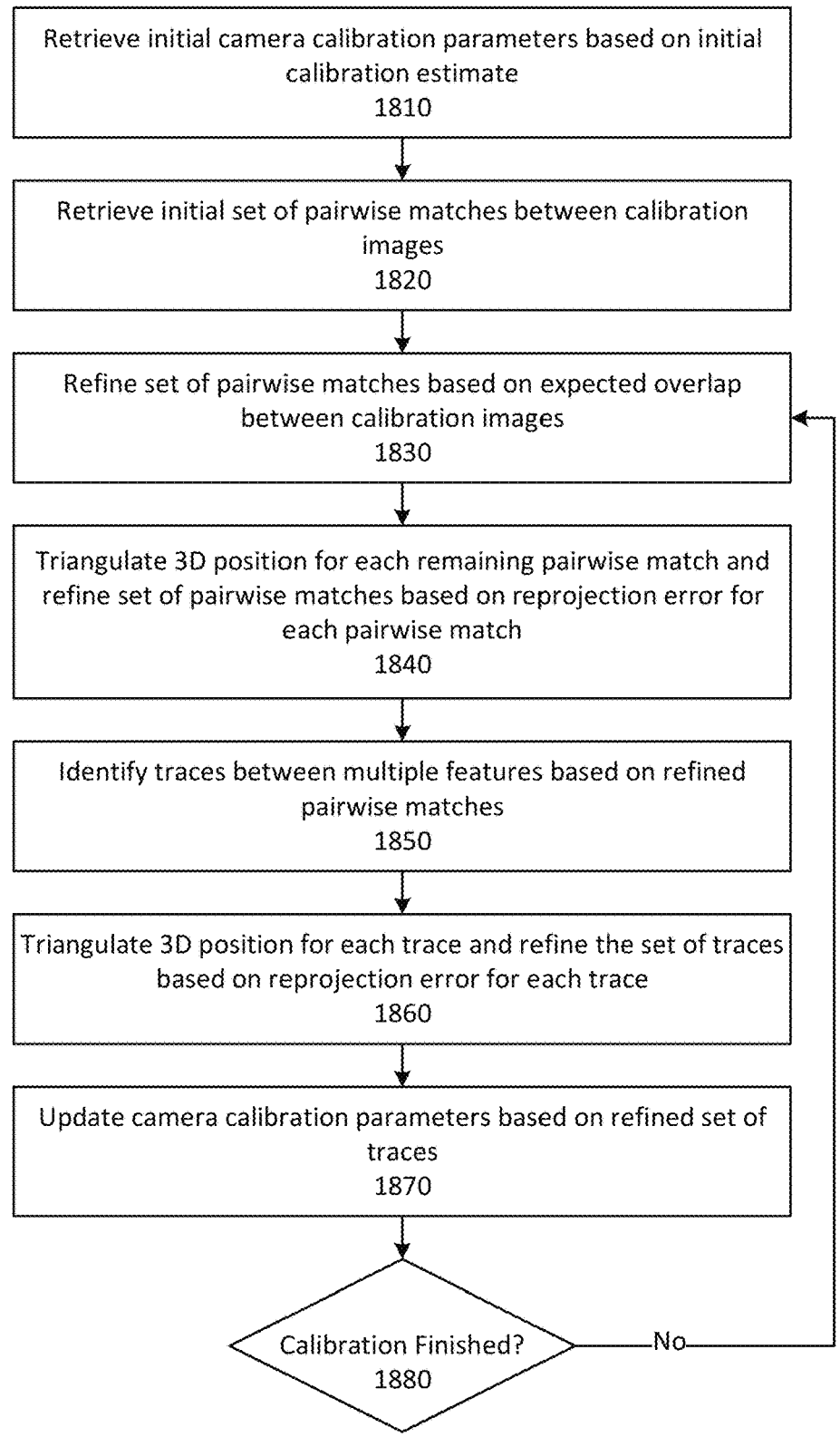
FIG. 18 is a flowchart illustrating an example calibration process for iteratively improving the calibration of an image capture system, according to one embodiment.

FIG. 18 is a flowchart illustrating an example calibration process for iteratively improving the calibration of an image capture system, according to one embodiment. The process of FIG. 18 begins when the initial camera calibration and the initial feature set of pairwise matches are received 1810, 1820. Then the initial feature set can be refined 1830 based on expected overlap between the calibration images to generate the possible match set. Next, 3D positions for each match of the possible match set can be triangulated 1840, and the possible match set can be refined based on the projection error of each match, forming the reasonable match set. Traces are then identified between multiple features (comprising multiple matches) are then identified 1850 forming the trace set. 3D positions for the traces of the trace set can then be identified by triangulation 1860, and the set of traces is refined based on the reprojection error for each trace. Finally, the camera calibration can be iteratively improved 1870 based on the refined trace set. Further iterations of the calibration process 1880 can be started from the step 1820, beginning with the original feature match set but the newly updated calibration parameters.

Depth Calculation

To calculate depth maps for captured images from the image capture system 700, the depth calculation module 716 of the image processing system 710 can employ a technique to progressively refine a depth estimate by beginning with a small-resolution image and scaling the depth estimates to larger-resolution images. The large-to-small resolution images may be represented as an "image pyramid" that is progressed up in determining the depth estimates.

Figure 19:
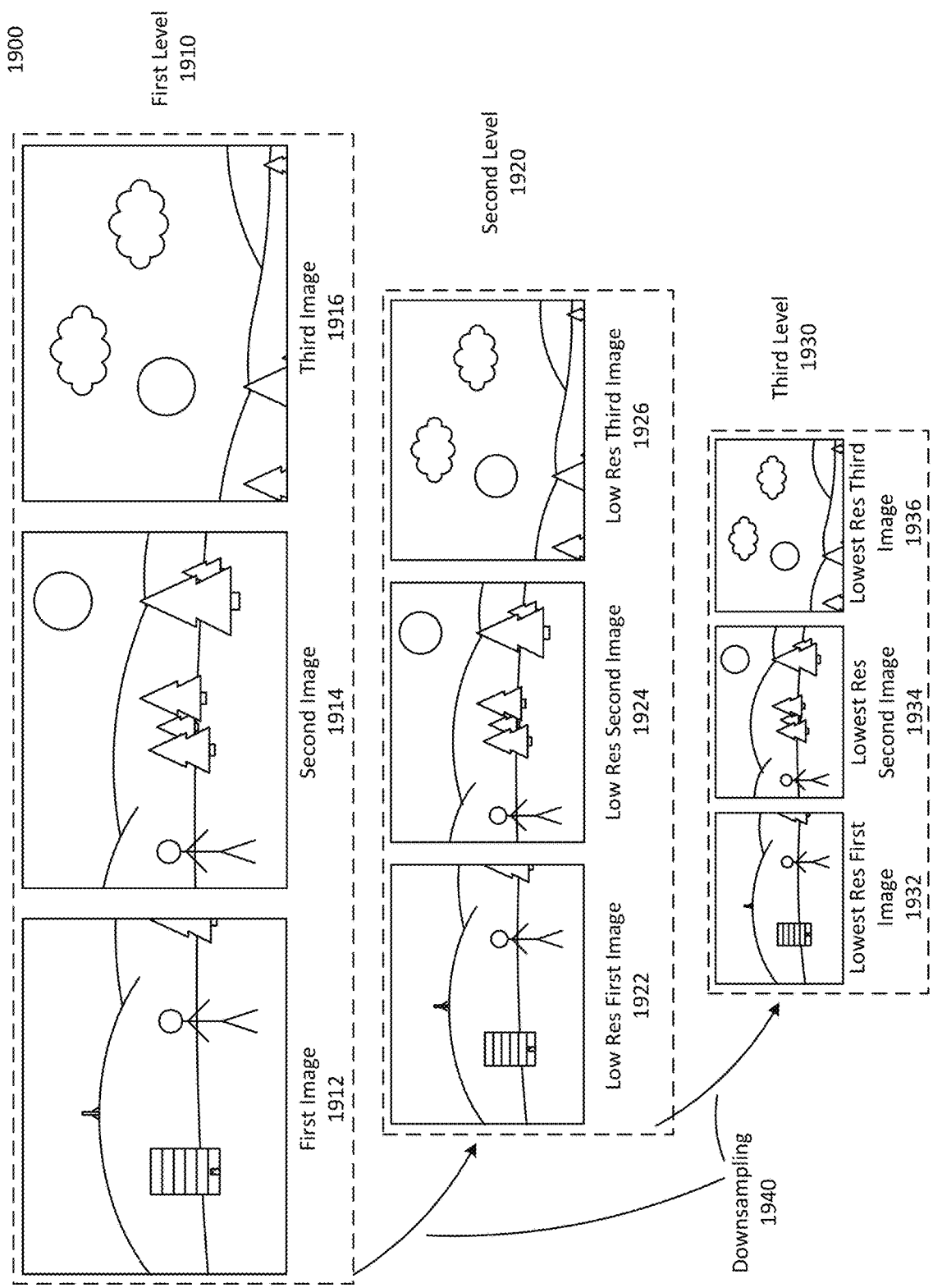
FIG. 19 illustrates an example image pyramid, according to one embodiment.

FIG. 19 illustrates an example image pyramid, according to one embodiment. The image pyramid 1900 of FIG. 19 comprises three successive levels 1910, 1920, and 1930. Each level of the image pyramid 1900 can comprise the same images in progressively lower resolutions, i.e. the first level 1910 comprises a set of images and the second level 1920 includes lower resolution versions of the same set of images. In the image pyramid 1900, the first level 1910 comprises the images 1912-1916, the second level 1920 comprises lower resolution versions 1922-1926, and the third level 1930 comprises the lowest resolution images 1932-1936. The image pyramid 1900 has three levels for example purposes, but an image pyramid can have any suitable number of levels, for example 10 or 15 levels.

The first level 1910 of an image pyramid 1900 comprises the highest resolution images in the image pyramid. For example, the first level 1910 can comprise the input images captured by the image capture system 100 at full resolution. In other embodiments, the first level 1910 can comprise the input images downsampled to a reduced size (e.g., by a scaling factor) of the original images captured by the image capture system 100. For example, the first level 1910 can comprise images 25% of the scale of the original captured images (a scale factor of 0.25), but any suitable starting scale factor can be used. Starting the image pyramid at a 0.25 scale factor will result in a depth map at 25% of the scale of the original input images (i.e. depth for the input image is calculated in 4×4 pixel blocks).

To generate a lower level of the image pyramid 1900 the images of the previous level can be downsampled 1940 to generate a lower resolution versions for inclusion in the lower level of the image pyramid 1900. For example, the second image 1914 can be downsampled 1940 to become the low res. second image 1924, which can be further downsampled to be the lowest res. second image 1934. According to some implementations, each successively lower level of an image pyramid 1900 can be at a specific scale factor of the previous (higher resolution) level, for example a 0.75 or 0.90 scale factor, where each lower level is 75% or 90% the size of the previous level. Calculation of an image pyramid can continue until a threshold number of levels is reached (for example, 20 levels), or until a lower resolution level would fall below a threshold resolution in one dimension (for example 100 pixels). Based on the image pyramid 1900, depth maps can be calculated for each image, starting at the lowest resolution level of each image, and progressively being refined towards the higher resolution levels of the image pyramid 1900.

To calculate or refine a depth map for a given image (hereinafter, the reference image), images with overlapping field of views to the reference image (hereinafter, overlap images) can be reprojected to the viewpoint of the reference image. For example, the process of reprojection can project the overlap image into space based on the position and orientation of the camera that captured the overlap image. Then the projected overlap image can be reprojected to the viewpoint of the reference camera. The reprojected overlap images can then be used to calculate or refine the depth map for the reference image.

FIG. 20 illustrates an example reprojection of overlap images to a reference image, according to one embodiment. The environment of FIG. 20 includes a reference image 2010, overlap images 2020 and 2030, reprojected overlap images 2025 and 2035, and reprojected overlap images 2040 and 2045.

According to some embodiments, overlap images such as the overlap images 2020 and 2030 are identified based on the relative position, orientation, and field of view of the reference camera (i.e. the camera 110 which captured the reference image 2010) and the overlap cameras (i.e. the cameras 110 which captured the overlap images 2020 and 2030). To reproject the overlap images 2020 and 2030, the overlap images can be projected into 3D space based on an existing depth map for the overlap images 2020 and 2030 or, in other embodiments, based on an assumption of the depth for the overlap images 2020 and 2030. For example, in some embodiments, each overlap image 2020 and 2030 is treated having an infinite distance from the overlap camera. Then, the overlap image is reprojected 2040 or 2045 based on the position of the reference camera relative to the overlapping camera to generate the reprojected overlap images 2025 and 2035. For example, the overlap image 2020 and the reference image 2010 overlap in the estimated overlapping area 2022. When reprojected, the overlap image 2020 is reprojected 2040 to the viewpoint, resulting in the reprojected overlap image 2025 comprising an approximation the overlapping portion of the reference image 2010 using the estimated overlapping area 2022 of the overlap image 2020. The reprojected overlap images 2025 and 2035 can be used both to generate an initial depth map for the reference image 2010 and to refine the depth map of the reference image 2010.

To begin the depth map refinement process, an initial depth map is generated for each image of the lowest resolution level of the image pyramid 1900, according to some embodiments. In some implementations, depth map initialization can utilize "brute force" techniques that would not be practical at higher resolution levels of the image pyramid 1900, for example due to increased requirements for storage or computation power when initializing a depth map for a higher resolution image.

In some embodiments, depth map initialization for a given reference image can begin by identifying and reprojecting all overlap images to the viewpoint of the reference image. To evaluate a potential depth for a pixel in the reference image 2210, the possible depth value is applied to the reference image to determine the corresponding pixel in the reprojected overlapping image. As discussed below, the pixel of the reference image is compared to the corresponding pixel in the reprojected overlapping image based on a cost function that may incorporate a variety of factors that assess the likely accuracy of the correspondence of the reference image pixel to the overlapping image.

To initiate the depth map at the lowest resolution of the image pyramid, the cost may be evaluated for each possible corresponding pixel in an overlapping image. For example, the cost may be determined based on candidate depths that designate each possible pixel in the overlapping image as a corresponding pixel. As an alternative, the possible depth may be incremented, for example by constant increments of 1/d, to identify candidate corresponding pixels in the overlapping image. Since the lowest level of the image pyramid may have a relatively small resolution, such as 100×100, this may be performed without extensive computational time. Using the calculated costs, a depth estimate may be set for the pixel in the reference image that had the lowest calculated cost.

In some embodiments, the depth calculation module 716 begins calculating depth maps for a set of images by generating an image pyramid 1900. Then, initial depth maps are generated for each image of the lowest resolution version of the image pyramid 1900. Based on the initial depth maps, the depth calculation module 716 then begins to refine the initial depth estimates for each image of the image pyramid 1900. In some embodiments, the depth calculation module 716 upscales the initial depth estimates to the resolution of the next layer of the image pyramid 1900 to further refine each depth map. In some implementations, each depth map is then checked for consistency with the other depth maps of the same level of the image pyramid. For example, the depth maps of each overlapping view can be reprojected to the reference camera viewpoint and the reprojected depth estimates can be compared to the current depth estimates (for example, using a cost functions as discussed below), then the lowest cost depth estimate can be adopted.

To refine a calculated depth map for a given reference image, the depth calculation module 716 can proceed sequentially through the pixels of the reference image in a defined order, refining the depth estimate for each pixel. FIG. 21A illustrates an example order to refine the depth estimation of pixels of an image, according to one embodiment. The depth map 2100 of FIG. 21A comprises a plurality of pixels including the example pixel 2110, the first refined pixel 2120, and the last refined pixel 2125 which are evaluated sequentially based on the traversal order 2130. According to some implementations, the depth map 2100 is associated with a corresponding reference image in an image pyramid 1900, where each pixel of the depth map 2100 holds a depth estimate (for example in 1/d format) for the corresponding pixel of the reference image. In the example of FIG. 21A, the pixels of the depth map 2100 are refined based on the traversal order 2130, starting in the upper left with the first refined pixel 2120 and proceeding right and down, ending at the last refined pixel 2125. According to some embodiments, after each pixel of the depth map 2100 is evaluated according to the traversal order 2130, the depth map 2100 can be further refined in reverse traversal order, i.e. progressing left and up from the last refined pixel 2125 to the first refined pixel 2120. Refining the depth map 2100 both in traversal order 2130 and reverse traversal order can allow improvements in the depth map 2100 to propagate through the entire depth map 2100.

To refine the depth estimate for a given pixel of a depth map 2100, for example the example pixel 2110, the depth calculation module 216 can first consider proposals from neighbors of the example pixel 2110. FIG. 21B illustrates an example pixel with proposals from neighboring pixels, according to one embodiment. FIG. 21B comprises an example pixel 2110 and the left and upper neighbors 2150 and 2155 of the example pixel 2110. In some implementation, proposals are taken from neighbors of the example pixel 2110 which have already evaluated in the traversal order 2130, in this case the left neighbor 2150 and the upper neighbor 2155 as those pixels have already been evaluated in prior to the example pixel 2110. Similarly, when evaluating in reverse traversal order, proposals from the lower and right neighbors can be considered. In some embodiments, other suitable proposals are also considered, such as random permutations of the current depth estimate for the example pixel 2110, or any other suitable proposal.

After the depth proposals are identified for the example pixel 2110 (for example, the set of depth proposals can include the current depth estimate as well as depth estimates from appropriate neighbors of the example pixel 2110) each depth proposal can be evaluated based on a cost function to determine the best proposal, i.e. the proposal with the lowest cost as measured by the cost function. The lowest cost proposal is then adopted as the depth estimate for the example pixel 2110 and the depth estimate is further refined by performing one step of a gradient descent process for the current pixel based on the gradient of the cost function. Any suitable method of gradient descent can be used, however in some implementations, only one gradient descent step (or any other suitable limited number of gradient descent steps) is performed. Limiting the rate of convergence of the depth map by performing only one step of gradient descent for each pixel of the depth map 2100 each time it is evaluated can reduce unnecessary computations, as the depth estimate will converge across levels of the image pyramid, and based on refinements in the depth map of the neighboring pixels, which can be taken as proposals to the current depth estimate.

After each pixel of the depth map 2100 is refined, for example according to both the traversal order 2130 and the reverse traversal order, the depth map 2100 can be filtered using a median filter, a joint bilateral filter, or any other suitable type of filter to blur the depth estimates. The filter may be edge- or time-aware and such filtering is discussed in further detail below. After the depth map 2100 has been refined and filtered, the depth calculation module 716 progresses to the next (higher resolution) level of the image pyramid 1900 and upscales the depth map 2100 to serve as an initial depth map for the corresponding reference image of the next level of the image pyramid 1900.

A cost function, according to some embodiments, can be any suitable function which takes an input of the current depth estimate for a pixel of a depth map 2100 and returns a "cost" or measure of quality of the input depth estimate. A cost function can have many terms based on the current depth estimate, and each term can require one or more additional inputs other than the current depth estimate such as depth estimates for neighboring pixels of the depth map 2100, values from the current reference image or information derived from one or more images or other datasets specifically calculated to aid in cost function calculation (hereinafter, "features"). Features can include reprojected overlap images, filtered or processed versions of the reference image, filtered or processed versions of the reprojected overlap images, or any other suitable feature, such as the results of a deep learning model applied to the current depth map. Features for calculating the cost function can include, for example, the intensity of the reference image (i.e. a grayscale or a one channel version of the reference image), the intensity gradient (or the magnitude of the intensity gradient) of the reference image, a blurred reference image, and the intensity, intensity gradient, or magnitude of the intensity gradient of the reprojected overlap images. Appropriate features for depth map evaluation can be calculated as the image pyramid 1900 is generated, as needed, or according to some implementations, as the depth map for each image of the current level of the image pyramid 1900 is initialized. In some implementations, suitable features for cost function evaluation are calculated based on the image set for the current level of the image pyramid 1900; i.e. the resolution of calculated features can match the current resolution of the reference image and associated depth map 2100.

Figures 22A, 22B:
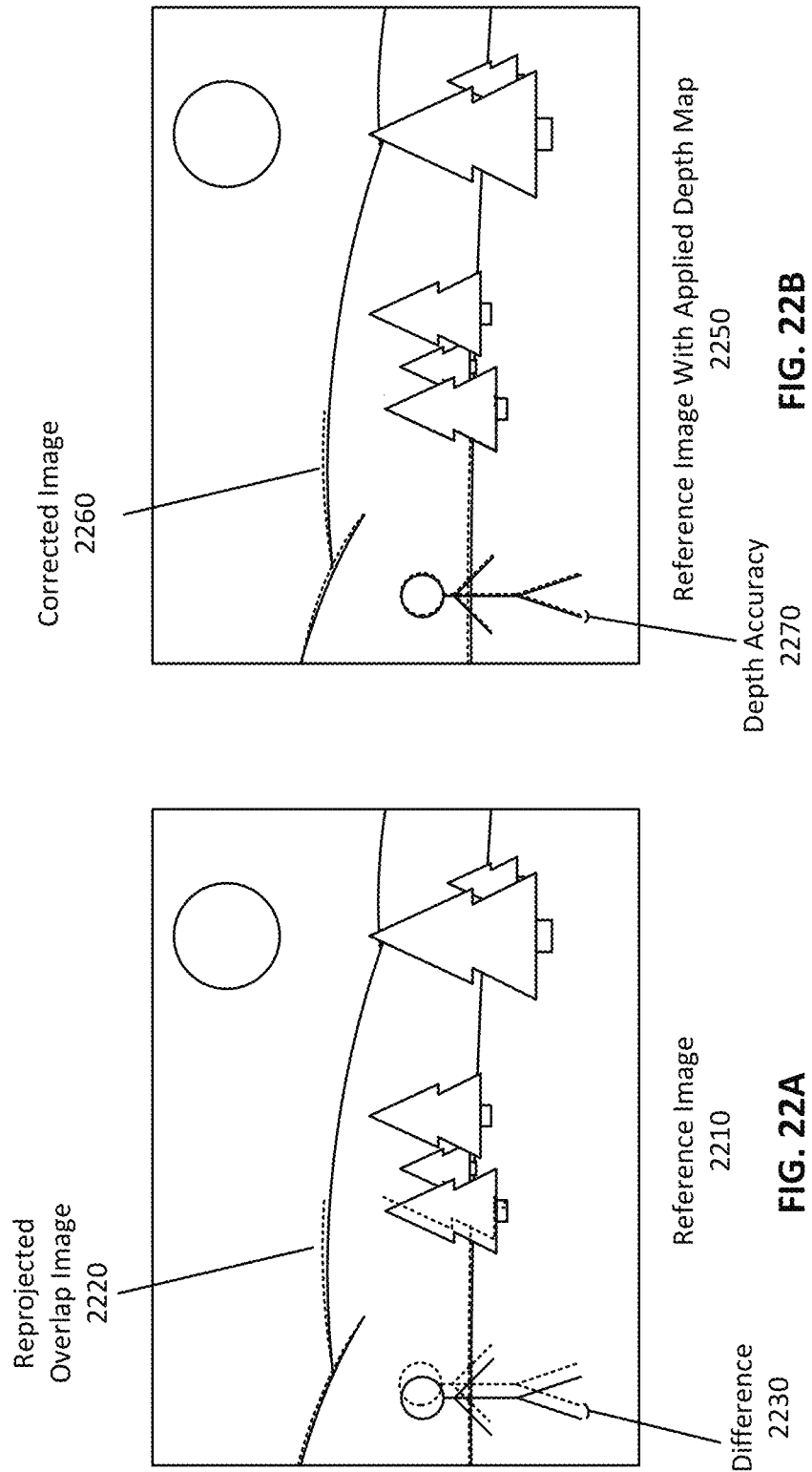
FIG. 22A illustrates an example reference image with a reprojected overlap image overlaid, according to one embodiment.
FIG. 22B illustrates an example reference image with an applied depth map, according to one embodiment.

In some embodiments, the cost function includes one or more depth accuracy terms to measure the accuracy of the current depth estimate based on difference between the current pixel of the reference image and the corresponding pixel in one or more reprojected overlap images. Therefore, the depth calculation module 716 can determine the pixel in each reprojected overlap image which corresponds to the current pixel based on the current depth estimate. FIG. 22A illustrates an example reference image with a reprojected overlap image overlaid, according to one embodiment. The reference image 2210 of FIG. 22A includes a reprojected overlap image 2220 overlaid over the reference image 2210. In some implementations, the overlap image is reprojected with an infinity depth assumption (i.e. during the reprojection process the depth of each pixel of the overlap image is assumed to be infinity), and therefore the reprojected overlap image 2220 does not perfectly align with the reference image 2210, producing a difference 2230 between the reference and reprojected images. For any objects far in the distance in the reference image 2210 (i.e. features closer to infinity depth) the infinity depth assumption reprojection is relatively accurate, however for other, closer objects, for example, the person or the tree in the reference image 2210, there is a marked difference 2230.

Based on a depth map for the reference image 2210, the depth calculation module 716 can correct for the differences 2230 between the reference image 2210 and the reprojected overlap image using a suitable mathematical process. The depth calculation module 716 can find the corresponding pixel to each pixel of the reference image (the difference between a pixel in the reference image 2210 and the estimated corresponding pixel in a reprojected overlap image is hereafter referred to as a "depth correction"). The magnitude of a calculated depth correction can be based on the relative positions of the reference and overlap cameras, the current depth estimate, and any other suitable factor. For example, FIG. 22B illustrates an example reference image with an applied depth map, according to one embodiment. The reference image with applied depth map 2250 of FIG. 22B comprises a corrected image 2260 which can be the reprojected overlap image corrected based on the depth map of the reference image 2210. In this example, the corresponding pixels in the reprojected overlap image are shifted by the appropriate depth correction to the location of their counterparts in the reference image. Based on the correction, the difference between the overlap and reference images is much smaller. The remaining difference between the reference and overlap images can be viewed as a measure of the accuracy 2270 of the depth map for the reference image 2210.

Similarly, the depth calculation module 716 can determine a corresponding pixel in a reprojected overlap image based on the current depth estimate. Features of the current pixel in the reference image reference image and the corresponding pixel in a reprojected overlap image can be compared to evaluate the accuracy of the depth estimate of the current pixel.

One or more depth accuracy terms of the cost function compare various features (such as intensity, intensity gradient, color values, or the like) of the current pixel in the reference image to the corresponding pixel in a reprojected overlap image, according to some embodiments. In some embodiments, the cost function comprises multiple weighted depth accuracy terms, for example one depth accuracy term for each reprojected overlap image.

For example, a depth accuracy term associated with a first reprojected overlap image can comprise RGB comparison terms of the form $c_R\|R_R-R_{O1}\|^2+c_G\|G_R-G_{O1}\|^2+c_B\|B_R-B_{O1}\|^2$, where $G_R$ is the value of the green channel in the reference image (at the current pixel), $G_{O1}$ is the value of the green channel in the corresponding pixel of the first reprojected overlap image, and $c_G$ is a predetermined weighting coefficient for the green channel (in this example similar conventions are followed for the red and blue channels).

Similar terms can be included in the depth accuracy term for any other desired channel or feature of the reference image, for example, $c\|u_R-u_{O1}\|^2$ and $c\|v_R-v_{O1}\|^2$ can be used to include optical flow information, in this example stored in additional channels u and v of each image. Additionally, the depth accuracy term can include an intensity comparison term of the form $c_I\|I_R-I_{O1}\|^2$ where I represents the intensity feature, which is a one channel representation of an RGB image, generated, for example, by a weighted combination of each color (RGB) channel of the image. In some embodiments, the depth accuracy term includes an intensity gradient term, $c_{\nabla I}\|\nabla I_R-\nabla I_{O1}\|^2$ where $\nabla I$ represents the gradient of the intensity or the magnitude of the gradient of the intensity.

A cost function can also include additional suitable terms, for example smoothness terms, regularization terms, and other terms. A smoothness term can be of the form $c_s\|d-d_B\|^2$ where d represents the current depth estimate and $d_B$ represents a blurred depth estimate (for example, from a blurred version of the current depth map). Similarly, a regularization term can be of the form $c_{reg}(1/d)$ where d represents the current depth estimate and the regularization term is weighted to prefer further depth estimates. In some implementations, a variance weighted regularization term is used of the form $c_{reg}(1/d)/(1+c_v \text{var})$ where var is the variance of the depth map at the current pixel (computed using any suitable method). Using variance weighted regularization can improve the temporal stability of the final depth map over time (i.e. depth maps over time are more consistent with each other). Additionally, a cost function can include any other suitable term, such as a term using a feature map generated from a deep learning model.

In some implementations, the gradient of the cost function is also determined, for example to perform gradient descent steps to refine the depth map. The gradient of the cost function can be determined from the cost function using any suitable method.

Figure 23:
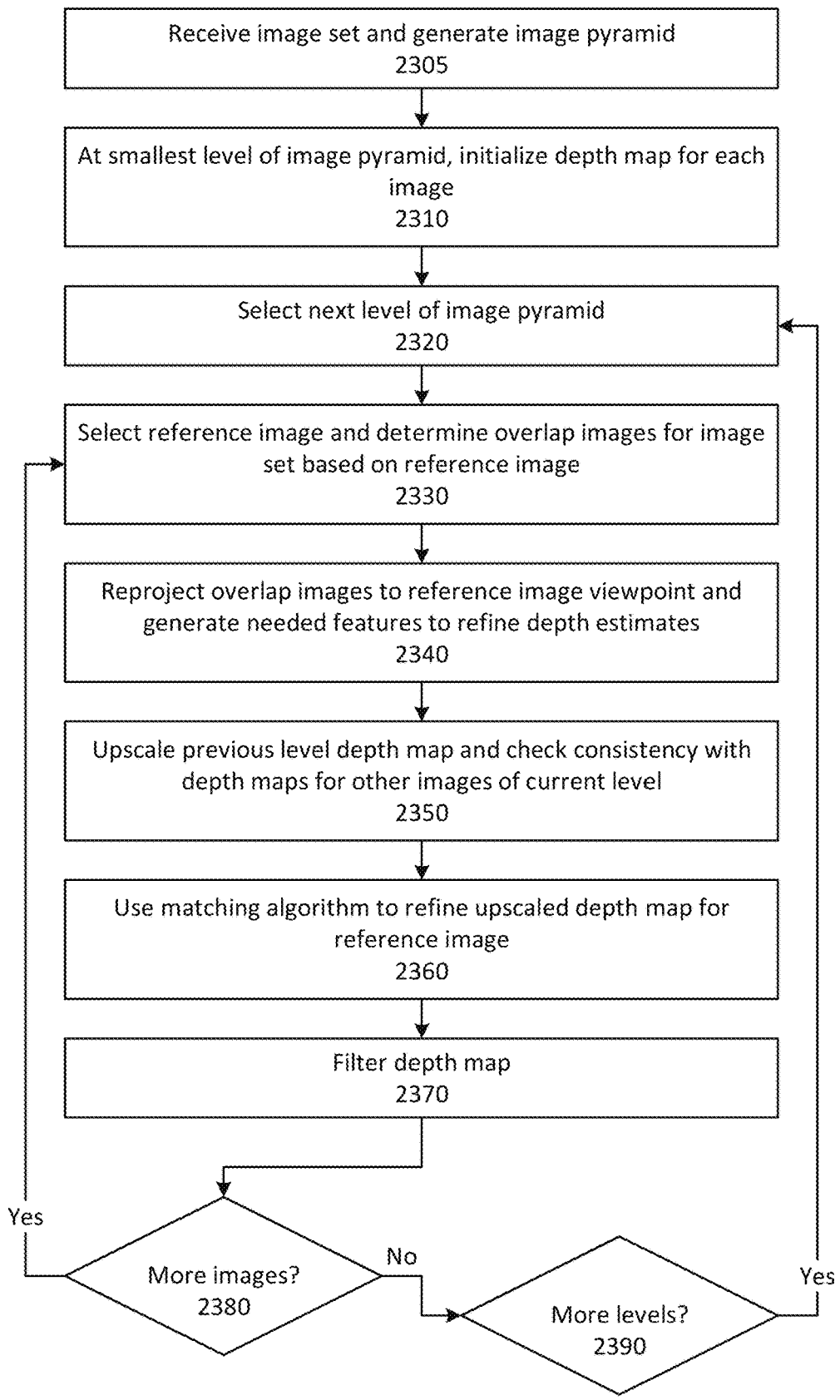
FIG. 23 is a flowchart illustrating an example process for determining a depth estimate for a set of images based on an image pyramid.

FIG. 23 is a flowchart illustrating an example process for determining a depth estimate for a set of images based on an image pyramid. The process of FIG. 23 begins when an image set is received 2305 and the image processing system generates an image pyramid for the image set. For example, the image set can be a set of simultaneously captured images (for example, corresponding frames of simultaneously captured video) for depth calculation. Then, for the smallest (lowest resolution) level of the image pyramid, a depth map for each of image of the image set is initialized 2310 by the image processing system using a brute force method. The next (higher resolution) level of the image pyramid is selected 2320 for refinement, and a reference image from the current level of the image pyramid is selected 2330. Additionally, any overlap images for the selected reference image are identified by the image processing system. Then the image processing system then can reproject 2340 the identified set of overlap images and generate any other features needed to refine the depth estimates. The previous level depth estimate for the reference image can then be upscaled 2350 to the resolution of the current level of the image pyramid and in some embodiments, checked against depth maps for the other images of the current level. Then, a matching algorithm is used 2360 to refine the depth map for the reference image. Finally, the depth map is filtered 2370, for example, using a median filter and a joint bilateral filter. If there are more images 2380 in the image set, a new reference image is selected. Otherwise, the next (higher resolution) level 2390 of the image pyramid is selected.

Figure 24:
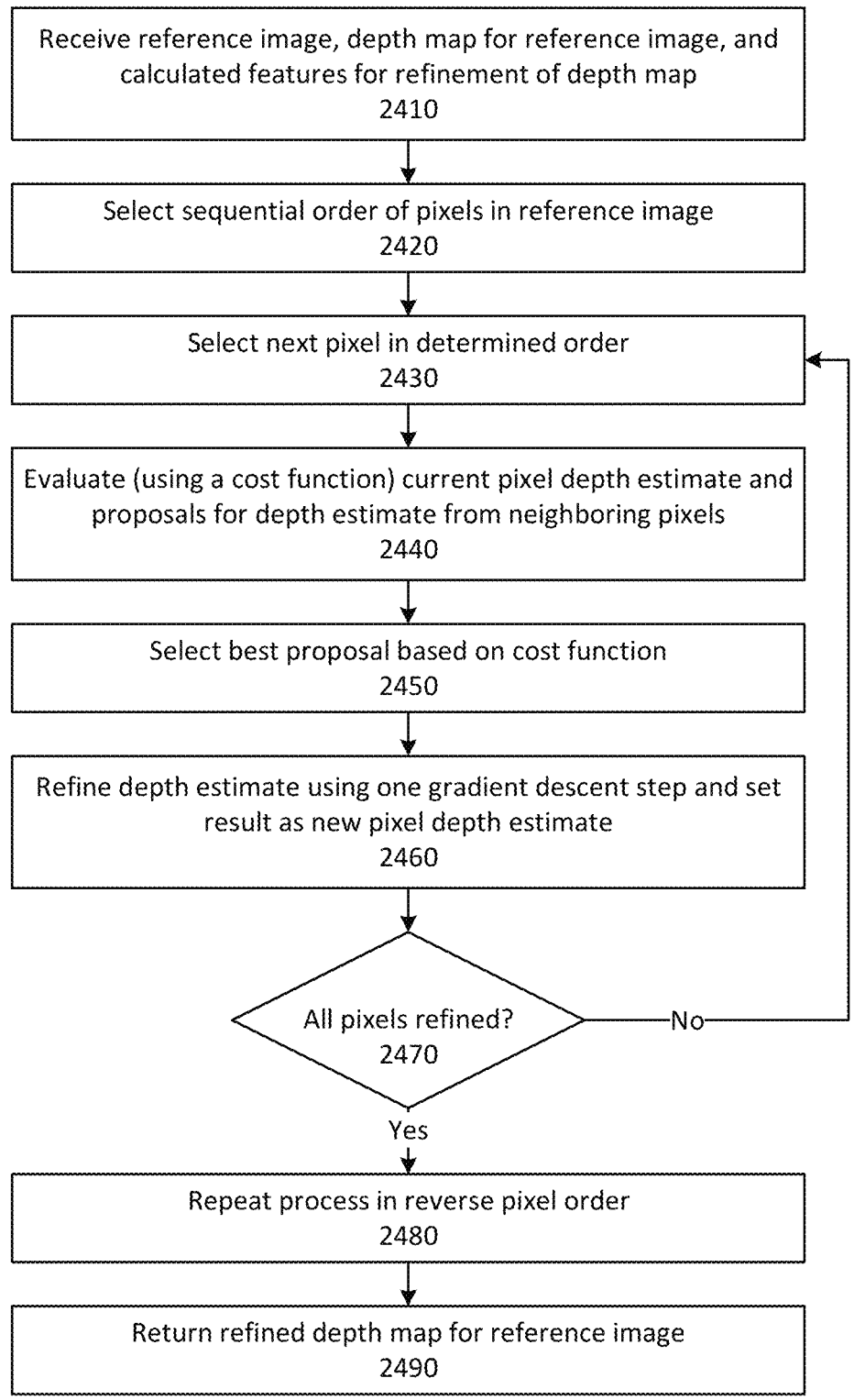
FIG. 24 is a flowchart illustrating an example process for refining the depth estimate of an image, according to one embodiment.

FIG. 24 is a flowchart illustrating an example process for refining the depth estimate of an image, according to one embodiment. The process of FIG. 24, begins when the depth calculation module of the image processing system receives 2410 a reference image, a depth map for the reference image, and calculated features for the reference image. Then a specific sequential order of pixels in the reference image is selected 2420. The depth calculation module can select 2430 the next pixel in the determined order and evaluate 2440, using a cost function, a set of proposals, including the current pixel depth estimate a neighboring pixel depth estimates. Based on the cost of each proposal, the depth calculation module selects 2450 and adopts the best proposal as the depth estimate for the current pixel. The depth estimate is then refined 2460 by performing one gradient descent step using the gradient of the cost function and adopting the result as the new depth estimate for the current pixel. If all pixels are refined 2470, the process is repeated 2480 in reverse pixel order and the refined depth map is returned 2490.

Figure 25:
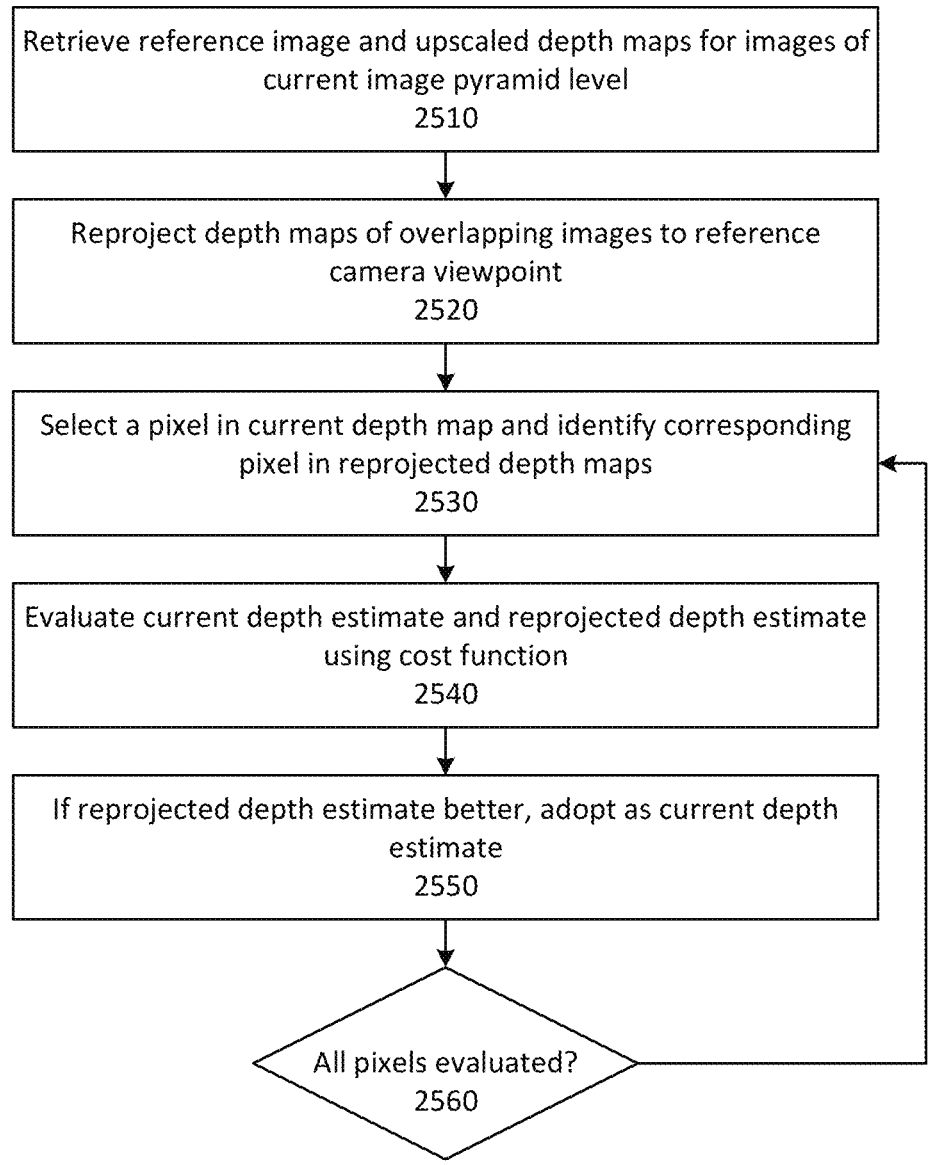
FIG. 25 is a flowchart illustrating an example process for maintaining consistency between depth estimates, according to one embodiment.

FIG. 25 is a flowchart illustrating an example process for maintaining consistency between depth estimates, according to one embodiment. The process of FIG. 25 begins when the depth calculation module retrieves 2510 a reference image and upscaled depth maps for the images of the current image pyramid level including, for example, depths map for the reference image and one or more overlap images of the reference image. Then, the depth maps of the overlapping images are reprojected 2520 to the reference camera viewpoint. Then a pixel in the current depth map is selected 2350 and the corresponding depth estimates in the reprojected overlap depth maps are determined. The depth calculation module can then evaluate 2540 the current depth estimate and the reprojected depth estimate using a cost function. Based on the results of the evaluation, the best depth estimate (from the current depth estimate and the reprojected depth estimates) is adopted 2550. If all pixels are evaluated 2560, the process ends, otherwise a new pixel is selected for evaluation.

Figure 26:
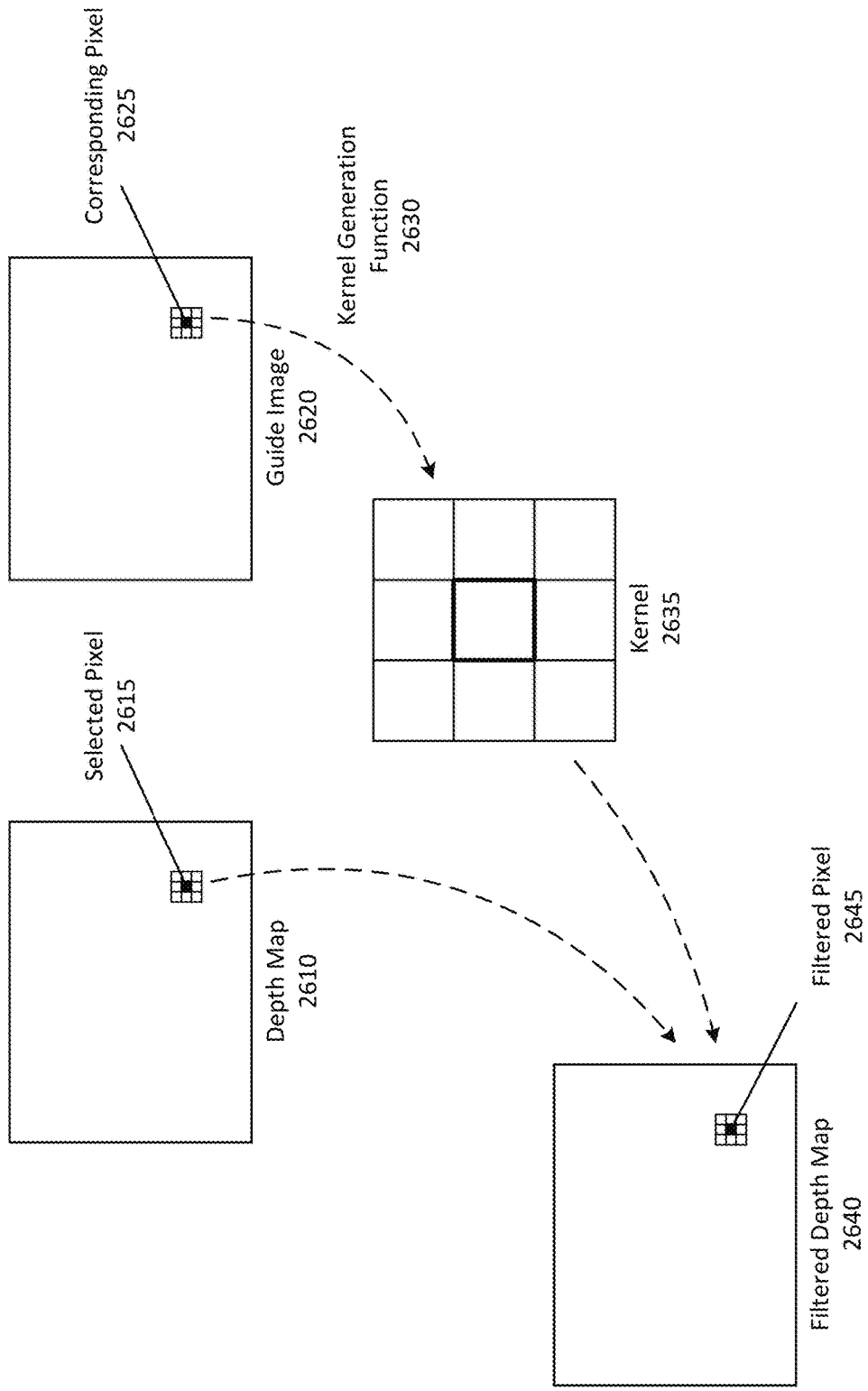
FIG. 26 illustrates an example process for filtering a depth map based on a guide, according to one embodiment.

FIG. 26 illustrates an example process for filtering a depth map based on a guide, according to one embodiment. The process of FIG. 26 is an example of a joint bilateral filter process a depth map 2610 based on a guide image 2620, although in other embodiments, any suitable joint bilateral filter can be used. To filter the depth map 2610, each pixel of the depth map is filtered using a kernel generated for that pixel of the depth map based on the corresponding pixel of the guide image 2620 and its surrounding region. For example, the selected pixel 2615 can be filtered based on a kernel 2635 generated based on the corresponding pixel 2625 in the guide image 2620. Based on a kernel generation function 2630 and the corresponding pixel of the guide image (and the similarities of the surrounding region of the guide image 2620 to the corresponding pixel 2625), the kernel 2635 is generated. When the kernel 2635 is applied to the selected pixel 2615 and the surrounding region in the depth map 2610, the filtered pixel 2645 of the filtered depth map is determined. In some embodiments, the kernel 2635 is 3D, i.e. in the case of a time dependent filter.

For example, the guide image can be any suitable feature, for example a depth map 2610 can be filtered using the reference image associated with the depth map 2610, with an optical flow map of the reference image (or depth map), with a feature map generated based on applying a deep learning model to the reference image (or depth map), or any other suitable guide image 2620 or combination of guide images 2620.

Figure 27A:
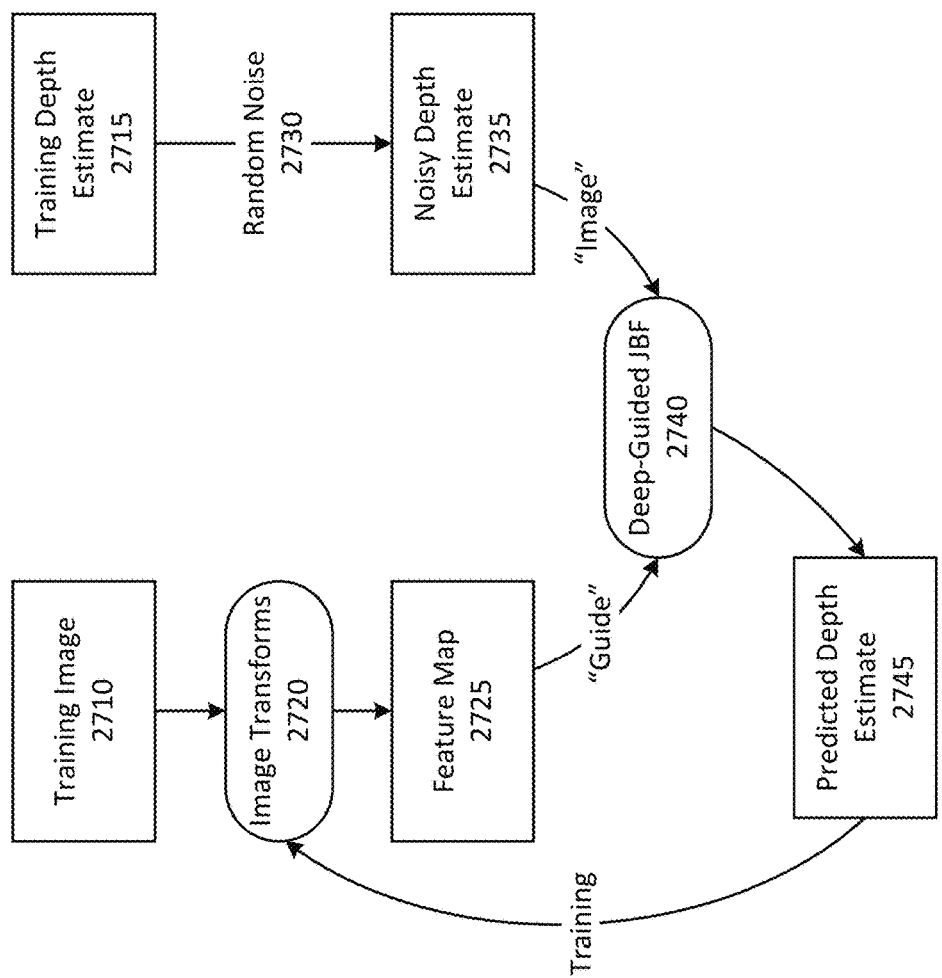
FIG. 27A illustrates an example process for training a set of transforms to filter a depth estimate, according to one embodiment.
Figure 27B:
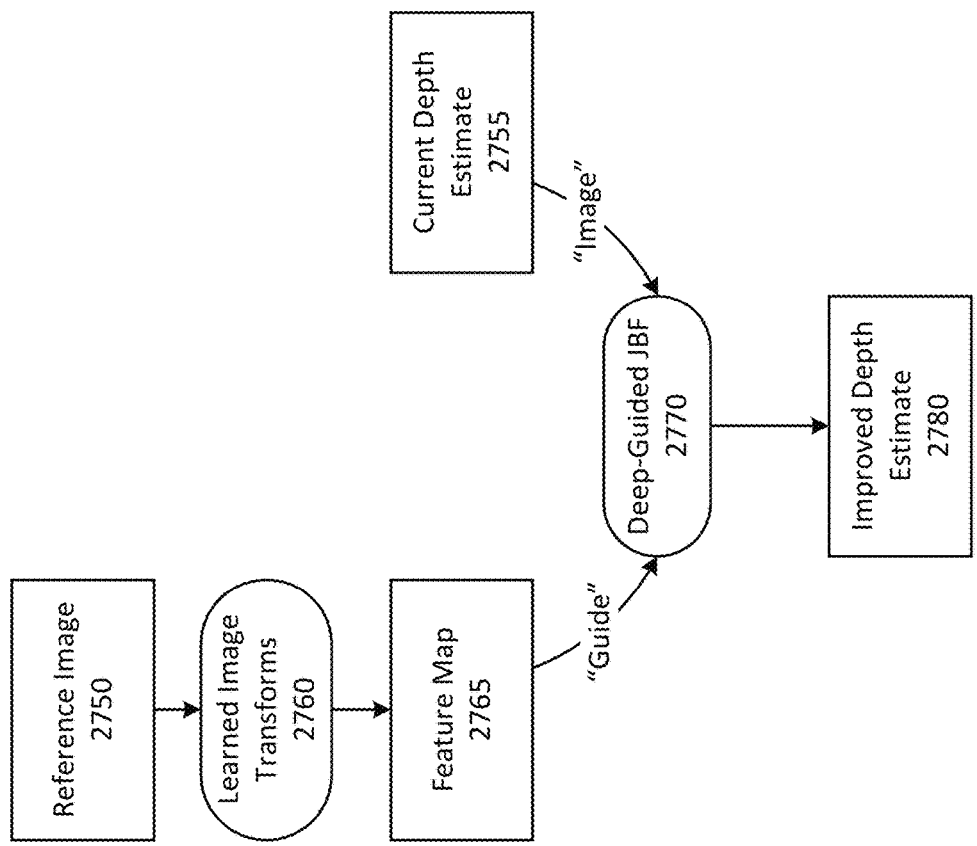
FIG. 27B illustrates an example process for using a set of transforms to filter a depth estimate, according to one embodiment.

FIG. 27A illustrates an example process for training a set of transforms to filter a depth estimate, according to one embodiment. In the examples of FIGS. 27A and 27B, a set of image transforms is used to generate a feature map of an image to learn an improved guide for a joint bilateral filter of a depth estimate. The process of FIG. 27A can begin when a training image 2710 associated with a previously known training depth estimate 2715 is received. The training image 2710 is input into a set of image transforms 2720 to generate a feature map 2725 for the training image. The image transforms 2720 may include various modifications and analyses of an image to generate a map of features for the joint bilateral filter. The image transforms are trained to learn the relevant transforms and weights thereof to generate a feature map 2725 useful to improve a depth estimate. The set of transforms may include various tensor or matrix transforms for the image structures that are sequentially performed to generate the depth guide. These transforms may include convolutional layers, pooling layers, subsampling, feed-forward, and other image processing or 'deep learning' transforms of the image. The image transforms may include weights and other learned parameters for performing the transforms from the training image 2710 to the feature map 2725.

In some embodiments the feature map 2725 has the same dimensions as the training image, and can comprise multiple features associated with each pixel of the input image (in this case the training image 2710). According to some implementations, the training depth estimate 2715 is authoritative for training purposes and assumed to be true. For example, the training depth estimate can be from labeled data (i.e., from well-labeled training sets of data having depth information for images), or generated from a 3D computer rendering, where the depth for individual pixels can be precisely calculated in the digital 3D environment. The training depth estimate 2715 can be perturbed by random noise 2730 to produce an imperfect noisy depth estimate 2735 to be filtered by the deep-guided joint bilateral filter (JBF) 2740. The noisy depth estimate 2735 is filtered by the deep-guided JBF 2740 using the feature map 2725 as a guide 2725 to generate the predicted depth estimate 2745.

By comparing the training depth estimate 2715 to the predicted depth estimate 2745 (created by the noisy depth estimate 2735 guided by the transformed training image), the image transforms can be trained to improve the similarity of the predicted depth estimates to training (i.e., known) training depth estimates. The training may modify the weights and other parameters of the image transforms 2720. When performed across a range of training images and comparing the depth estimates across the pixels of the training images, the image transforms 2720 learn the weights that improve the filtering of the noisy depth estimate 2735.

FIG. 27B illustrates an example process for using a set of transforms to filter a depth estimate, according to one embodiment. The process of FIG. 27B begins when a reference image 2750 is input into a set of learned image transforms 2760 to generate a feature map 2765 for the reference image 2750. The learned image transforms 2760 are the image transforms 2720 after the training process of FIG. 27A determines the appropriate weights and parameters for the image transforms. The generated feature map 2765 can be used as a guide to filter the current depth estimate 2755 using a deep-guided JBF 2770 to generate the improved depth estimate 2780. In addition to use as a filter, the improved depth estimate 2780 may also be used as a component of a cost function for evaluating a depth estimate as discussed above with respect to the depth map generation. That is, the cost function may increase when a proposed depth varies from the value of the improved depth estimate 2780, incentivizing the cost function to confirm with the improved depth estimate 2780 pixel value but permitting other factors in the cost function to outweigh the improved depth estimate when other factors suggest a strong improvement to the depth estimate.

Rendering

The rendering module 718, according to some embodiments, processes a received image set of a scene, for example, an image set captured by the image capture system 100, to generate one or more render views representing the scene. In some implementations, each image set for rendering has an associated set of generated depth maps including a depth map for each image of the image set. For example, an image set can be associated with a set of depth maps generated by the depth calculation module 716 (or from another suitable source). A render view of a scene can be any image depicting the scene to a viewer of the render view. For example, a render view can allow the scene to be recreated in a head-mounted display (HMD), for example, through a panoramic, spherical panoramic, or suitably wide angle image (such as an image to be displayed as an eye view by a HMD). In some implementations, a render view is an image output in cubemap, equirectangular, or cylindrical formats in resolutions such as "8 K" (for example 8192 by 8192 pixels), or any other suitable resolution. The render view thus can represent the scene as captured by the image capture system 100. The rendering module 718 may generate two (or more) render views based on a given image set from one or more defined viewpoints; for example, a render view can be generated from viewpoints for each of a user's eyes, thus providing a pair of stereoscopic images for viewing using a HMD device. For some output projections, a sections of a single render view may be rendered from multiple viewpoints, for example to approximate a user's eye view of a scene in a 360 degree panoramic image. In some implementations, render viewpoints can be associated with any suitable 3D position, for example, a render viewpoint can be selected based on a tracked position of a user's head, based on a desired viewpoint of a scene other than a camera viewpoint, or any other suitable location. In other embodiments, a render view can be any image generated from multiple images of the image set by the rendering module 718. According to some embodiments, depth maps (or other depth information) for the images of an image set can allow various depth-based effects to be applied to a render view. For example, a render view can be split into multiple images based on depth information, for example, a separately generated foreground image and background image each with a defined range of depicted depths (such as 0-30 feet for the foreground image and 30 feet—infinity for the background image). Similarly, a render view may have the background removed (and or replaced with other suitable image information) based on depth information (possibly in combination with other techniques), for example rendering areas of the render view with an associated depth greater than a threshold depth as white or transparent. Similarly, render views can have depth-based fog or other virtual objects inserted into the scene based on the depth information.

To generate a render view, any suitable rendering method can be used by the rendering module 718, including ray tracing methods (for example, using a ray marching algorithm to compute intersections between rays and depth maps), forward splatting methods, triangle rasterization methods, or any other suitable rendering methods. Similarly, the rendering module 718 may utilize hardware acceleration methods to speed up the process of rendering an image set. In some embodiments, rendering may occur in realtime or substantially in realtime based on render views requested from a client device. For example, the rendering module 718 can receive render viewpoints from a client HMD device representing stereoscopic views for presentation using the client HMD device. In response, the client HMD device can render a scene from a predetermined image set with previously calculated depth maps, for example, the next frame in a synchronized video captured by the image capture system 100.

Figure 28:
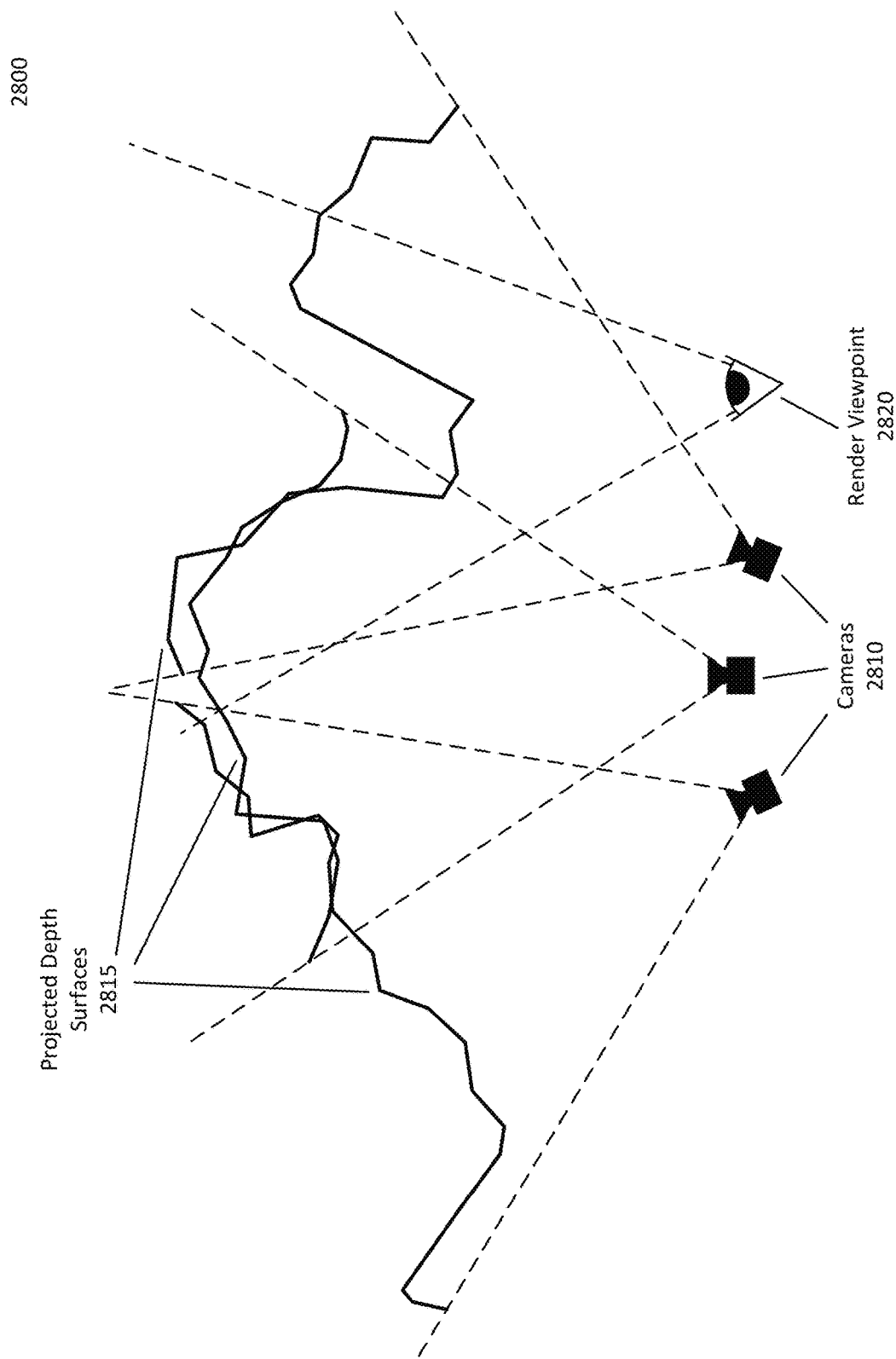
FIG. 28 illustrates an example environment in which a scene is rendered from a set of depth surfaces.

FIG. 28 illustrates an example environment in which a scene is rendered from a set of depth surfaces. The environment 2800 of FIG. 28 comprises a plurality of cameras 2810 each associated with a projected depth surface 2815. A render view can be rendered from the render viewpoint 2820 based on the projected depth surfaces 2815.

In some implementations, a depth surface is generated for each image of the image set to be rendered. Herein, a depth surface is a 3D surface generated based on a reference image (such as an image captured by the image capture system 100), a depth map associated with the reference image (for example, a depth map generated based on the reference image by the depth calculated module 716). In some embodiments, a depth surface is additionally generated and oriented in 3D space based on camera calibration information about the camera that captured the reference image (for example, the position, orientation, and lens information of the camera). A depth surface can be rendered as a connected mesh of triangles, where each triangle of the depth map shares color information with an associated pixel of the reference image. In some implementations, two connected triangles are associated with each pixel of the reference image and the triangles are oriented in 3D space to approximate the associated pixel when viewed from the viewpoint of the capturing camera. A depth surface, according to some embodiments, can approximate the reference image projected into space based on the associated depth map. For example, in the embodiment of FIG. 28, each of the projected depth surfaces 2815 approximate their associated camera 2810. Viewing one of the projected depth surfaces 2815 from the perspective of the associated camera 2810 would provide an approximation of the reference image.

Figure 29:
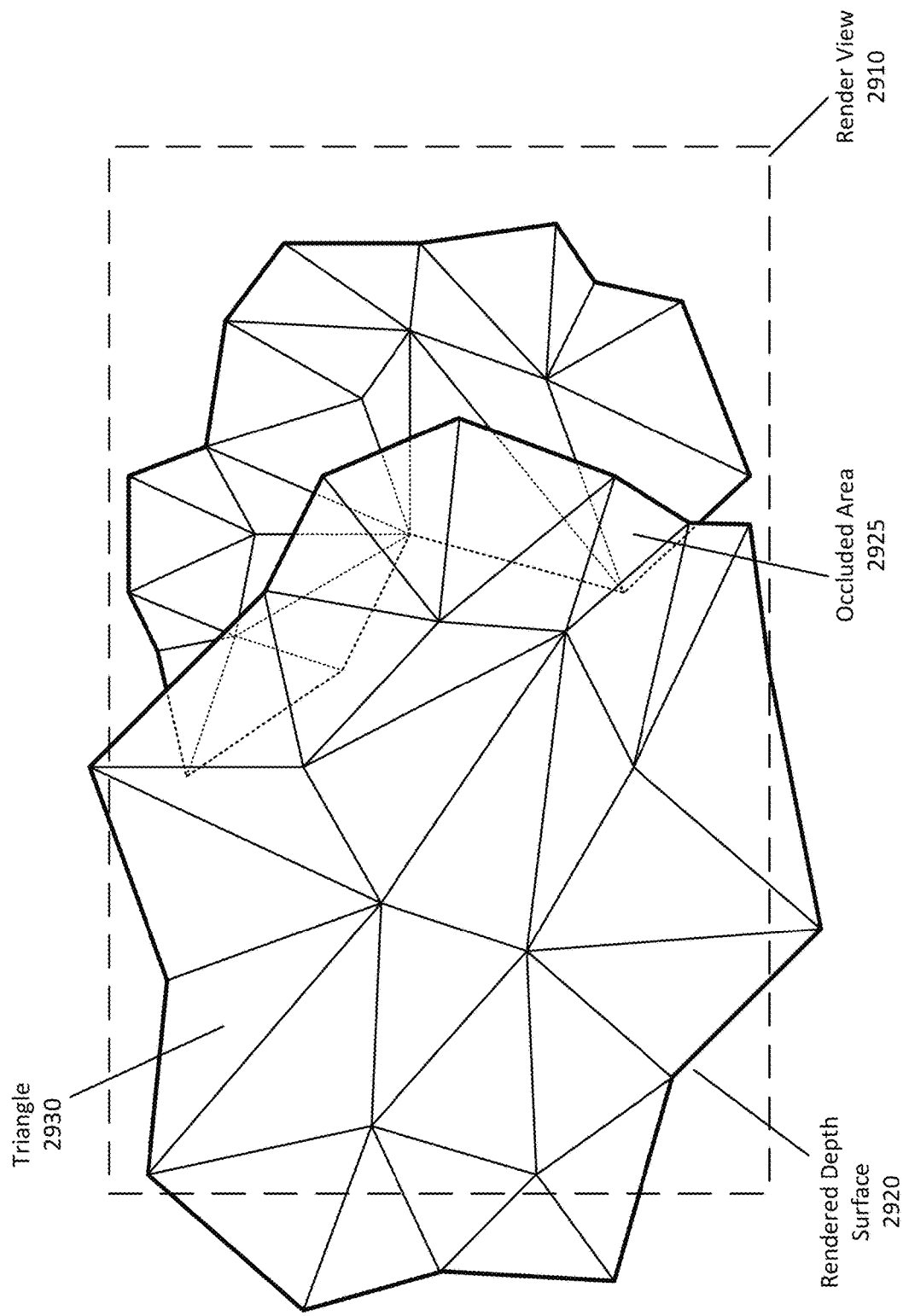
FIG. 29 is an illustration of a render view comprising a rendered depth surface, according to one embodiment.

FIG. 29 is an illustration of a render view comprising a rendered depth surface, according to one embodiment. The render view 2910 of FIG. 29 comprises a rendered depth surface 2920 with an occluded area 2925. In the embodiment of FIG. 29, the rendered depth surface 2920 is made up of a set of triangles 2930. The rendered depth surface 2920 is shown as extending outside of the render view 2910 in FIG. 29, however in some implementations areas of a depth surface outside the render view would not be calculated when rendering the depth surface.

The rendered depth surface 2920, according to this example, also comprises an occluded area 2925 of the depth surface which is not visible in the render view 2910. The occluded area 2925 may be generated because the view from the camera viewpoint differs from the view from the render viewpoint. For example, from a capturing camera's viewpoint, the rendered surface may have varying depths, but because the varying depths generate a three-dimensional rendered depth surface 2920, from the render viewpoint portions of the depth surface may appear behind a closer portion of the depth surface from the perspective of the render viewpoint. Different rendering methods may handle an occluded area 2925 differently. For example, the rays of a ray tracing method may strike the "upper," non-occluded area of the depth surface first, therefore the occluded area 2925 is never rendered in the rendered depth surface. In contrast, "forward splatting" or "triangle rasterization" rendering methods may implement a "z-buffering" technique where the triangles of the rendered depth surface 2920 are rendered from furthest to closest, resulting in the occluded area 2925 being rendered, then covered up by later rendered triangles.

Figure 30:
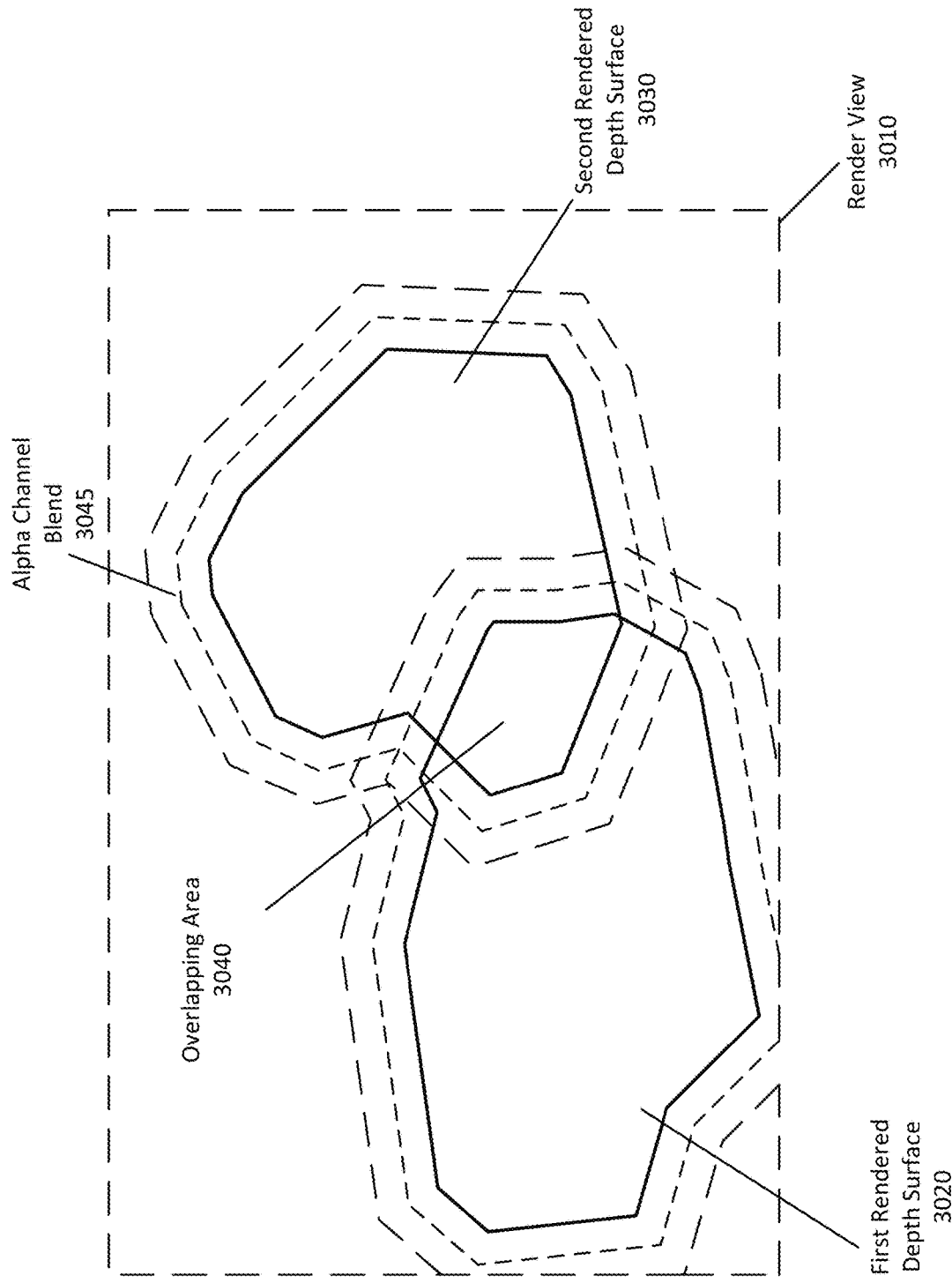
FIG. 30 is an illustration of a render view comprising a set of blended rendered depth surfaces, according to one embodiment.

FIG. 30 is an illustration of a render view comprising a set of blended rendered depth surfaces, according to one embodiment. As shown in FIG. 30, multiple rendered depth surfaces may correspond to the render viewpoint. The render view 3010 of FIG. 30 comprises a first rendered depth surface 3020 and a second rendered depth surface 3030 which overlap at an overlapping area 3040. Each rendered depth surface 3020 and 3030 also includes an alpha channel blending area 3045.

To generate the final render view 3010 the set of rendered depth surfaces (here, including the first and second rendered depth surfaces 3020 and 3030) are overlaid and combined to generate the render view 3010. In some implementations, the rendered depth surfaces are combined together based on an alpha channel associated with each pixel of the rendered depth surfaces. For example, a rendered depth surface can have an alpha channel blend 3045 around the edge of the rendered depth surface. An alpha channel blend can gradually reduce the alpha channel of pixels of a rendered depth surface to 0 based on the distance from the given pixel to the edge of the rendered depth surface. In other embodiments, the alpha channel for a pixel of a rendered depth surface can be scaled from 1 to 0 as a function of the distance from the center of the rendered depth surface, resulting in a circle or oval shaped alpha "cone" for the rendered depth surface. In some implementations, the alpha channel blend 3045 aids in smoothly combining overlapping depth surfaces. Similarly, rendered depth surfaces determined to be farther away in depth from the render viewpoint of the render view 3010 can be assigned a lower overall alpha value than other rendered depth surfaces determined to be closer to the render viewpoint, according to some embodiments. Combining the rendered depth surfaces can, for example, be accomplished using a weighted average by alpha value, or by any other suitable method. For example, rendered depth surfaces can be combined using an equation of the form $v = \alpha_1 v_{S1} + \alpha_2 v_{S2} \ldots / \alpha_1 + \alpha_2 \ldots$ where v is the final value for a pixel of the of the render view 3010 (in some implementations, v may be a vector including multiple channels of color information), $v_{Sn}$ is the value for that pixel from the nth rendered depth surface (for example, $v_{S1}$ represents the value from the first rendered depth surface 3020), and $\alpha_n$ is the alpha channel value for that pixel in the nth rendered depth surface. In some implementations, pixels of the nth depth surface that do not intersect with the nth depth surface are assigned values $\alpha_n = 0$ and $v_{Sn} = 0$. In other implementations, exponential or softmax combination functions can be used to combine rendered depth surfaces based on an alpha channel.

Similarly, an accumulation method can be used to reduce needed memory and storage space for rendering. Some implementations use a set of two accumulation images, the first accumulation image storing a running total of $acc_1 = \alpha_1 v_{S1} + \alpha_2 v_{S2} \ldots$ for each pixel of the render view as each successive rendered depth surface is calculated. Similarly, the second accumulation image can store a running total of $acc_2 = \alpha_1 + \alpha_2 \ldots$ for each pixel of the render view as each successive rendered depth surface is calculated, according to some embodiments. For example, after the first depth surface is calculated $acc_1$ can store the value $\alpha_1 v_{S1}$ for each pixel and $acc_2$ can store the value $\alpha_1$ for each pixel. After the second depth surface is rendered, $acc_1$ can store the value $\alpha_1 v_{S1} + \alpha_2 v_{S1}$ for each pixel and $acc_2$ can store the value $\alpha_1 + \alpha_2$ for each pixel, and so on. When all depth surfaces have been calculated, $acc_1$ can be divided by $acc_2$ to determine the final values of the render view 3010.

Figure 31A:
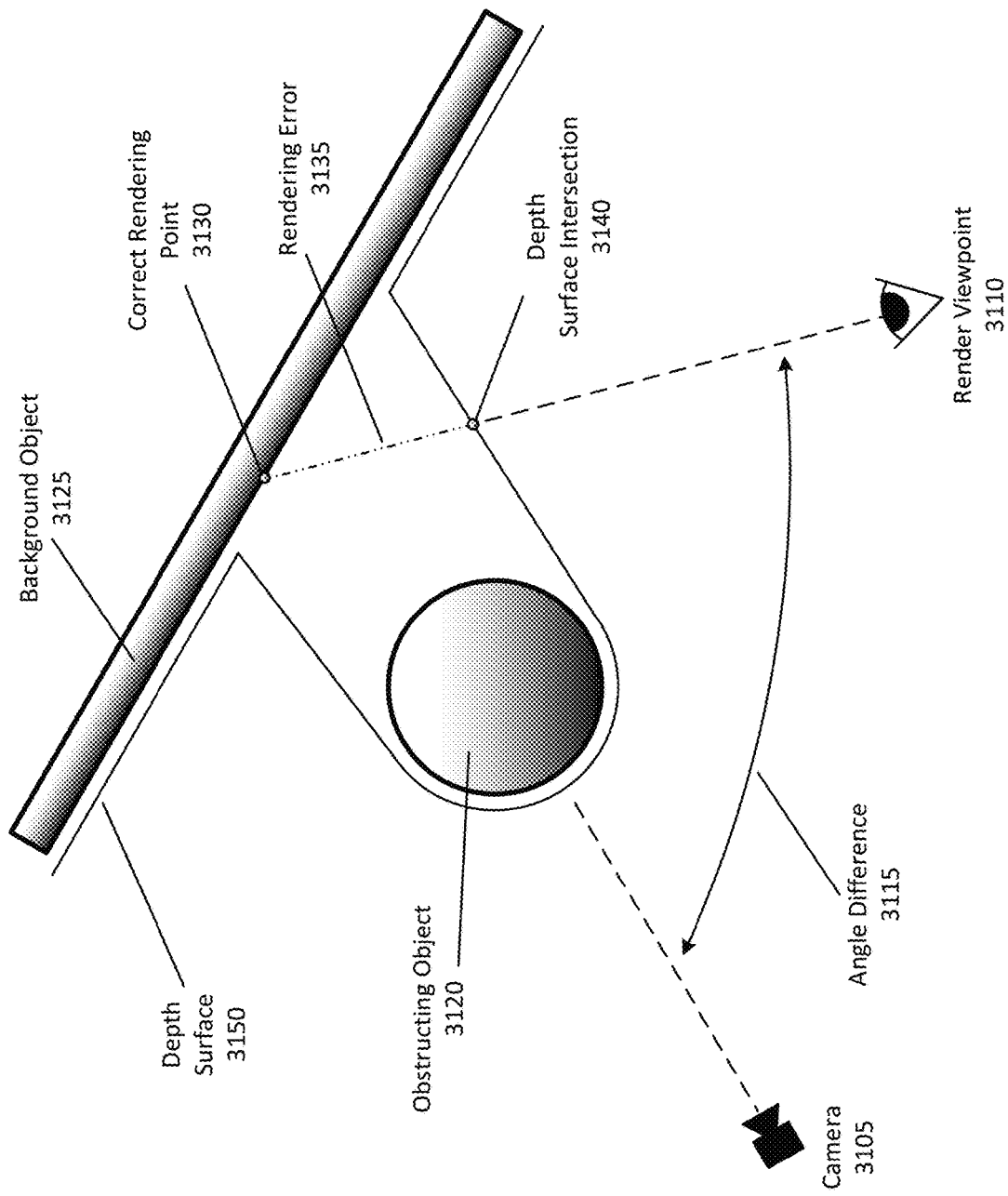
FIG. 31A illustrates an example depth surface with discontinuities around an obstructing object, according to one embodiment.

In some situations, for example, where a depth surface is rendered from a viewpoint different in angle from the camera viewpoint, continuously rendered depth surfaces (that is, a depth map rendered as a single surface without separations or breaks) can give a "false depth" resulting from discontinuities or sharp changes in depth between pixels in the depth surface. FIG. 31A illustrates an example depth surface with discontinuities around an obstructing object, according to one embodiment. The environment of FIG. 31A comprises a camera 3105 capturing an image of an obstructing object 3120 in front of a background object 3125. A depth map is generated based on the image captured by the camera 3105, which is used to render a depth surface 3150. In this example, the generated depth map is fairly accurate, as the obstructing object 3120 blocks the camera 3105 view of portions of the background object 3125. However, the resulting depth surface 3150 includes several discontinuities or sharp changes in depth estimate where the reference image transitions between the obstructing object 3120 and the background object. In the embodiment of FIG. 31A, the depth map 3150 is continuously rendered and therefore the depth surface 3150 is rendered including the discontinuities.

When the depth surface 3150 is rendered from a render viewpoint 3110 at a different angle 3115 than the camera 3105 viewpoint discrepancies can occur between the rendering of the depth surface 3150 and the actual scene comprising the obstructing and background objects 3120 and 3125. For example at the depth surface intersection 3140, the correct rendering point 3130 occurs with a substantial rendering error 3135 when compared to the actual scene. In some implementations, even if additional depth surfaces with the correct rendering point 3130 exist, the rendered depth surface 3150 would distort the rendering of that area of the final rendered image.

Figure 31B:
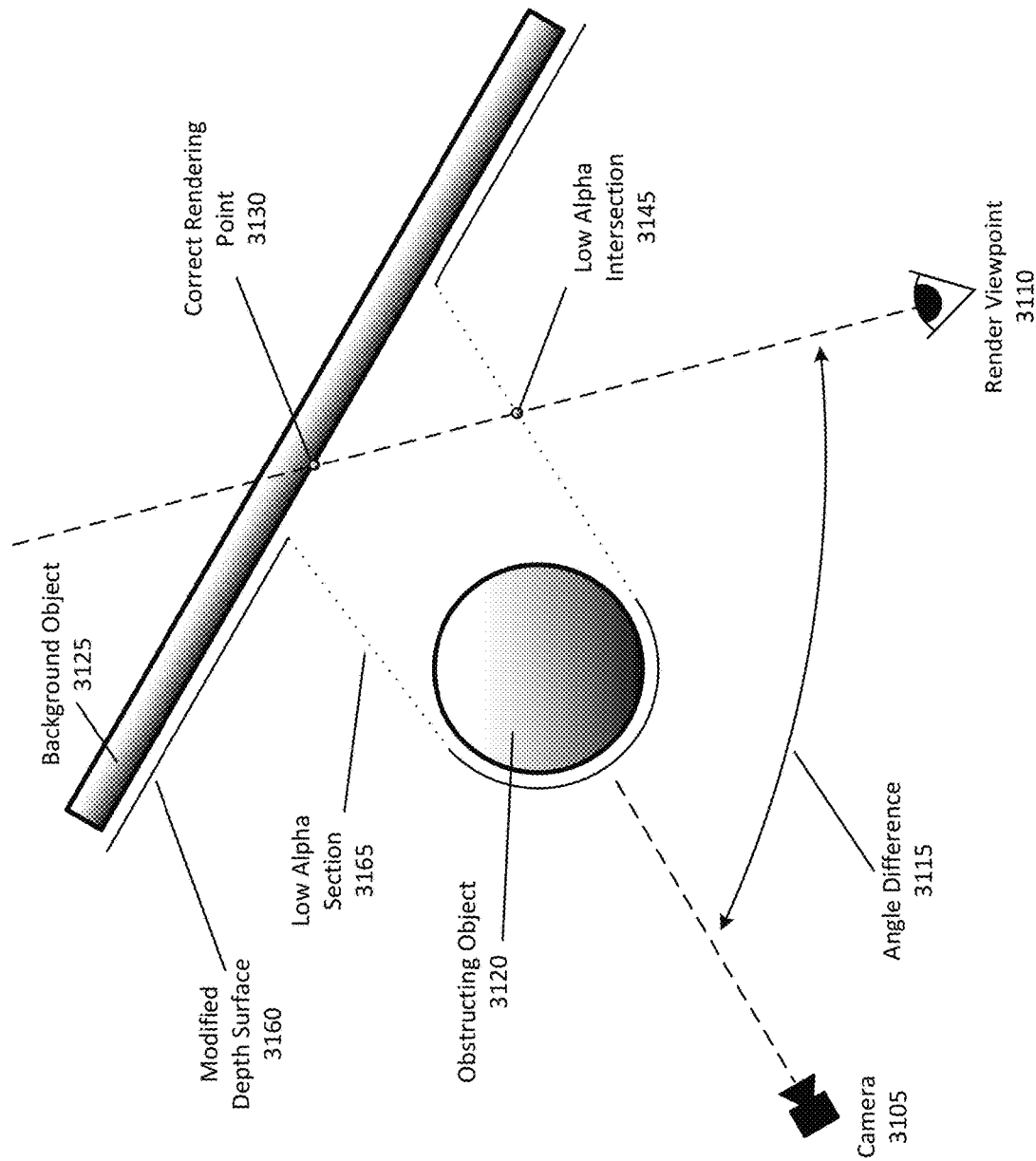
FIG. 31B illustrates an example depth surface with discontinuity correction, according to one embodiment.

Therefore, a discontinuity correction method can be applied when generating a depth surface from a depth map. FIG. 31B illustrates an example depth surface with discontinuity correction, according to one embodiment. The environment of FIG. 31B includes the same camera 3105 and scene comprising the obstructing object 3120 and background object 3125 as FIG. 31A. However, the modified depth surface 3160 includes low alpha sections 3165 in the sections of the depth surface 3160 representing discontinuities in the associated depth map. As described earlier, a depth surface 3160 can be rendered with a corresponding alpha channel to indicate the quality of the depth surface 3160 at a given point (or to aid in transitions between different depth surfaces).

In the embodiment of FIG. 31B, when the modified depth surface 3160 is rendered from the render viewpoint 3110 (still at a different angle 3115 than the camera 3105 viewpoint) discrepancies still occur between the rendering of the modified depth surface 3160 and the actual scene comprising the obstructing and background objects 3120 and 3125. However, in the case of the modified depth surface 3160, the low alpha sections 3165 of the modified depth surface comprise the areas where the discrepancies will occur. For example, at the low alpha intersection 3145 the modified depth surface 3160 is rendered with a low alpha value. As a result, if an additional depth surface having a view of the correct rendering point 3130 exists, because the low alpha section 3165 reduces the alpha blending weight of the rendered modified depth surface 3160 at that point, the additional view comparatively has a higher weight to correctly reflect rendering point 3130.

In some embodiments, discontinuities in a depth map can be detected based on the magnitude of the gradient of the depth map exceeding a threshold value, based on the difference in depth estimation between a pixel and a neighboring pixel exceeding a threshold value, or any other suitable method to detect abrupt changes in the depth estimates of a depth map. Similarly, when a depth surface is generated for the given depth map, sections or triangles of the modified depth surface 3160 corresponding to the discontinuities can be assigned a low alpha value so as to have a reduced weight if another depth surface has conflicting color information for that area of the render view.

Figure 31C:
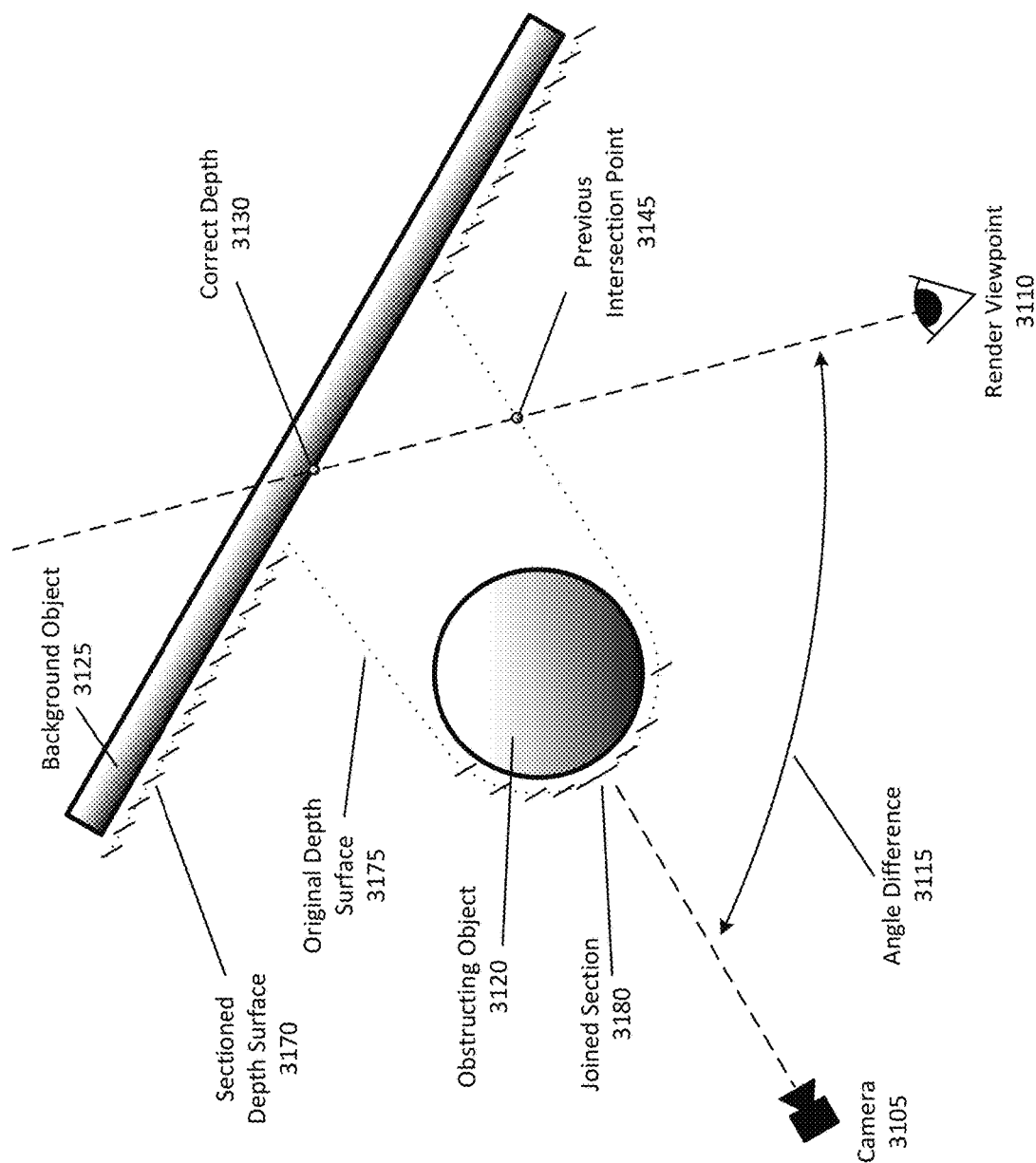
FIG. 31C illustrates an example sectioned depth surface, according to one embodiment.

In other embodiments, a depth surface is rendered as a disconnected series of sections associated, for example, with a single pixel of the reference image. FIG. 31C illustrates an example sectioned depth surface, according to one embodiment. The environment of FIG. 31C once again includes the same camera 3105 and scene comprising the obstructing object 3120 and background object 3125 as FIGS. 31A and B. However, the environment of FIG. 31C includes a sectioned depth surface 3170 rendered as a collection of discrete sections. For example, each section of the sectioned depth surface 3170 can represent a pixel of the associated reference image. In some embodiments, each section of the sectioned depth surface 3170 is rendered parallel (or near-parallel) to the image sensor of the camera 3105. Similarly, a "billboard" method can be used in which each section of the sectioned depth surface 3170 is rendered parallel (or near-parallel) to the image plane of the render viewpoint 3110. As an example, the near-parallel rendering may tilt each section towards the render viewpoint by up to a maximum angle, such as 25 degrees. Rendering a sectioned depth surface 3170 can be relatively expensive in terms of number of triangles used in the depth surface, as each pixel of the depth map can be represented by 2 triangles in the sectioned depth surface 3170. To reduce the number of rendered triangles, neighboring sections of the sectioned depth surface 3170 can be joined or combined together to form a joined section 3180 based on the neighboring sections being close in orientation and size.

Due to the gaps between sections, the sectioned depth surface 3170 has large spaces between neighboring sections of the depth surface with large differences in the depth estimates of the corresponding pixels of the reference image. Therefore, discontinuities in the depth map are not rendered in the section depth surface 3170, as the sectioned depth surface 3170 is not rendered continuously. For example, where the original depth surface 3175 would intersect be rendered at the previous intersection point 3145, instead there is a gap in the sectioned depth surface 3170.

Figure 32B:
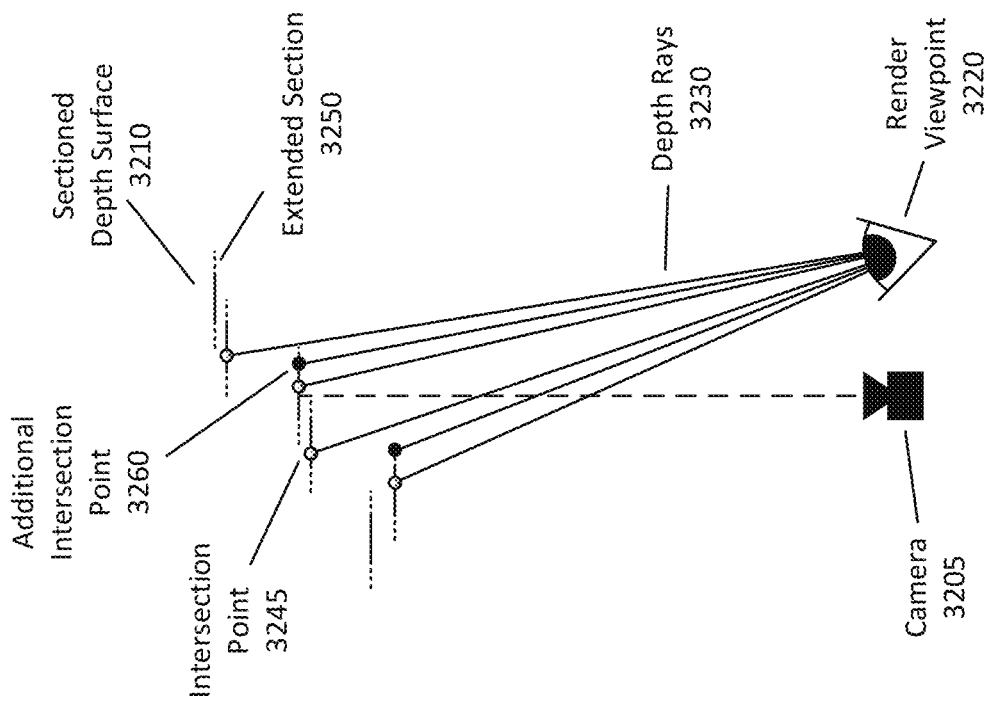
FIG. 32B illustrates an example situation in which an extended sectioned depth surface is rendered from a different angle, according to one embodiment.
Figure 32A:
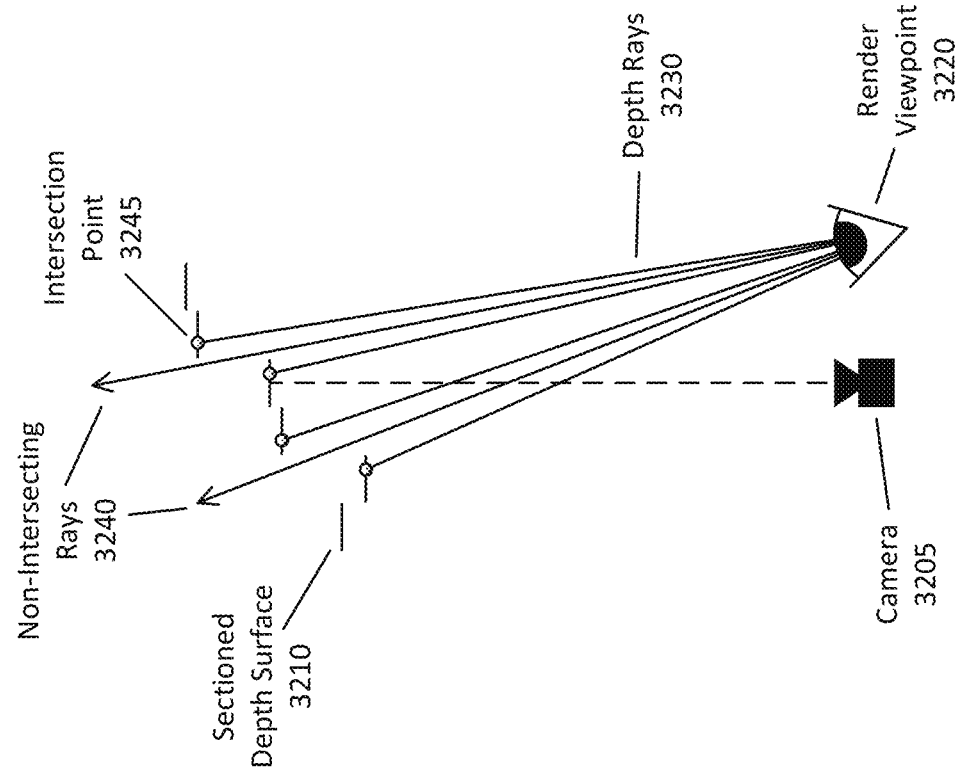
FIG. 32A illustrates an example situation in which a sectioned depth surface is rendered from a different angle, according to one embodiment.

According to some embodiments, the sectioning of a sectioned depth surface can result in render view artifacts when rendered from a viewpoint not aligned with the camera viewpoint associated with the depth surface. FIG. 32A illustrates an example situation in which a sectioned depth surface is rendered from a different angle, according to one embodiment. In the embodiment of FIG. 32A the sectioned depth surface 3210 associated with the camera 3205 is rendered from the render viewpoint 3220. In this example, the camera 3205 viewpoint (i.e. the natural viewpoint of the sectioned depth map 3210) is different in angle from the render viewpoint 3220 and may result in gaps in view between sections of the sectioned depth surfaces. In this example, the sectioned depth surface 3210 does not have any discontinuities or other sharp changes in depth estimations, and the sectioned depth surface 3210 can be assumed to represent a continuous depth map of a single object or surface. The difference in viewpoint between the camera 3205 viewpoint and the render viewpoint 3220 can indicate that the render view from the render viewpoint 3220 should be similar to the reference image used to generate the sectioned depth surface 3210.

The render viewpoint 3220 is associated with a series of depth rays 3230. In an implementation using ray tracing methods to render, the depth rays 3230 can represent rays used to determine pixels of the render view. As expected, some of the depth rays 3230 intersect with the sectioned depth surface 3210, for example at the intersection point 3245 in this example. However, a set of non-intersecting rays 3240 do not intersect with the sectioned depth surface 3210, for example resulting in ray tracing rays that do not intersect the depth surface, resulting in gaps in the rendered sectioned depth surface 3210, according to some embodiments.

To reduce or eliminate gaps between depth surface sections in such viewing angles, each section of the sectioned depth surface 3210 can be extended with neighbor color information, according to some embodiments. FIG. 32B illustrates an example situation in which an extended sectioned depth surface is rendered from a different angle, according to one embodiment. In the environment of FIG. 32B, the same sectioned depth surface 3210 associated with the camera 3205 is rendered from the same render viewpoint 3220. However, each section of the sectioned depth surface 3210 has been extended by a predetermined amount, for example 50% or 25% of the previous width of a section. Each extended section 3250 comprises the color information of the neighboring section with which it overlaps (therefore maintaining direct view consistency) and can serve as an additional surface for depth rays 3230 to intersect (or to be rendered by any other suitable method). In some embodiments, the extended sections 3250 are created by expanding the triangles already forming each section of the sectioned depth surface 3210, and thus using no extra triangles for rendering. Due to the extended sections 3250, the depth rays 3230 continue to intersect with the sectioned depth surface 3210 at the previous intersection points 3245, but also at additional intersection points 3260. In some implementations, the use of extended sections 3250 can reduce gaps or other artifacts present when rendering a sectioned depth surface 3210 from a slight off angle.

As mentioned previously, render views can be generated in any suitable field of view or projection. In some implementations, an equirectangular projection is used to generate one or more render views (hereinafter, a render view using an equirectangular projection will be referred to as an "equirect view"). In some cases, an equirect view is a monoscopic 360 degree image of the scene as viewed from a single origin point (the render viewpoint). However, in other embodiments, equirect views are used in stereoscopic pairs (one equirect view for each eye of a user) to generate a 3D 360 image which can be later displayed using a HMD or other suitable viewing device. In a stereoscopic pair, the viewpoint of a user's eye when turning in a 360 degree circle does not remain in a static location, instead the user's eye viewpoint moves in a circle with a diameter of the user's interpupillary distance ("IPD") as the user rotates through 360 degrees. Therefore, the process of rendering an equirect view can be adapted to approximate the correct viewpoint for a user's eye at each angle of the equirect view. In implementations using ray tracing methods for rendering, the changing viewpoint can be accounted for by altering the ray origin of each ray appropriately. However, in embodiments using other rendering methods (for example, forward splatting or triangle rasterization methods) the rendering process can be adapted to render an equirect view with a changing viewpoint. For example, each triangle of the depth surfaces used to render the equirect view can be initially rendered based on the origin point as normal, but then shifted to approximate the correct location of that triangle when viewed from the correct viewpoint for that specific angle of the equirect view. In some implementations, an equirect view is rendered using a single viewpoint (for example, ray tracing methods), but other implementations (for example, certain forward splatting or triangle rasterization implementations) can render a cubemap from a set of intermediate images (for example, images representing the top, bottom, and sides of a cube) which are assembled to approximate the equirect view. According to some embodiments, rendering a cubemap for a equirect view with a changing viewpoint can be similarly adapted to adjust for the correct viewpoint.

Figure 33:
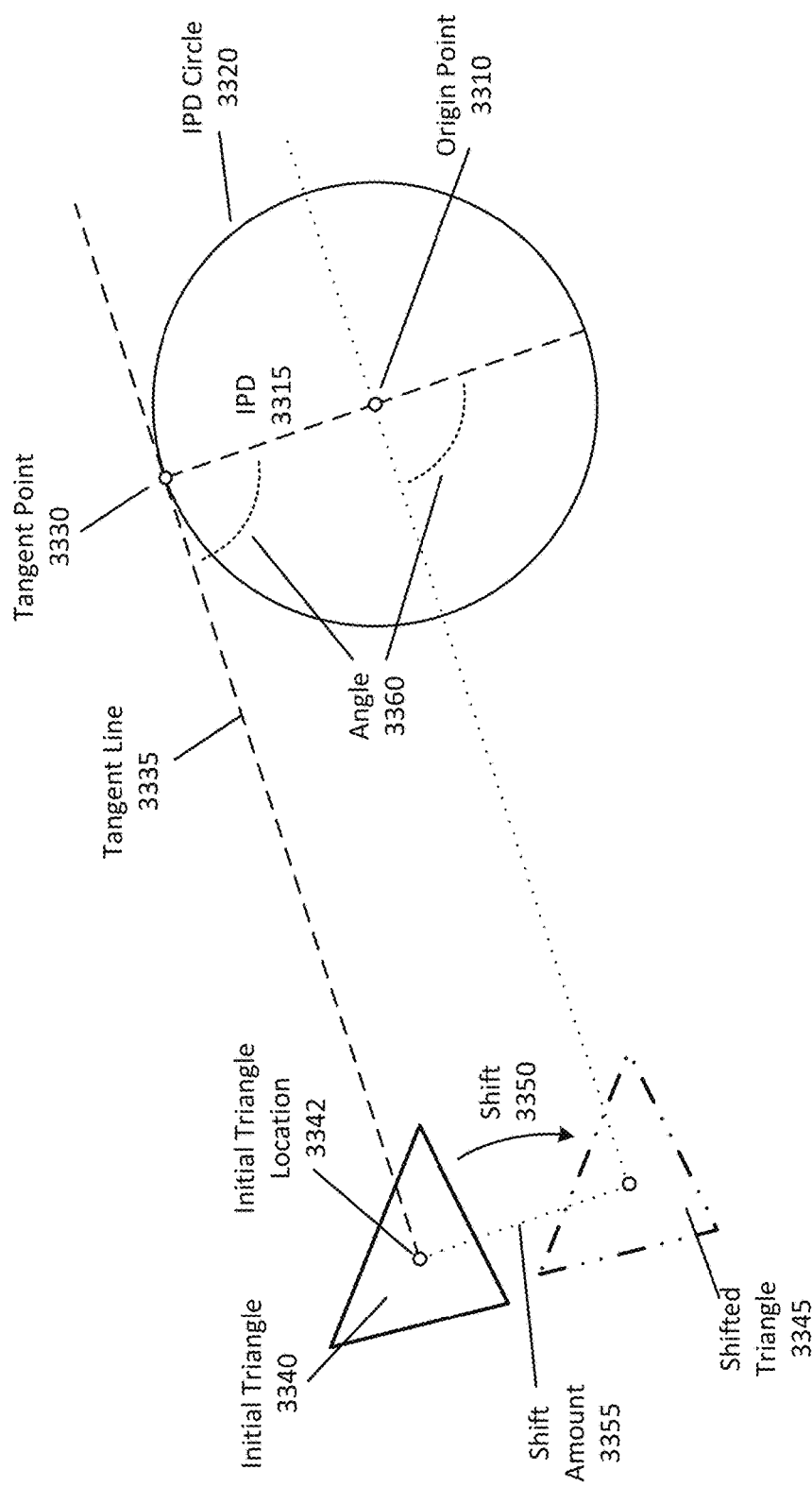
FIG. 33 illustrates rendering a triangle for a render view using an equirectangular projection, according to one embodiment.

FIG. 33 illustrates rendering a triangle for a render view using an equirectangular projection, according to one embodiment. The example of FIG. 33 comprises an origin point 3310 for the equirect view and an IPD circle 3320 with diameter equal to the IPD 3315 centered on the origin point 3310. In some embodiments, the IPD circle 3320 represents the set of approximate viewpoints for each angle of the equirect view. The correct viewpoint for any given angle is the tangent point 3330 of a tangent line at that angle, according to some embodiments. In this case, there are two possible tangent lines for any given angle 3360; the correct tangent point 3330 can be determined based on if the left or right eye viewpoint is desired.

To render a triangle, for example the initial triangle 3340, the triangle is first rendered as if the viewpoint was the origin point. Then a tangent line 3335 is drawn from the location of that triangle (here, the initial triangle location 3342) to the IPD circle 3320. The resulting tangent point 3330 is the approximate viewpoint for this triangle. Then, the initial triangle is shifted 3350 to approximate the correct viewpoint. In some embodiments, the initial triangle 3340 is shifted by an amount equal to half the IPD 3315 in a direction perpendicular to the tangent line 3335. This shift 3355 can maintain the same angle 3360 between the initial triangle 3340 and the determined viewpoint (the tangent point 3330) and between the shifted triangle 3345 and the origin point 3310. In situations where an opposite side view is needed, the opposite tangent point to the IPD circle 3320 is chosen. For example, in this example, the opposite would be roughly opposite the tangent point 3330 and would result in a shift of the initial triangle 3340 generally upwards.

Figure 34:
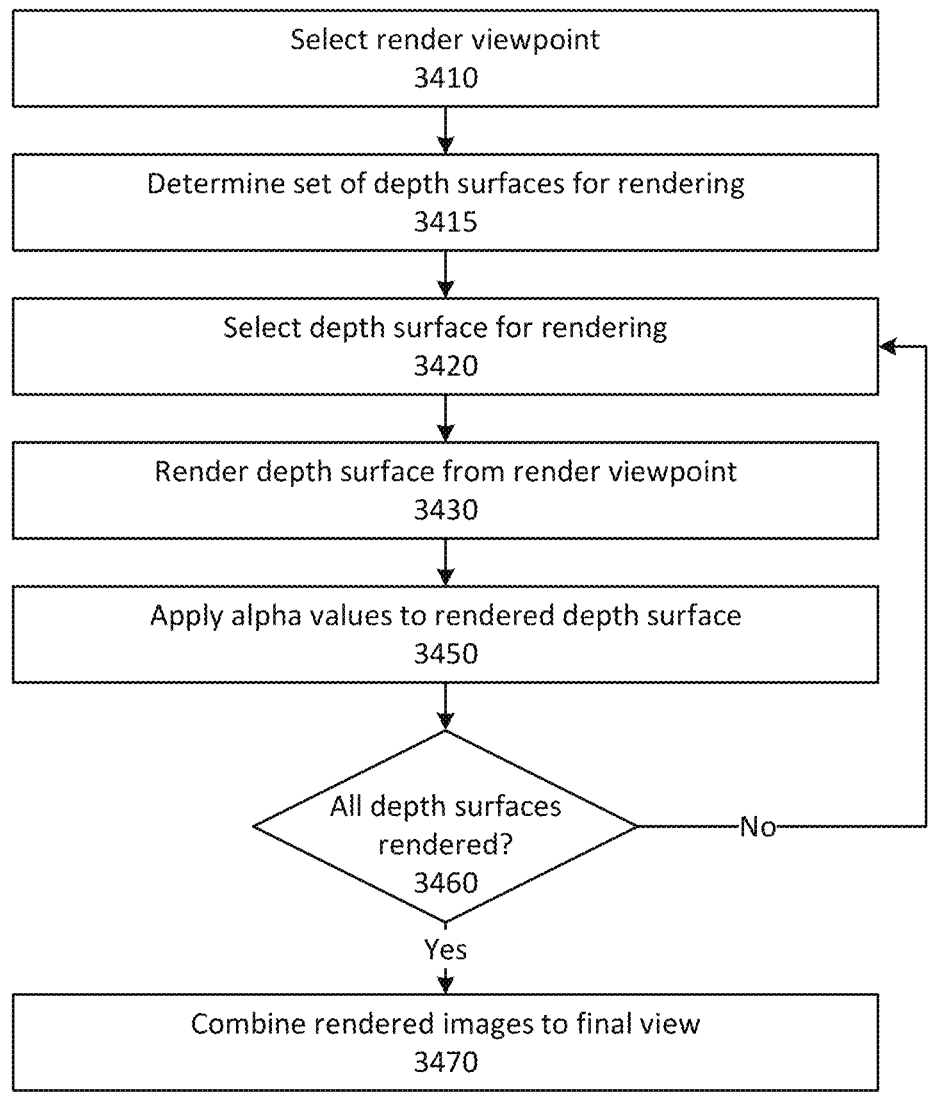
FIG. 34 is a flowchart outlining an example process for generating a render view based on a set of depth surfaces, according to one embodiment.

FIG. 34 is a flowchart outlining an example process for generating a render view based on a set of depth surfaces, according to one embodiment. The process of FIG. 34 begins when a render viewpoint 3410 is selected. The rendering module can the determine 3415 the set of depth surfaces needed to generate the desired render view. A depth surface is then selected 3420 and rendered 3430 from the render viewpoint by any suitable method. At this point any alpha values can be applied to the rendered depth surface 3450, or, for example, the rendered depth surface can be added to an accumulation view based on the alpha values of the depth surface. If all depth surfaces have been rendered, all the rendered depth surfaces are combined to form the final render view 3470, but if additional depth surfaces remain, the process resumes from the step 3420.

CONCLUSION

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
   receiving a calibration of an image capture system comprising a plurality of cameras, the calibration describing an expected position and orientation of the plurality of cameras;
   receiving a set of calibration images comprising an image captured from each of the plurality of cameras of the image capture system;
   identifying a set of feature matches, each feature match associating corresponding locations in a first image and a second image of the set of calibration images;
   determining a set of traces, each trace comprising one or more feature matches of the set of feature matches and associated with two or more images of the set of calibration images;
   calculating, for each trace of the set of traces, one or more reprojection errors; and
   refining the calibration of the image capture system based on the set of traces and the one or more reprojection errors of each trace.

2. The method of claim 1, further comprising:
   determining, for each trace of the set of traces, a 3D location in space associated with the trace based on the two or more images associated with that trace and the calibration of the image capture system; and refining the set of traces based on the 3D location associated with each trace.

3. The method of claim 2, wherein calculating, for each trace of the set of traces, one or more reprojection errors comprises:
calculating, for each trace of the set of traces, one or more reprojection errors based on the 3D location associated with the trace, the calibration of the image capture system, and the one or more feature matches associated with the trace.

4. The method of claim 2, wherein calculating, for each trace of the set of traces, one or more reprojection errors comprises:
calculating, based on the estimated 3D location of each trace, a reprojection error for each feature match of the second refined set of feature matches;
and wherein refining the set of traces based on the 3D location associated with the trace comprises:
discarding, from the second refined set of feature matches, one or more feature matches, based on the calculated reprojection error; and
determining, a refined set of traces based on the updated second refined set of feature matches.

5. The method of claim 1, further comprising refining the set of feature matches by:
determining, for each feature match of the set of feature matches, a 3D location in space associated with that feature match; and
discarding, from the set of feature matches, one or more feature matches based on the 3D location associated with each feature match.

6. The method of claim 5, wherein discarding, from the refined set of feature matches, one or more feature matches comprises:
calculating, based on the estimated 3D location of each feature match, a reprojection error for each feature match of the refined set of feature matches;
determining, based on the determined reprojection errors, a threshold reprojection error for each feature match of the refined set of feature matches; and
discarding, from the set of feature matches, one or more feature matches based on the reprojection error of the one or more feature matches being greater than the threshold reprojection error.

7. The method of claim 6, wherein determining a threshold reprojection error for each feature match of the refined set of feature matches comprises:
calculating the median reprojection error for the set of feature matches between a first and second image of the set of calibration images; and
assigning a threshold reprojection error to each feature match for each feature match of set of feature matches based on the median reprojection error.

8. A system comprising:
an image capture system comprising a plurality of cameras configured to capture images;
a camera calibration system, configured to:
receive, a calibration of the image capture system describing an expected position and orientation of each camera of the image capture system;
receive, from the image capture system, a set of calibration images comprising an image captured from each camera of the image capture system;
identify a set of feature matches, each feature match associating corresponding locations in a first image and a second image of the set of calibration images;
determine a set of traces, each trace comprising one or more feature matches of the set of feature matches and associated with two or more images of the set of calibration images;
calculate, for each trace of the set of traces, one or more reprojection errors; and
refine the calibration of the image capture system based on the set of traces and the one or more reprojection errors of each trace.

9. The system of claim 8, wherein the camera calibration system is further configured to:
determine, for each trace of the set of traces, a 3D location in space associated with the trace based on the two or more images associated with that trace and the calibration of the image capture system; and
refine the set of traces based on the 3D location associated with each trace.

10. The system of claim 9, wherein calculating, for each trace of the set of traces, one or more reprojection errors comprises:
calculating, for each trace of the set of traces, one or more reprojection errors based on the 3D location associated with the trace, the calibration of the image capture system, and the one or more feature matches associated with the trace.

11. The system of claim 9, wherein calculating, for each trace of the set of traces, one or more reprojection errors comprises:
calculating, based on the estimated 3D location of each trace, a reprojection error for each feature match of the second refined set of feature matches;
and wherein refining the set of traces based on the 3D location associated with the trace comprises:
discarding, from the second refined set of feature matches, one or more feature matches, based on the calculated reprojection error; and
determining, a refined set of traces based on the updated second refined set of feature matches.

12. The system of claim 8, wherein the camera calibration system is further configured to refine the set of feature matches by:
determining, for each feature match of the set of feature matches, a 3D location in space associated with that feature match; and
discarding, from the set of feature matches, one or more feature matches based on the 3D location associated with each feature match.

13. The system of claim 12, wherein discarding, from the refined set of feature matches, one or more feature matches comprises:
calculating, based on the estimated 3D location of each feature match, a reprojection error for each feature match of the refined set of feature matches;
determining, based on the determined reprojection errors, a threshold reprojection error for each feature match of the refined set of feature matches; and
discarding, from the set of feature matches, one or more feature matches based on the reprojection error of the one or more feature matches being greater than the threshold reprojection error.

14. The system of claim 13, wherein determining a threshold reprojection error for each feature match of the refined set of feature matches comprises:
calculating the median reprojection error for the set of feature matches between a first and second image of the set of calibration images; and assigning a threshold reprojection error to each feature match for each feature match of set of feature matches based on the median reprojection error.

15. A non-transitory computer readable storage medium comprising instructions which, when executed by a processor, cause the processor to perform the steps of:
receiving a calibration of an image capture system comprising a plurality of cameras, the calibration describing an expected position and orientation of the plurality of cameras;
receiving a set of calibration images comprising an image captured from each of the plurality of cameras of the image capture system;
identifying a set of feature matches, each feature match associating corresponding locations in a first image and a second image of the set of calibration images;
determining a set of traces, each trace comprising one or more feature matches of the set of feature matches and associated with two or more images of the set of calibration images;
calculating, for each trace of the set of traces, one or more reprojection errors; and
refining the calibration of the image capture system based on the set of traces and the one or more reprojection errors of each trace.

16. The non-transitory computer readable storage medium of claim 15, wherein the steps further comprise:
determining, for each trace of the set of traces, a 3D location in space associated with the trace based on the two or more images associated with that trace and the calibration of the image capture system; and
refining the set of traces based on the 3D location associated with each trace.

17. The non-transitory computer readable storage medium of claim 16, wherein calculating, for each trace of the set of traces, one or more reprojection errors comprises:
calculating, for each trace of the set of traces, one or more reprojection errors based on the 3D location associated with the trace, the calibration of the image capture system, and the one or more feature matches associated with the trace.

18. The non-transitory computer readable storage medium of claim 16, wherein calculating, for each trace of the set of traces, one or more reprojection errors comprises:
calculating, based on the estimated 3D location of each trace, a reprojection error for each feature match of the second refined set of feature matches;
and wherein refining the set of traces based on the 3D location associated with the trace comprises:
discarding, from the second refined set of feature matches, one or more feature matches, based on the calculated reprojection error; and
determining, a refined set of traces based on the updated second refined set of feature matches.

19. The non-transitory computer readable storage medium of claim 15, wherein the steps further comprise refining the set of feature matches by:
determining, for each feature match of the set of feature matches, a 3D location in space associated with that feature match; and
discarding, from the set of feature matches, one or more feature matches based on the 3D location associated with each feature match.

20. The non-transitory computer readable storage medium of claim 19, wherein discarding, from the refined set of feature matches, one or more feature matches comprises:
calculating, based on the estimated 3D location of each feature match, a reprojection error for each feature match of the refined set of feature matches;
determining, based on the determined reprojection errors, a threshold reprojection error for each feature match of the refined set of feature matches; and
discarding, from the set of feature matches, one or more feature matches based on the reprojection error of the one or more feature matches being greater than the threshold reprojection error.

\* \* \* \* \*